United States Patent
Rico Alvarino et al.

(10) Patent No.: US 11,515,907 B2
(45) Date of Patent: Nov. 29, 2022

(54) TECHNIQUES FOR WIRELESS COMMUNICATIONS USING PRECONFIGURED UPLINK RESOURCES

(71) Applicant: QUALCOMM Incorporated, San Diego, CA (US)

(72) Inventors: Alberto Rico Alvarino, San Diego, CA (US); Ayan Sengupta, San Diego, CA (US); Le Liu, Fremont, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 16/865,210

(22) Filed: May 1, 2020

(65) Prior Publication Data
US 2020/0350949 A1    Nov. 5, 2020

Related U.S. Application Data

(60) Provisional application No. 62/843,318, filed on May 3, 2019.

(51) Int. Cl.
*H04W 4/00*    (2018.01)
*H04B 1/7143*    (2011.01)
(Continued)

(52) U.S. Cl.
CPC ........... *H04B 1/7143* (2013.01); *H04B 1/713* (2013.01); *H04L 1/189* (2013.01); *H04L 1/1819* (2013.01);
(Continued)

(58) Field of Classification Search
CPC ... H04W 76/27; H04W 72/14; H04W 72/042; H04W 72/0413; H04B 1/713; H04B 1/7143; H04L 5/0055
See application file for complete search history.

(56) References Cited

U.S. PATENT DOCUMENTS

2015/0098366 A1    4/2015    Wu
2016/0330633 A1    11/2016    You et al.
(Continued)

FOREIGN PATENT DOCUMENTS

EP        2688357 A1       1/2014
WO    WO-2020032659 A1    2/2020

OTHER PUBLICATIONS

CATT: "DL Small Data Transmission in Inactive State," 3GPP Draft, 3GPP TSG-RAN WG2 Meeting #96, R2-167955, DL Small Data, 3rd Generation Partnership Project (3GPP), Mobile Competence Centre, 650, Route Des Lucioles, F-06921, Sophia-Antipolis Cedex, France, vol. RAN WG2, No. Reno, USA; Nov. 14-Nov. 18, 2016, Nov. 13, 2016 (Nov. 13, 2016), XP051177683, 3 pages, Retrieved from the Internet: URL: http://www.3gpp.org/ftp/Meetings_3GPP_SYNC/RAN2/Docs/ [retrieved on Nov. 13, 2016] p. 3.
(Continued)

*Primary Examiner* — Bo Hui A Zhu
(74) *Attorney, Agent, or Firm* — Holland & Hart LLP; Nerrie M. Zohn

(57) ABSTRACT

Methods, systems, and devices for wireless communications are described that support techniques for wireless communications using preconfigured uplink resources. Generally, the described techniques provide for enhancement of communication features including frequency hopping, an uplink control channel, coverage enhancement, timing advance, uplink power control, reconfiguration, a downlink control channel, a downlink data channel, retransmissions, or sub-carrier spacing for a UE in idle mode. The UE may receive an uplink resource configuration for uplink communications in idle mode, the uplink resource configuration comprising an indicator associated with allocated resources for the uplink communications in idle mode and a set of parameters. The UE may transmit, while in idle mode, a first uplink transmission associated with a transport block on the allo-
(Continued)

cated resources and according to one or more of the parameters, and monitor for a response to the first uplink transmission.

72 Claims, 24 Drawing Sheets

(51) Int. Cl.
| | | |
|---|---|---|
| | *H04W 76/27* | (2018.01) |
| | *H04B 1/713* | (2011.01) |
| | *H04L 1/18* | (2006.01) |
| | *H04L 5/00* | (2006.01) |
| | *H04W 8/24* | (2009.01) |
| | *H04W 24/08* | (2009.01) |
| | *H04W 52/02* | (2009.01) |
| | *H04W 72/04* | (2009.01) |
| | *H04W 72/14* | (2009.01) |

(52) U.S. Cl.
CPC .......... *H04L 5/0055* (2013.01); *H04L 5/0094* (2013.01); *H04W 8/24* (2013.01); *H04W 24/08* (2013.01); *H04W 52/0209* (2013.01); *H04W 72/042* (2013.01); *H04W 72/0413* (2013.01); *H04W 72/14* (2013.01); *H04W 76/27* (2018.02)

(56) References Cited

U.S. PATENT DOCUMENTS

| | | | |
|---|---|---|---|
| 2018/0176847 | A1 | 6/2018 | Fasil Abdul et al. |
| 2019/0104517 | A1 | 4/2019 | Park |
| 2019/0182824 | A1 | 6/2019 | Chatterjee |
| 2020/0187015 | A1 | 6/2020 | Li et al. |
| 2020/0205150 | A1 | 6/2020 | Cheng et al. |
| 2020/0314807 | A1 | 10/2020 | Choe et al. |
| 2020/0351023 | A1 | 11/2020 | Alvarino |
| 2020/0351844 | A1 | 11/2020 | Rico Alvarino et al. |
| 2021/0127396 | A1* | 4/2021 | Su ................... H04W 72/1289 |
| 2021/0235439 | A1 | 7/2021 | Wong et al. |
| 2021/0274526 | A1* | 9/2021 | Shin ..................... H04W 76/27 |
| 2021/0298108 | A1* | 9/2021 | Wu ..................... H04W 56/0045 |
| 2021/0345395 | A1* | 11/2021 | Chatterjee ............. H04W 76/27 |
| 2021/0352690 | A1* | 11/2021 | Shin ..................... H04L 1/1896 |
| 2022/0015089 | A1* | 1/2022 | Shin ................... H04W 52/262 |

OTHER PUBLICATIONS

Intel Corporation: "HARQ Process for PUR Transmission in Idle Mode", 3GPP Draft; R2-1903665 HARQ Process IND-PUR, 3rd Generation Partnership Project (3GPP), Mobile Competence Centre, 650, Route Des Lucioles, F-06921 Sophia-Antipolis Cedex, France, vol. RAN WG2, No. Xian, China, Apr. 8-Apr. 12, 2019, Apr. 6, 2019 (Apr. 6, 2019), XP051701006, 5 pages, Retrieved from the Internet: URL: http://www.3gpp.org/ftp/Meetings%5F3GPP% 5FSYNC/RAN2/Docs/R2%2D1903665%2Ezip. [retrieved on Apr. 6, 2019] section 1 section 2, "D-PUR retransmission timer".
International Search Report and Written Opinion—PCT/US2020/ 031221—ISA/EPO—dated Aug. 13, 2020.
Qualcomm Incorporated: "Support for Transmission in preconfigured UL Resources", 3GPP TSG RAN WG1 Meeting #98b, 3GPP Draft; R1-1910717 PUR_EMTC_R198BIS, 3rd Generation Partnership Project (3GPP), Mobile Competence Centre; 650, Route Des Lucioles; F-06921 Sophia-Antipolis Cedex ; FRANCE, vol. Ran WG1, No. Chongqing, China; Oct. 14-Oct. 20, 2019, Oct. 5, 2019 (Oct. 5, 2019), pp. 1-10, XP051808664, Retrieved from the Internet: URL: https://ftp.3gpp.org/tsg_ran/WG1_RL1/TSGR1_98b/Docs/R1-1910717. zip R1-1910717PUR_eMTC_R198bis.docx [retrieved on Oct. 5, 2019], Section 5.
Sierra Wireless: "LTE-M Preconfigured UL Resources Summary RAN1 #96", 3GPP Draft, 3GPP TSG RAN WG1 #96, R1-1903248, PUR Summary RAN1 #96, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25-Mar. 1, 2019, Feb. 26, 2019 (Feb. 26, 2019), XP051600945, 10 pages, Retrieved from the Internet: URL: http://www.3gpp.org/ftp/tsg%5Fran/WG1%5FRL1/TSGR1%5F96/ Docs/R1%2D1903248%2Ezip. [retrieved on Feb. 26, 2019] section 1.1 section 3.4.
Sierra Wireless: "LTE-M Pre-configured UL Resources Design Considerations", 3GPP TSG RAN WG1 Meeting #96, 3GPP Draft; R1-1901628 LTE-M PUR, 3rd Generation Partnership Project (3GPP), Mobile Competence Centre; 650, Route Des Lucioles; F-06921 Sophia-Anti Polis Cedex ; France, vol. RAN WG1, No. Athens, Greece; Feb. 25-Mar. 3, 2019, Feb. 15, 2019 (Feb. 15, 2019), 14 Pages, XP051599325, Retrieved from the Internet: URL: http:// www.3gpp.org/ftp/tsg%5Fran/WG1%5FRL1/TSGR1%5F96/Docs/ R1%2D1901628%2Ezip [retrieved on Feb. 15, 2019], Section 3.4, Section 6; figure 5.
ZTE Corporation., et al., "Remaining Issues for UL Aspects of D-PUR in IDLE", 3GPP Draft, R2-1905642, Remaining Issues for UL Aspects of D-PUR in IDLE, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, May 13-May 17, 2019, May 2, 2019 (May 2, 2019), XP051710000, 7 pages, Retrieved from the Internet: URL: http://www.3gpp.org/ftp/tsg%5Fran/WG2%5FRL2/TSGR2%5F106/ Docs/R2%2D1905642%2Ezip. [retrieved on May 2, 2019] section 2.2-section 2.3; figures 1 (a) , (b).
ZTE Corporation, et al., "Further Consideration on DL Aspects of D-PUR in IDLE," 3GPP Draft, 3GPP TSG-RAN2 meeting#106, R2-1905645, Further Consideration on DL Aspects of D-PUR in IDLE, 3rd Generation Partnership Project (3GPP), Mobile Competence Centre, 650, Route Des Lucioles, F-06921, Sophia-Antipolis Cedex, France, vol. RAN WG2, No. Reno, Nevada, USA, May 13-May 17, 2019, May 2, 2019 (May 2, 2019), XP051710003, 5 pages, Retrieved from the Internet: URL: http://www.3gpp.org/ftp/ tsg%5Fran/WG2%5FRL2/TSGR2%5F106/Docs/R2%2D1905645% 2Ezip [retrieved on May 2, 2019] section 2 .1.1 section 2.2.3 section 2.3.

* cited by examiner

TECHNIQUES FOR WIRELESS COMMUNICATIONS USING PRECONFIGURED UPLINK RESOURCES

CROSS REFERENCE

The present Application for Patent claims the benefit of U.S. Provisional Patent Application No. 62/843,318 by RICO ALVARINO et al., entitled "TECHNIQUES FOR WIRELESS COMMUNICATIONS USING PRECONFIGURED UPLINK RESOURCES," filed May 3, 2019, assigned to the assignee hereof, and expressly incorporated by reference herein.

BACKGROUND

The following relates generally to wireless communications, and more specifically to techniques for wireless communications using preconfigured uplink resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a communication protocol may be associated with a set of modes, where each mode may be associated with types of information available or resources monitored by the UE, a type of mobility control, and other operations. For example, a communication protocol (e.g., LTE, LTE-A, LTE-A Pro, NR) may be associated with an idle mode and a connected mode. In the idle mode, the UE 115 may not monitor a control channel (e.g., except for a limited set of messages such as paging messages), may not have a configured timing advance, may not have a configured radio resource control (RRC) connection, and may perform UE-controlled mobility. In the connected mode, the UE may monitor configuration information (e.g., RRC messages), have a timing advance, monitor a downlink control channel, establish signaling radio bearers (SRBs) or data radio bearers (DRBs), have a configured RRC connection, have networked controlled mobility, or the like. To transition from the idle mode to the connected mode, the UE 115 may perform a connection procedure (e.g., random access procedure). Some communication protocols may have additional states such as an inactive state which may be entered from the connected state and which may operate similarly to the idle state (e.g., UE-controlled mobility, monitoring of limited messaging), while still maintaining properties of an RRC connection set up during the connected state such as SRBs and DRBs (e.g., maintaining information related to an RRC connection but without communicating messages via the maintained SRBs and DRBs). In some cases, it may be desirable to reduce latency by configuring resources, which may be called preconfigured uplink resources, for communication by the UE in the idle mode. However, communication initiated using preconfigured uplink resources may provide challenges for reliable communications between a base station and UE because of the idle mode operation of the UE.

SUMMARY

The described techniques relate to improved methods, systems, devices, and apparatuses that support techniques for wireless communications using preconfigured uplink resources. Generally, the described techniques provide for enhancement of communication features including frequency hopping, an uplink control channel, coverage enhancement, timing advance, uplink power control, reconfiguration, a downlink control channel, a downlink data channel, retransmissions, or subcarrier spacing for a UE in idle mode. The techniques may include determining parameters for frequency hopping including enabling or disabling of frequency hopping, a hopping interval, a frequency offset, or a number of transmission subframes between hopping. The parameters may be determined based on a connected mode configuration, a preconfigured uplink resource configuration (PUR-Config), information received in a system information block (SIB), or information received in a downlink control channel (e.g., in response to an initial grant-free uplink transmission using preconfigured uplink resources).

In some cases, the techniques may include support of timing advance updates in grants for retransmissions. For example, the techniques may include not accumulating timing advance values received for retransmissions or modifying a delay time between receiving a grant for the retransmission and the retransmission. In some cases, the techniques may include increasing or modifying interpretation of a power control command received in a grant for retransmissions of the initial grant-free uplink transmission using preconfigured uplink resources. In some cases, the techniques may include determining a number of repetitions for an initial grant-free uplink transmission using preconfigured uplink resources, retransmissions of the initial uplink transmission, or downlink transmissions received in response to the initial uplink transmission. For example, a correspondence may be determined between a number of repetitions for the initial transmission and number of repetitions indicated in downlink control information for downlink transmissions or uplink transmissions.

In some cases, a set of configurations for preconfigured uplink resources (e.g., multiple PUR-Configs) may be configured for the UE (e.g., while in connected mode), and selection of an active configuration may be indicated by a base station (e.g., in downlink control information in response to the initial transmission). In some cases, support for optional features such as an enhanced transport block size (TBS), a modulation and coding scheme (MCS), an enhanced bandwidth, sub-physical resource block (PRB) allocation, or flexible resource allocation for the uplink communications in the idle mode may be indicated by the UE. In some cases, communication parameters for downlink communications in the idle mode (e.g., in response to an initial grant-free uplink transmission using preconfigured uplink resources) may be determined based on a connected mode configuration, a PUR-Config, information received in a SIB, or information received in a downlink control channel. In some cases, communication parameters for an uplink control channel for the idle mode may be configured based on a connected mode configuration, a PUR-Config, information received in a SIB, or information received in a downlink control channel. In some cases, subcarrier spacing for transmissions in the idle mode may be based on a connected mode configuration (e.g., the configuration for a carrier or active bandwidth part at a time that the PUR-Config is received) or the PUR-Config.

A method of wireless communications at a UE is described. The method may include receiving an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a coverage enhancement (CE) mode indicator, a repetition level indicator, or a subcarrier spacing for the uplink communications, transmitting, while in the idle mode, a first uplink transmission associated with a transport block on the allocated resources and according to one or more of the set of parameters, and monitoring for a response to the first uplink transmission.

An apparatus for wireless communications at a UE is described. The apparatus may include a processor, memory in electronic communication with the processor, and instructions stored in the memory. The instructions may be executable by the processor to cause the apparatus to receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, transmit, while in the idle mode, a first uplink transmission associated with a transport block on the allocated resources and according to one or more of the set of parameters, and monitor for a response to the first uplink transmission.

Another apparatus for wireless communications at a UE is described. The apparatus may include means for receiving an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, transmitting, while in the idle mode, a first uplink transmission associated with a transport block on the allocated resources and according to one or more of the set of parameters, and monitoring for a response to the first uplink transmission.

A non-transitory computer-readable medium storing code for wireless communications at a UE is described. The code may include instructions executable by a processor to receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, transmit, while in the idle mode, a first uplink transmission associated with a transport block on the allocated resources and according to one or more of the set of parameters, and monitor for a response to the first uplink transmission.

In some examples of the method, apparatuses, and non-transitory computer-readable medium described herein, the frequency hopping indicator indicates whether frequency hopping may be enabled for the first uplink transmission, and the first uplink transmission may be transmitted according to the frequency hopping indicator.

Some examples of the method, apparatuses, and non-transitory computer-readable medium described herein may further include operations, features, means, or instructions for receiving a system information message including a first frequency hopping configuration for a first CE mode with a first frequency hopping interval and a second frequency hopping configuration for a second CE mode with a second frequency hopping interval, where the first frequency hopping interval may be different than the second frequency hopping interval.

Some examples of the method, apparatuses, and non-transitory computer-readable medium described herein may further include operations, features, means, or instructions for transmitting the first uplink transmission according to the first frequency hopping configuration for the first CE mode using the first frequency hopping interval based on a default CE mode for the UE in the idle mode.

Some examples of the method, apparatuses, and non-transitory computer-readable medium described herein may further include operations, features, means, or instructions for transmitting the first uplink transmission according to the first frequency hopping configuration for the first CE mode using the first frequency hopping interval based on the CE mode indicator.

Some examples of the method, apparatuses, and non-transitory computer-readable medium described herein may further include operations, features, means, or instructions for transmitting the first uplink transmission according to the second frequency hopping configuration for the second CE mode using the second frequency hopping interval based on the repetition level indicator indicating a number of repetitions for the first uplink transmission satisfying a threshold number of repetitions.

Some examples of the method, apparatuses, and non-transitory computer-readable medium described herein may further include operations, features, means, or instructions for transmitting the first uplink transmission according to the first frequency hopping configuration for the first CE mode using the first frequency hopping interval based on identifying that the UE was configured for the first CE mode at a time that the UE received the uplink resource configuration.

In some examples of the method, apparatuses, and non-transitory computer-readable medium described herein, the uplink resource configuration includes a frequency hopping configuration for the uplink communications indicating a frequency offset or a number of transmission subframes for the frequency hopping.

Some examples of the method, apparatuses, and non-transitory computer-readable medium described herein may further include operations, features, means, or instructions for receiving a system information message, the system information message including a frequency hopping configuration indicating a frequency offset and a number of transmission subframes for the frequency hopping.

Some examples of the method, apparatuses, and non-transitory computer-readable medium described herein may further include operations, features, means, or instructions for transmitting a capability message including an indication of a UE capability to support frequency hopping for the uplink communications in the connected mode and the uplink communications in the idle mode.

Some examples of the method, apparatuses, and non-transitory computer-readable medium described herein may further include operations, features, means, or instructions for transmitting a capability message including a first indication of a UE capability to support frequency hopping for the uplink communications in the connected mode and a second indication of a UE capability to support frequency hopping for the uplink communications in the idle mode.

In some examples of the method, apparatuses, and non-transitory computer-readable medium described herein, the second indication includes a single capability indication of whether the UE supports frequency hopping for all channels.

In some examples of the method, apparatuses, and non-transitory computer-readable medium described herein, the second indication includes a downlink capability indication indicating whether the UE supports frequency hopping for downlink channels and an uplink capability indication indicating whether the UE supports frequency hopping for uplink channels.

In some examples of the method, apparatuses, and non-transitory computer-readable medium described herein, the second indication includes a set of capability indications of whether the UE supports frequency hopping for a set of corresponding channels.

Some examples of the method, apparatuses, and non-transitory computer-readable medium described herein may further include operations, features, means, or instructions for receiving the response to the first uplink transmission, the response including a grant for one or more retransmissions of the first uplink transmission, and transmitting a second uplink transmission associated with the transport block based on the grant.

In some examples of the method, apparatuses, and non-transitory computer-readable medium described herein, the uplink resource configuration includes a first frequency hopping indicator that indicates whether frequency hopping may be enabled for the first uplink transmission and for the one or more retransmissions of the first uplink transmission, and the second uplink transmission may be transmitted according to the first frequency hopping indicator.

In some examples of the method, apparatuses, and non-transitory computer-readable medium described herein, the uplink resource configuration includes a first frequency hopping indicator that indicates whether frequency hopping may be enabled for the first uplink transmission and a second frequency hopping indicator that indicates whether frequency hopping may be enabled for the one or more retransmissions of the first uplink transmission, and the second uplink transmission may be transmitted according to the second frequency hopping indicator.

In some examples of the method, apparatuses, and non-transitory computer-readable medium described herein, the grant for one or more retransmissions of the first uplink transmission includes a second frequency hopping indicator that indicates whether frequency hopping may be enabled for the one or more retransmissions of the first uplink transmission, and the one or more retransmissions of the first uplink transmission may be transmitted according to the second frequency hopping indicator.

In some examples of the method, apparatuses, and non-transitory computer-readable medium described herein, the grant for one or more retransmissions of the first uplink transmission includes a second frequency hopping indicator that indicates whether frequency hopping may be enabled for the one or more retransmissions of the first uplink transmission, and the second uplink transmission may be transmitted according to the frequency hopping indicator and the second frequency hopping indicator.

In some examples of the method, apparatuses, and non-transitory computer-readable medium described herein, the grant for the one or more retransmissions of the first uplink transmission includes a first timing advance command indicating a first timing advance to be applied for the one or more retransmissions of the first uplink transmission, where transmitting the second uplink transmission may be based on the first timing advance.

Some examples of the method, apparatuses, and non-transitory computer-readable medium described herein may further include operations, features, means, or instructions for receiving a second response to the second uplink transmission, the second response including a second grant for one or more second retransmissions of the first uplink transmission, where the second grant includes a second timing advance command indicating a second timing advance to be applied for the one or more second retransmissions of the first uplink transmission, and transmitting a third uplink transmission based on the second timing advance.

Some examples of the method, apparatuses, and non-transitory computer-readable medium described herein may further include operations, features, means, or instructions for determining a delay time between receiving the grant and transmitting the second uplink transmission based on a presence of the first timing advance command in the grant.

Some examples of the method, apparatuses, and non-transitory computer-readable medium described herein may further include operations, features, means, or instructions for determining a second delay time between receiving the grant and transmitting the second uplink transmission, where the second delay time may be different than the first delay time.

In some examples of the method, apparatuses, and non-transitory computer-readable medium described herein, the grant for the one or more retransmissions of the first uplink transmission includes a power control command indicating an adjustment to an uplink transmission power for the one or more retransmissions of the first uplink transmission, and where transmitting the second uplink transmission may be based on the indicated adjustment to the uplink transmission power, and where a correspondence between the power control command and the adjustment to the uplink transmission power for the one or more retransmissions of the first uplink transmission may be different from a correspondence between power control commands and uplink transmission power adjustments for the connected mode.

In some examples of the method, apparatuses, and non-transitory computer-readable medium described herein, the grant for the one or more retransmissions of the first uplink transmission includes a repetition indicator that indicates a number of repetitions for transmitting the one or more retransmissions of the first uplink transmission, where the second uplink transmission may be transmitted in accordance with the indicated number of repetitions.

In some examples of the method, apparatuses, and non-transitory computer-readable medium described herein, the uplink resource configuration includes an indicator of a correspondence between a value for the repetition indicator and the number of repetitions indicated by the repetition indicator.

In some examples of the method, apparatuses, and non-transitory computer-readable medium described herein, the indicator of the correspondence between the value for the repetition indicator and the number of repetitions indicated by the repetition indicator includes a maximum a number of repetitions for transmitting the one or more retransmissions of the first uplink transmission.

In some examples of the method, apparatuses, and non-transitory computer-readable medium described herein, the number of repetitions indicated by the repetition indicator may be based on a number of repetitions for the first uplink transmission.

Some examples of the method, apparatuses, and non-transitory computer-readable medium described herein may further include operations, features, means, or instructions for receiving a system information message, the system information message including a first maximum repetition indicator that indicates a maximum number of repetitions for a first CE mode and a second maximum repetition indicator that indicates a maximum number of repetitions for a second CE mode, where the uplink resource configuration includes the CE mode indicator, and where a correspondence between a value for the repetition indicator and the number of repetitions indicated by the repetition indicator may be determined based on one of the first maximum repetition indicator or the second maximum repetition indicator, and where the one of the first maximum repetition indicator or the second maximum repetition indicator may be determined based on the CE mode indicator.

Some examples of the method, apparatuses, and non-transitory computer-readable medium described herein may further include operations, features, means, or instructions for receiving a set of uplink resource configurations for the uplink communications in the idle mode, the set of uplink resource configurations including the uplink resource configuration, and determining an active uplink resource configuration for one or more retransmissions of the first uplink transmission based on an indicator in a downlink control information message received while in the idle mode and the set of uplink resource configurations.

In some examples of the method, apparatuses, and non-transitory computer-readable medium described herein, the set of parameters of the uplink resource configuration may include operations, features, means, or instructions for an enhanced TBS, an MCS, an enhanced bandwidth, sub-PRB allocation, or flexible resource allocation for the uplink communications in the idle mode, and where a set of fields of a downlink control information message received while in the idle mode may be interpreted based on the feature support indication.

Some examples of the method, apparatuses, and non-transitory computer-readable medium described herein may further include operations, features, means, or instructions for transmitting a capability message including a feature capability indication of UE capability support for the enhanced TBS, the MCS, the enhanced bandwidth, the sub-PRB allocation, or the flexible resource allocation for the uplink communications in the idle mode, where the feature support indication may be based on the feature capability indication.

In some examples of the method, apparatuses, and non-transitory computer-readable medium described herein, the uplink resource configuration may be received in a RRC message.

In some examples of the method, apparatuses, and non-transitory computer-readable medium described herein, the first uplink transmission may be transmitted in a physical uplink shared channel (PUSCH).

A method of wireless communications at a UE is described. The method may include receiving a first downlink resource configuration for downlink communications in a connected mode, receiving a second downlink resource configuration for downlink communications in an idle mode, the second downlink resource configuration including a set of parameters including one or more of a frequency hopping indicator or a CE mode indicator for the downlink communications in the idle mode, entering the idle mode, and receiving, while in the idle mode, one or more downlink transmissions according to the first downlink resource configuration or the second downlink resource configuration.

An apparatus for wireless communications at a UE is described. The apparatus may include a processor, memory in electronic communication with the processor, and instructions stored in the memory. The instructions may be executable by the processor to cause the apparatus to receive a first downlink resource configuration for downlink communications in a connected mode, receive a second downlink resource configuration for downlink communications in an idle mode, the second downlink resource configuration including a set of parameters including one or more of a frequency hopping indicator or a CE mode indicator for the downlink communications in the idle mode, enter the idle mode, and receive, while in the idle mode, one or more downlink transmissions according to the first downlink resource configuration or the second downlink resource configuration.

Another apparatus for wireless communications at a UE is described. The apparatus may include means for receiving a first downlink resource configuration for downlink communications in a connected mode, receiving a second downlink resource configuration for downlink communications in an idle mode, the second downlink resource configuration including a set of parameters including one or more of a frequency hopping indicator or a CE mode indicator for the downlink communications in the idle mode, entering the idle mode, and receiving, while in the idle mode, one or more downlink transmissions according to the first downlink resource configuration or the second downlink resource configuration.

A non-transitory computer-readable medium storing code for wireless communications at a UE is described. The code may include instructions executable by a processor to receive a first downlink resource configuration for downlink communications in a connected mode, receive a second downlink resource configuration for downlink communications in an idle mode, the second downlink resource configuration including a set of parameters including one or more of a frequency hopping indicator or a CE mode indicator for the downlink communications in the idle mode, enter the idle mode, and receive, while in the idle mode, one or more downlink transmissions according to the first downlink resource configuration or the second downlink resource configuration.

In some examples of the method, apparatuses, and non-transitory computer-readable medium described herein, the first downlink resource configuration includes a downlink control channel frequency hopping indicator, and where the receiving the one or more downlink transmissions may be performed according to the downlink control channel frequency hopping indicator.

Some examples of the method, apparatuses, and non-transitory computer-readable medium described herein may further include operations, features, means, or instructions for storing a state of a downlink control channel frequency hopping indicator of the first downlink resource configuration when the second downlink resource configuration was received, where the receiving the one or more downlink transmissions may be performed according to the stored state of the downlink control channel frequency hopping indicator.

In some examples of the method, apparatuses, and non-transitory computer-readable medium described herein, receiving the one or more downlink transmissions may include operations, features, means, or instructions for receiving a downlink control channel message including a grant for a downlink shared channel transmission, where the downlink control channel message includes a second frequency hopping indicator, and receiving the downlink shared channel transmission based on the second frequency hopping indicator.

Some examples of the method, apparatuses, and non-transitory computer-readable medium described herein may further include operations, features, means, or instructions for receiving a first set of frequency hopping parameters associated with a first CE mode and a second set of frequency hopping parameters associated with a second CE mode.

In some examples of the method, apparatuses, and non-transitory computer-readable medium described herein, receiving the one or more downlink transmissions may include operations, features, means, or instructions for receiving the one or more downlink transmissions according to the first set of frequency hopping parameters based on the CE mode indicator.

In some examples of the method, apparatuses, and non-transitory computer-readable medium described herein, the first set of frequency hopping parameters include a first number of repetitions for the one or more downlink transmissions and the second set of frequency hopping parameters include a second number of repetitions for the one or more downlink transmissions, and where the receiving may include operations, features, means, or instructions for receiving the one or more downlink transmissions according to the first number of repetitions or the second number of repetitions based on the CE mode indicator.

In some examples of the method, apparatuses, and non-transitory computer-readable medium described herein, receiving the one or more downlink transmissions may include operations, features, means, or instructions for receiving the one or more downlink transmissions according to the second set of frequency hopping parameters based on a number of repetitions of the one or more downlink transmissions satisfying a threshold number of repetitions.

In some examples of the method, apparatuses, and non-transitory computer-readable medium described herein, receiving the one or more downlink transmissions may include operations, features, means, or instructions for receiving the one or more downlink transmissions according to the first set of frequency hopping parameters based on determining that the UE was configured for the first CE mode at a time that the UE received the second downlink resource configuration.

In some examples of the method, apparatuses, and non-transitory computer-readable medium described herein, the frequency hopping indicator includes a first frequency hopping indicator associated with a physical downlink control channel and a second frequency hopping indicator associated with a physical downlink shared channel.

In some examples of the method, apparatuses, and non-transitory computer-readable medium described herein, receiving the one or more downlink transmissions may include operations, features, means, or instructions for receiving a downlink control channel message including a grant for a downlink shared channel transmission, where the downlink control channel message includes a repetition indicator associated with the downlink shared channel transmission, and where the second downlink resource configuration includes an indicator of a correspondence between a value for the repetition indicator and a number of repetitions indicated by the repetition indicator.

In some examples of the method, apparatuses, and non-transitory computer-readable medium described herein, the indicator of the correspondence between the value for the repetition indicator and the number of repetitions indicated by the repetition indicator includes a maximum a number of repetitions for the downlink shared channel transmission.

A method of wireless communications at a UE is described. The method may include receiving an uplink control channel configuration, the uplink control channel configuration including a repetition level indicator and a resource indicator for transmitting uplink control channel transmissions while in an idle mode, transitioning from a connected mode to the idle mode, determining, based on the uplink control channel configuration, a number of repetitions and a set of resources for transmitting an uplink control channel transmission in the idle mode, and transmitting, while in the idle mode, the uplink control channel transmission according to the number of repetitions and the set of resources.

An apparatus for wireless communications at a UE is described. The apparatus may include a processor, memory in electronic communication with the processor, and instructions stored in the memory. The instructions may be executable by the processor to cause the apparatus to receive an uplink control channel configuration, the uplink control channel configuration including a repetition level indicator and a resource indicator for transmitting uplink control channel transmissions while in an idle mode, transition from a connected mode to the idle mode, determine, based on the uplink control channel configuration, a number of repetitions and a set of resources for transmitting an uplink control channel transmission in the idle mode, and transmit, while in the idle mode, the uplink control channel transmission according to the number of repetitions and the set of resources.

Another apparatus for wireless communications at a UE is described. The apparatus may include means for receiving an uplink control channel configuration, the uplink control channel configuration including a repetition level indicator and a resource indicator for transmitting uplink control channel transmissions while in an idle mode, transitioning from a connected mode to the idle mode, determining, based on the uplink control channel configuration, a number of repetitions and a set of resources for transmitting an uplink control channel transmission in the idle mode, and transmitting, while in the idle mode, the uplink control channel transmission according to the number of repetitions and the set of resources.

A non-transitory computer-readable medium storing code for wireless communications at a UE is described. The code may include instructions executable by a processor to receive an uplink control channel configuration, the uplink control channel configuration including a repetition level indicator and a resource indicator for transmitting uplink control channel transmissions while in an idle mode, transition from a connected mode to the idle mode, determine, based on the uplink control channel configuration, a number of repetitions and a set of resources for transmitting an uplink control channel transmission in the idle mode, and transmit, while in the idle mode, the uplink control channel transmission according to the number of repetitions and the set of resources.

Some examples of the method, apparatuses, and non-transitory computer-readable medium described herein may further include operations, features, means, or instructions for receiving an indication of a CE level for the UE, where determining the number of repetitions and the set of resources to transmit the uplink control channel transmission may be based on the CE level.

In some examples of the method, apparatuses, and non-transitory computer-readable medium described herein, the repetition level indicator may include operations, features, means, or instructions for determining the number of repetitions for the uplink control channel transmission based on a CE mode for the uplink control channel transmission.

Some examples of the method, apparatuses, and non-transitory computer-readable medium described herein may further include operations, features, means, or instructions for receiving a CE mode indicator indicating the CE mode for the uplink control channel transmission.

Some examples of the method, apparatuses, and non-transitory computer-readable medium described herein may further include operations, features, means, or instructions for determining the CE mode for the uplink control channel transmission based on a number of repetitions of a downlink transmission.

In some examples of the method, apparatuses, and non-transitory computer-readable medium described herein, the uplink control channel configuration may be received in a RRC message.

In some examples of the method, apparatuses, and non-transitory computer-readable medium described herein, the uplink control channel transmission includes a HARQ message, an acknowledgement (ACK) message, or a combination thereof.

A method of wireless communications at a base station is described. The method may include transmitting, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receiving, from the UE subsequent to the UE transitioning from the connected mode to the idle mode, a first uplink transmission associated with a transport block on the allocated resources and according to the uplink resource configuration, determining whether the first uplink transmission was successfully received, and transmitting a response to the first uplink transmission based on whether the first uplink transmission was successfully received.

An apparatus for wireless communications at a base station is described. The apparatus may include a processor, memory in electronic communication with the processor, and instructions stored in the memory. The instructions may be executable by the processor to cause the apparatus to transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receive, from the UE subsequent to the UE transitioning from the connected mode to the idle mode, a first uplink transmission associated with a transport block on the allocated resources and according to the uplink resource configuration, determine whether the first uplink transmission was successfully received, and transmit a response to the first uplink transmission based on whether the first uplink transmission was successfully received.

Another apparatus for wireless communications at a base station is described. The apparatus may include means for transmitting, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receiving, from the UE subsequent to the UE transitioning from the connected mode to the idle mode, a first uplink transmission associated with a transport block on the allocated resources and according to the uplink resource configuration, determining whether the first uplink transmission was successfully received, and transmitting a response to the first uplink transmission based on whether the first uplink transmission was successfully received.

A non-transitory computer-readable medium storing code for wireless communications at a base station is described. The code may include instructions executable by a processor to transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receive, from the UE subsequent to the UE transitioning from the connected mode to the idle mode, a first uplink transmission associated with a transport block on the allocated resources and according to the uplink resource configuration, determine whether the first uplink transmission was successfully received, and transmit a response to the first uplink transmission based on whether the first uplink transmission was successfully received.

In some examples of the method, apparatuses, and non-transitory computer-readable medium described herein, the frequency hopping indicator indicates whether frequency hopping may be enabled for the first uplink transmission, and the first uplink transmission may be received according to the frequency hopping indicator.

Some examples of the method, apparatuses, and non-transitory computer-readable medium described herein may further include operations, features, means, or instructions for transmitting a system information message including a first frequency hopping configuration for a first CE mode with a first frequency hopping interval and a second frequency hopping configuration for a second CE mode with a second frequency hopping interval, where the first frequency hopping interval may be different than the second frequency hopping interval.

Some examples of the method, apparatuses, and non-transitory computer-readable medium described herein may further include operations, features, means, or instructions for receiving the first uplink transmission according to the first frequency hopping configuration for the first CE mode using the first frequency hopping interval based on a default CE mode for the UE in the idle mode.

Some examples of the method, apparatuses, and non-transitory computer-readable medium described herein may further include operations, features, means, or instructions for receiving the first uplink transmission according to the first frequency hopping configuration for the first CE mode using the first frequency hopping interval based on the CE mode indicator.

Some examples of the method, apparatuses, and non-transitory computer-readable medium described herein may further include operations, features, means, or instructions for receiving the first uplink transmission according to the second frequency hopping configuration for the second CE mode using the second frequency hopping interval based on the repetition level indicator indicating a number of repetitions for the first uplink transmission satisfying a threshold number of repetitions.

Some examples of the method, apparatuses, and non-transitory computer-readable medium described herein may further include operations, features, means, or instructions for receiving the first uplink transmission according to the first frequency hopping configuration for the first CE mode using the first frequency hopping interval based on identifying that the UE was configured for the first CE mode at a time that the UE received the uplink resource configuration.

In some examples of the method, apparatuses, and non-transitory computer-readable medium described herein, the uplink resource configuration includes a frequency hopping configuration for the uplink communications indicating a frequency offset or a number of transmission subframes for the frequency hopping.

Some examples of the method, apparatuses, and non-transitory computer-readable medium described herein may further include operations, features, means, or instructions for transmitting a system information message, the system information message including a frequency hopping configuration indicating a frequency offset and a number of transmission subframes for the frequency hopping.

Some examples of the method, apparatuses, and non-transitory computer-readable medium described herein may further include operations, features, means, or instructions for receiving a capability message including an indication of a UE capability to support frequency hopping for the uplink communications in the connected mode and the uplink communications in the idle mode, where the frequency hopping indicator may be based on the UE capability to support frequency hopping.

Some examples of the method, apparatuses, and non-transitory computer-readable medium described herein may further include operations, features, means, or instructions for receiving a capability message including a first indicator of a UE capability to support frequency hopping for the uplink communications in the connected mode and a second indicator of a UE capability to support frequency hopping for the uplink communications in the idle mode, where the frequency hopping indicator may be based on the UE capability to support frequency hopping for the uplink communications in the idle mode.

In some examples of the method, apparatuses, and non-transitory computer-readable medium described herein, the second indicator includes a single capability indicator of whether the UE supports frequency hopping for all channels.

In some examples of the method, apparatuses, and non-transitory computer-readable medium described herein, the second indicator includes a downlink capability indicator indicating whether the UE supports frequency hopping for downlink channels and an uplink capability indicator indicating whether the UE supports frequency hopping for uplink channels.

In some examples of the method, apparatuses, and non-transitory computer-readable medium described herein, the second indication includes a set of capability indicators of whether the UE supports frequency hopping for a set of corresponding channels.

Some examples of the method, apparatuses, and non-transitory computer-readable medium described herein may further include operations, features, means, or instructions for determining that the first uplink transmission was not successfully received, transmitting, in the response to the first uplink transmission, a grant for one or more retransmissions of the first uplink transmission, and receiving a second uplink transmission associated with the transport block based on the grant.

In some examples of the method, apparatuses, and non-transitory computer-readable medium described herein, the uplink resource configuration includes a first frequency hopping indicator that indicates whether frequency hopping may be enabled for the first uplink transmission and for the one or more retransmissions of the first uplink transmission, and the second uplink transmission may be received according to the first frequency hopping indicator.

In some examples of the method, apparatuses, and non-transitory computer-readable medium described herein, the uplink resource configuration includes a first frequency hopping indicator that indicates whether frequency hopping may be enabled for the first uplink transmission and a second frequency hopping indicator that indicates whether frequency hopping may be enabled for the one or more retransmissions of the first uplink transmission, and the second uplink transmission may be received according to the second frequency hopping indicator.

In some examples of the method, apparatuses, and non-transitory computer-readable medium described herein, the grant for one or more retransmissions of the first uplink transmission includes a second frequency hopping indicator that indicates whether frequency hopping may be enabled for the one or more retransmissions of the first uplink transmission, and the one or more retransmissions of the first uplink transmission may be received according to the second frequency hopping indicator.

In some examples of the method, apparatuses, and non-transitory computer-readable medium described herein, the grant for one or more retransmissions of the first uplink transmission includes a second frequency hopping indicator that indicates whether frequency hopping may be enabled for the one or more retransmissions of the first uplink transmission, and the second uplink transmission may be received according to the frequency hopping indicator and the second frequency hopping indicator.

In some examples of the method, apparatuses, and non-transitory computer-readable medium described herein, the grant for the one or more retransmissions of the first uplink transmission includes a first timing advance command indicating a first timing advance to be applied for the one or more retransmissions of the first uplink transmission, where receiving the second uplink transmission may be based on the first timing advance.

Some examples of the method, apparatuses, and non-transitory computer-readable medium described herein may further include operations, features, means, or instructions for transmitting a second response to the second uplink transmission, the second response including a second grant for one or more second retransmissions of the first uplink transmission, where the second grant includes a second timing advance command indicating a second timing advance to be applied for the one or more second retransmissions of the first uplink transmission, and receiving a third uplink transmission based on the second timing advance.

In some examples of the method, apparatuses, and non-transitory computer-readable medium described herein, a delay time between transmitting the grant and receiving the second uplink transmission may be based on a presence of the first timing advance command in the grant.

In some examples of the method, apparatuses, and non-transitory computer-readable medium described herein, a first delay time between transmitting grants and receiving uplink transmissions may be configured for uplink transmissions in the connected mode, and a second delay time between transmitting the grant and receiving the second uplink transmission, where the second delay time may be different than the first delay time.

In some examples of the method, apparatuses, and non-transitory computer-readable medium described herein, the grant for the one or more retransmissions of the first uplink transmission includes a power control command indicating an adjustment to an uplink transmission power for the one or more retransmissions of the first uplink transmission, and where receiving the second uplink transmission may be based on the indicated adjustment to the uplink transmission power, and where a correspondence between the power control command and the adjustment to the uplink transmission power for the one or more retransmissions of the first uplink transmission may be different from a correspondence between power control commands and uplink transmission power adjustments for the connected mode.

In some examples of the method, apparatuses, and non-transitory computer-readable medium described herein, the grant for the one or more retransmissions of the first uplink transmission includes a repetition indicator that indicates a number of repetitions for the UE to transmit the one or more retransmissions of the first uplink transmission, where the second uplink transmission may be received in accordance with the indicated number of repetitions.

In some examples of the method, apparatuses, and non-transitory computer-readable medium described herein, the uplink resource configuration includes an indicator of a correspondence between a value for the repetition indicator and the number of repetitions indicated by the repetition indicator.

In some examples of the method, apparatuses, and non-transitory computer-readable medium described herein, the indicator of the correspondence between the value for the repetition indicator and the number of repetitions indicated by the repetition indicator includes a maximum a number of repetitions for the UE to transmit the one or more retransmissions of the first uplink transmission.

In some examples of the method, apparatuses, and non-transitory computer-readable medium described herein, the number of repetitions indicated by the repetition indicator may be based on a number of repetitions for the first uplink transmission.

Some examples of the method, apparatuses, and non-transitory computer-readable medium described herein may further include operations, features, means, or instructions for transmitting a system information message, the system information message including a first maximum repetition indicator that indicates a maximum number of repetitions for a first CE mode and a second maximum repetition indicator that indicates a maximum number of repetitions for a second CE mode, where the uplink resource configuration includes the CE mode indicator, and where a correspondence between a value for the repetition indicator and the number of repetitions indicated by the repetition indicator may be determined based on the first maximum repetition indicator, the second maximum repetition indicator, and the CE mode indicator.

Some examples of the method, apparatuses, and non-transitory computer-readable medium described herein may further include operations, features, means, or instructions for transmitting a set of uplink resource configurations for the uplink communications in the idle mode, the set of uplink resource configurations including the uplink resource configuration, and transmitting, while the UE may be in the idle mode, an indicator in a downlink control information message of an active uplink resource configuration for one or more retransmissions of the first uplink transmission.

In some examples of the method, apparatuses, and non-transitory computer-readable medium described herein, the set of parameters of the uplink resource configuration may include operations, features, means, or instructions for an enhanced TBS, an MCS, an enhanced bandwidth, sub-PRB allocation, or flexible resource allocation for the uplink communications in the idle mode, and where a set of fields of a downlink control information message transmitted while the UE may be in the idle mode may be interpreted based on the feature support indication.

Some examples of the method, apparatuses, and non-transitory computer-readable medium described herein may further include operations, features, means, or instructions for receiving a capability message including a feature capability indication of UE capability support for the enhanced TBS, the MCS, the enhanced bandwidth, the sub-PRB allocation, or the flexible resource allocation for the uplink communications in the idle mode, where the feature support indication may be based on the feature capability indication.

In some examples of the method, apparatuses, and non-transitory computer-readable medium described herein, the uplink resource configuration may be received in a RRC message.

In some examples of the method, apparatuses, and non-transitory computer-readable medium described herein, the first uplink transmission may be transmitted in a PUSCH.

A method of wireless communications at a base station is described. The method may include transmitting, to a UE, a first downlink resource configuration for downlink communications to the UE in a connected mode, transmitting, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmitting, subsequent to the UE transitioning from the connected mode to the idle mode, one or more downlink transmissions according to the first downlink resource configuration or the second downlink resource configuration.

An apparatus for wireless communications at a base station is described. The apparatus may include a processor, memory in electronic communication with the processor, and instructions stored in the memory. The instructions may be executable by the processor to cause the apparatus to transmit, to a UE, a first downlink resource configuration for downlink communications to the UE in a connected mode, transmit, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmit, subsequent to the UE transitioning from the connected mode to the idle mode, one or more downlink transmissions according to the first downlink resource configuration or the second downlink resource configuration.

Another apparatus for wireless communications at a base station is described. The apparatus may include means for transmitting, to a UE, a first downlink resource configuration for downlink communications to the UE in a connected mode, transmitting, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmitting, subsequent to the UE transitioning from the connected mode to the idle mode, one or more downlink transmissions according to the first downlink resource configuration or the second downlink resource configuration.

A non-transitory computer-readable medium storing code for wireless communications at a base station is described. The code may include instructions executable by a processor to transmit, to a UE, a first downlink resource configuration for downlink communications to the UE in a connected mode, transmit, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmit, subsequent to the UE transitioning from the connected mode to the idle mode, one or more downlink transmissions according to the first downlink resource configuration or the second downlink resource configuration.

In some examples of the method, apparatuses, and non-transitory computer-readable medium described herein, the first downlink resource configuration includes a downlink control channel frequency hopping indicator, and where the transmitting the one or more downlink transmissions may be performed according to the downlink control channel frequency hopping indicator.

Some examples of the method, apparatuses, and non-transitory computer-readable medium described herein may further include operations, features, means, or instructions for storing a state of a downlink control channel frequency hopping indicator of the first downlink resource configuration when the second downlink resource configuration was transmitted to the UE, where the transmitting the one or more downlink transmissions may be performed according to the stored state of the downlink control channel frequency hopping indicator.

In some examples of the method, apparatuses, and non-transitory computer-readable medium described herein, transmitting the one or more downlink transmissions may include operations, features, means, or instructions for transmitting a downlink control channel message including a grant for a downlink shared channel transmission, where the downlink control channel message includes a second frequency hopping indicator, and transmitting the downlink shared channel transmission based on the second frequency hopping indicator.

Some examples of the method, apparatuses, and non-transitory computer-readable medium described herein may further include operations, features, means, or instructions for transmitting a first set of frequency hopping parameters associated with a first CE mode and a second set of frequency hopping parameters associated with a second CE mode.

In some examples of the method, apparatuses, and non-transitory computer-readable medium described herein, transmitting the one or more downlink transmissions may include operations, features, means, or instructions for transmitting the one or more downlink transmissions according to the first set of frequency hopping parameters based on the CE mode indicator.

In some examples of the method, apparatuses, and non-transitory computer-readable medium described herein, the first set of frequency hopping parameters include a first number of repetitions for the one or more downlink transmissions and the second set of frequency hopping parameters include a second number of repetitions for the one or more downlink transmissions, and where the transmitting may include operations, features, means, or instructions for transmitting the one or more downlink transmissions according to the first number of repetitions or the second number of repetitions based on the CE mode indicator.

In some examples of the method, apparatuses, and non-transitory computer-readable medium described herein, transmitting the one or more downlink transmissions may include operations, features, means, or instructions for transmitting the one or more downlink transmissions according to the second set of frequency hopping parameters based on a number of repetitions of the one or more downlink transmissions satisfying a threshold number of repetitions.

In some examples of the method, apparatuses, and non-transitory computer-readable medium described herein, transmitting the one or more downlink transmissions may include operations, features, means, or instructions for transmitting the one or more downlink transmissions according to the first set of frequency hopping parameters based on determining that the UE was configured for the first CE mode at a time that the UE received the second downlink resource configuration.

In some examples of the method, apparatuses, and non-transitory computer-readable medium described herein, the frequency hopping indicator includes a first frequency hopping indicator associated with a physical downlink control channel and a second frequency hopping indicator associated with a physical downlink shared channel.

In some examples of the method, apparatuses, and non-transitory computer-readable medium described herein, transmitting the one or more downlink transmissions may include operations, features, means, or instructions for transmitting a downlink control channel message including a grant for a downlink shared channel transmission, where the downlink control channel message includes a repetition indicator associated with the downlink shared channel transmission, and where the second downlink resource configuration includes an indicator of a correspondence between a value for the repetition indicator and a number of repetitions indicated by the repetition indicator.

In some examples of the method, apparatuses, and non-transitory computer-readable medium described herein, the indicator of the correspondence between the value for the repetition indicator and the number of repetitions indicated by the repetition indicator includes a maximum a number of repetitions for the downlink shared channel transmission.

A method of wireless communications at a base station is described. The method may include transmitting, to a UE, an uplink control channel configuration, the uplink control channel configuration including a repetition level indicator and a resource indicator for transmitting uplink control channel transmissions while the UE is in an idle mode, determining, based on the uplink control channel configuration, a number of repetitions and a set of resources for receiving an uplink control channel transmission from the UE while the UE is in an idle mode, and receiving, subsequent to the UE transitioning from a connected mode to the idle mode, the uplink control channel transmission according to the number of repetitions and the set of resources.

An apparatus for wireless communications at a base station is described. The apparatus may include a processor, memory in electronic communication with the processor, and instructions stored in the memory. The instructions may be executable by the processor to cause the apparatus to transmit, to a UE, an uplink control channel configuration, the uplink control channel configuration including a repetition level indicator and a resource indicator for transmitting uplink control channel transmissions while the UE is in an idle mode, determine, based on the uplink control channel configuration, a number of repetitions and a set of resources for receiving an uplink control channel transmission from the UE while the UE is in an idle mode, and receive, subsequent to the UE transitioning from a connected mode to the idle mode, the uplink control channel transmission according to the number of repetitions and the set of resources.

Another apparatus for wireless communications at a base station is described. The apparatus may include means for transmitting, to a UE, an uplink control channel configuration, the uplink control channel configuration including a repetition level indicator and a resource indicator for transmitting uplink control channel transmissions while the UE is in an idle mode, determining, based on the uplink control channel configuration, a number of repetitions and a set of resources for receiving an uplink control channel transmission from the UE while the UE is in an idle mode, and receiving, subsequent to the UE transitioning from a connected mode to the idle mode, the uplink control channel transmission according to the number of repetitions and the set of resources.

A non-transitory computer-readable medium storing code for wireless communications at a base station is described. The code may include instructions executable by a processor to transmit, to a UE, an uplink control channel configuration, the uplink control channel configuration including a repetition level indicator and a resource indicator for transmitting uplink control channel transmissions while the UE is in an idle mode, determine, based on the uplink control channel configuration, a number of repetitions and a set of resources for receiving an uplink control channel transmission from the UE while the UE is in an idle mode, and receive, subsequent to the UE transitioning from a connected mode to the idle mode, the uplink control channel transmission according to the number of repetitions and the set of resources.

Some examples of the method, apparatuses, and non-transitory computer-readable medium described herein may further include operations, features, means, or instructions for transmitting an indication of a CE level to the UE, where determining the number of repetitions and the set of resources for receiving the uplink control channel transmission may be based on the CE level.

In some examples of the method, apparatuses, and non-transitory computer-readable medium described herein, the repetition level indicator may include operations, features, means, or instructions for determining the number of repetitions for the uplink control channel transmission based on a CE mode for the uplink control channel transmission.

Some examples of the method, apparatuses, and non-transitory computer-readable medium described herein may further include operations, features, means, or instructions for transmitting a CE mode indicator indicating the CE mode for the uplink control channel transmission.

Some examples of the method, apparatuses, and non-transitory computer-readable medium described herein may further include operations, features, means, or instructions for determining the CE mode for the uplink control channel transmission based on a number of repetitions of a downlink transmission.

In some examples of the method, apparatuses, and non-transitory computer-readable medium described herein, the uplink control channel configuration may be transmitted in a RRC message.

In some examples of the method, apparatuses, and non-transitory computer-readable medium described herein, the uplink control channel transmission includes a HARQ message, an ACK message, or a combination thereof.

DETAILED DESCRIPTION

Figure 1:
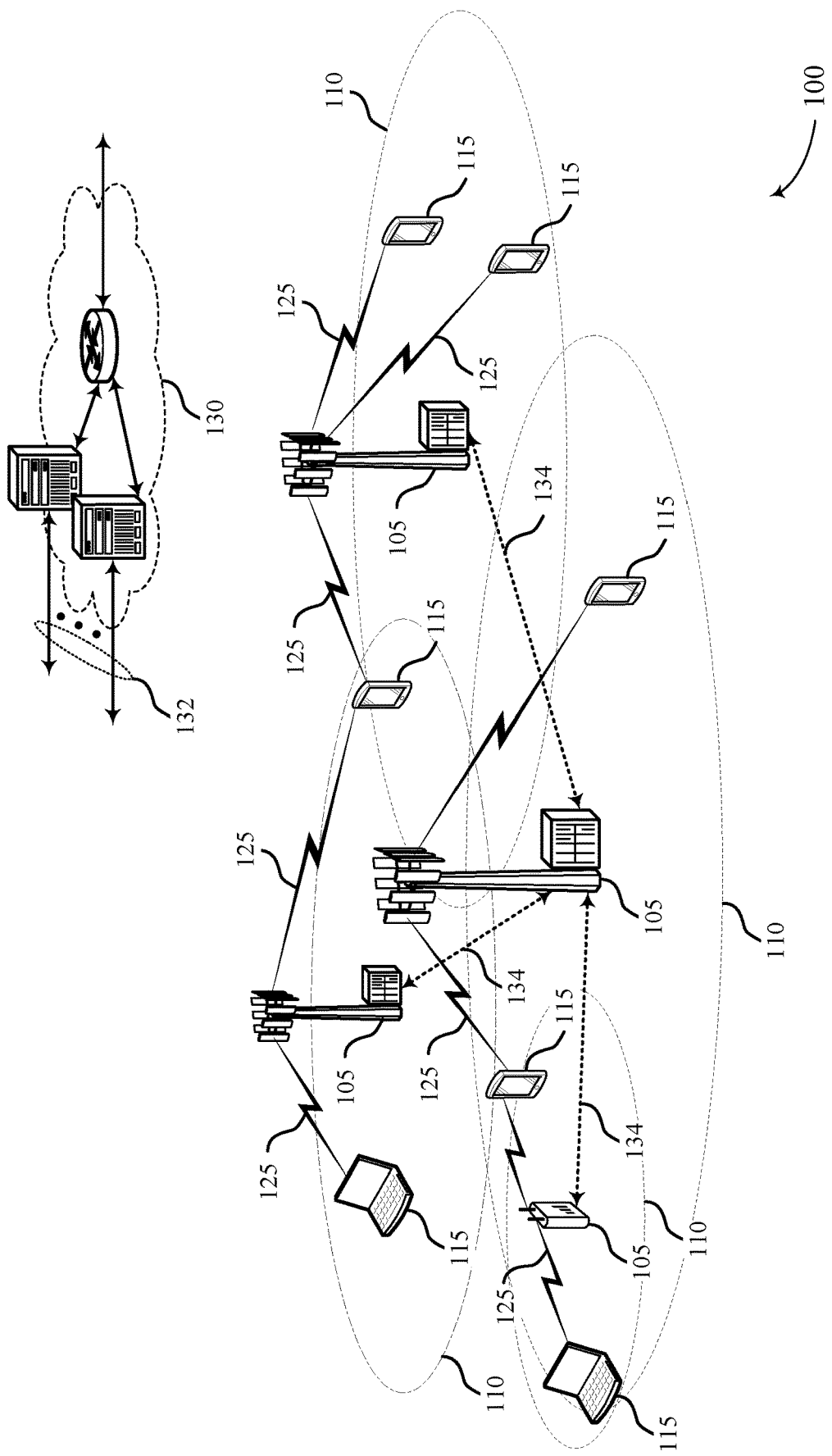
FIG. 1 illustrates an example of a wireless communications system that supports techniques for wireless communications using preconfigured uplink resources in accordance with aspects of the present disclosure.

In some cases, a communication protocol may be associated with a set of modes, where each mode may be associated with types of information or resources available for use by a user equipment (UE), a type of mobility control, and other operations. For example, a communication protocol (e.g., Long Term Evolution (LTE), LTE-Advanced (LTE-A), LTE-A Pro, or New Radio (NR)) may be associated with an idle mode and a connected mode. In the idle mode, the UE 115 may not monitor a control channel (e.g., except for a limited set of messages such as paging messages), may not have a configured timing advance, may not have a configured radio resource control (RRC) connection, and may perform UE-controlled mobility. In the connected mode, the UE may monitor configuration information (e.g., RRC messages), have a timing advance, monitor a downlink control channel, establish signaling radio bearers (SRBs) or data radio bearers (DRBs), have a configured RRC connection, have networked controlled mobility, or the like.

To transition from the idle mode to the connected mode, the UE 115 may perform a connection procedure (e.g., random access procedure). Some communication protocols may have additional states such as an inactive state which may be entered from the connected state and which may operate similarly to the idle state (e.g., UE-controlled mobility, monitoring of limited messaging), while still maintaining properties of an RRC connection set up during the connected state such as SRBs and DRBs (e.g., maintaining information related to an RRC connection but without communicating messages via the maintained SRBs and DRBs). In some cases, it may be desirable to reduce latency by configuring resources, which may be called preconfigured uplink resources (PURs), for communication by the UE in the idle mode. For example, the preconfigured uplink resources may be periodic resources, and the UE may transmit over one or more of the preconfigured uplink resources without performing a random access procedure or receiving a grant. However, because the UE is in idle mode and has torn down context information, such as communication parameters related to frequency hopping, uplink control channel transmissions, coverage enhancement, timing advance, uplink power control, a downlink control channel, a downlink data channel, or subcarrier spacing, application of these features to idle mode communications may be indeterminate.

According to various aspects, the described techniques provide for enhancement of communication features including frequency hopping, an uplink control channel, coverage enhancement, timing advance, uplink power control, reconfiguration, a downlink control channel, a downlink data channel, retransmissions, or subcarrier spacing for a UE in idle mode.

Frequency hopping may be configured for the connected mode using information transmitted in a system information block, with a unicast frequency hopping flag enabling or disabling frequency hopping. In connected mode, frequency hopping may be configured differently for different coverage enhancement (CE) modes. For example, in a CE mode A, the frequency hopping flag may enable a field (e.g., one (1) bit) in downlink control information (DCI) to dynamically turn hopping on or off for the corresponding transmission (e.g., the UE applies hopping if the frequency hopping flag is set to true and the DCI indicates turns hopping on). In a CE mode B, the frequency hopping flag may be followed directly (e.g., there may be no indication in DCI indication, that is if the frequency hopping flag is set to true, the UE may use frequency hopping, otherwise it may not use frequency hopping).

However, upon transitioning from the connected mode to the idle mode, the UE may discard a configuration for the CE mode. Thus, it may be indeterminate whether frequency hopping applies for frequency hopping for a PUSCH transmission for a preconfigured uplink resource transmission, frequency hopping for a PUSCH transmission for one or more retransmissions, frequency hopping for an MTC physical downlink control channel (PDCCH) (MPDCCH) transmission, or frequency hopping for a physical downlink shared channel (PDSCH) transmission that may be communicated as a response to a preconfigured uplink resources transmission. The described techniques may include determining parameters for frequency hopping including enabling or disabling of frequency hopping, a hopping interval, a frequency offset, or a number of transmission subframes between hopping. The parameters may be determined based on a connected mode configuration (e.g., the connected mode configuration for a carrier or active bandwidth part at a time that the PUR-Config is received, or the connected mode configuration before being released to idle mode), a preconfigured uplink resource configuration (PUR-Config), information received in a system information block (SIB), or information received in a downlink control channel (e.g., in response to an initial grant-free uplink transmission using preconfigured uplink resources).

In some cases, a UE may transmit an initial transmission in idle mode using preconfigured uplink resources. However, the UE may not have received an updated timing advance, and thus the timing advance may be incorrect for a new location or channel conditions of the UE. In some cases the base station may not be able to decode the initial transmission because of the incorrect timing advance. In some cases, the techniques may include support of timing advance updates in grants for retransmissions. In some cases, a grant (e.g., DCI) for a retransmission of the initial transmission may include a timing advance. However, if the base station is also unable to detect or decode the retransmission, the base station may send an additional grant also with the timing advance. However, if the UE received the initial grant and the additional grant, the UE may overcorrect the timing advance by accumulating the timing advance correction more than once. In some examples, the UE may not accumulate timing advance values received for retransmissions. In addition, a processing delay between a grant and an uplink transmission for connected mode may be insufficient for a UE to apply a timing advance or timing advance update in the grant. In some examples, the UE may modify a delay time between receiving the grant for the retransmission and the retransmission. In some cases the modified delay may be applied for all retransmissions. Alternatively, the modified delay may be applied where the timing advance command is present or is not a null value.

In some cases, the techniques may include increasing the number of bits or modifying interpretation of a power control command received in a grant for retransmissions of the initial grant-free uplink transmission using preconfigured uplink resources. For example, a power control command in a grant (e.g., DCI) for a retransmission of the initial grant-free uplink transmission may include increased resolution (e.g., more bits than a power control command for the connected mode), or interpretation of the power control command may be different (e.g., the range of values for the power control command may be wider).

In some cases, the techniques may include determining a number of repetitions for an initial grant-free uplink transmission using preconfigured uplink resources, retransmissions of the initial uplink transmission, or downlink transmissions received in response to the initial uplink transmission. In some cases, the number of repetitions for the initial grant-free uplink transmission may be signaled in PUR-Config. In some cases, a correspondence may be determined between a number of repetitions for the initial transmission and number of repetitions indicated in downlink control information for downlink transmissions or uplink transmissions.

In some cases, a set of configurations for preconfigured uplink resources (e.g., multiple PUR-Configs) may be configured for the UE (e.g., while in connected mode), and selection of an active configuration may be indicated by a base station (e.g., in downlink control information in response to the initial transmission).

In some cases, support for optional features such as an enhanced transport block size (TBS), a modulation and coding scheme (MCS), an enhanced bandwidth, sub-physical resource block (PRB) allocation, or flexible resource allocation for the uplink communications in the idle mode may be indicated by the UE. In some cases, communication parameters for downlink communications in the idle mode (e.g., in response to an initial grant-free uplink transmission using preconfigured uplink resources) may be determined based on a connected mode configuration (e.g., the connected mode configuration for a carrier or active bandwidth part at a time that the PUR-Config is received, or the connected mode configuration before being released to idle mode), a PUR-Config, information received in a SIB, or information received in a downlink control channel. In some cases, communication parameters for an uplink control channel for the idle mode may be configured based on a connected mode configuration (e.g., the configuration for a carrier or active bandwidth part at a time that the PUR-Config is received), a PUR-Config, information received in a SIB, or information received in a downlink control channel. In some cases, subcarrier spacing for transmissions in the idle mode may be based on a connected mode configuration (e.g., the configuration for a carrier or active bandwidth part at a time that the PUR-Config is received) or the PUR-Config.

Aspects of the disclosure are initially described in the context of a wireless communications system. Aspects of the disclosure are further illustrated by and described with reference to apparatus diagrams, system diagrams, and flowcharts that relate to techniques for wireless communications using preconfigured uplink resources.

FIG. 1 illustrates an example of a wireless communications system 100 that supports techniques for wireless communications using preconfigured uplink resources in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
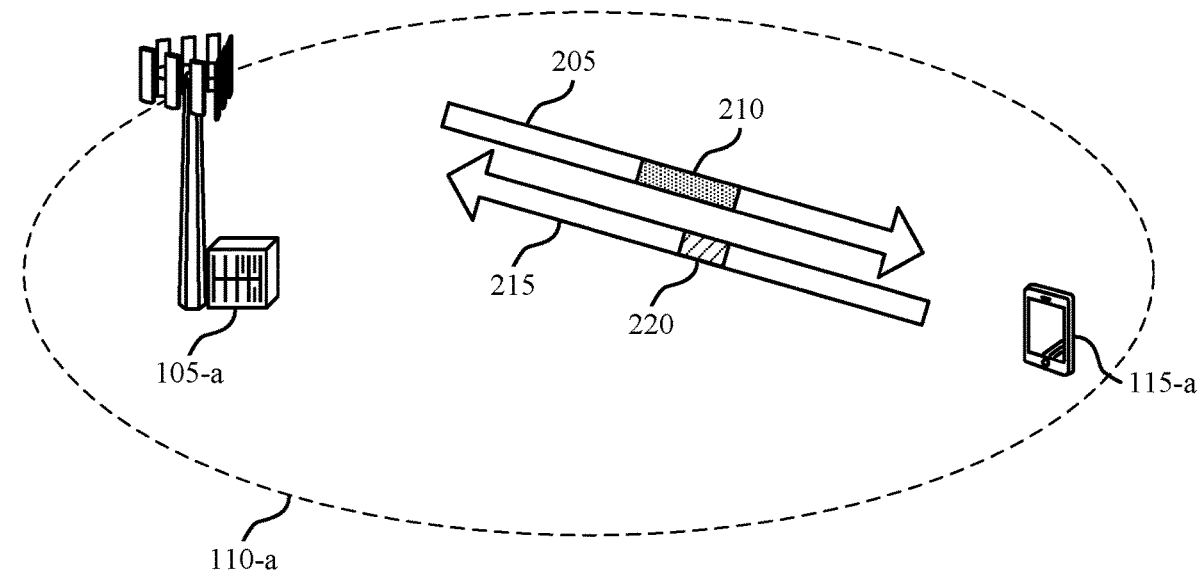
FIG. 2 illustrates an example of a wireless communications system that supports techniques for wireless communications using preconfigured uplink resources in accordance with aspects of the present disclosure.

FIG. 2 illustrates an example of a wireless communications system 200 that supports techniques for wireless communications using preconfigured uplink resources in accordance with aspects of the present disclosure. In some examples, the wireless communications system 200 may implement aspects of the wireless communications system 100 as described with reference to FIG. 1. The wireless communications system 200 includes a base station 105-a and a UE 115-a, which may be examples of the corresponding devices as described with reference to FIG. 1. The base station 105-a may provide network coverage for a geographic coverage area 110-a. The base station 105-a may transmit downlink communications to the UE 115-a over a downlink channel 205, for example, one or more configuration messages 210. The UE 115-a may transmit uplink communications to the base station 105-a over an uplink channel 215, or example, uplink transmissions 220 (e.g., uplink data transmissions).

According to the techniques described herein, the base station 105-a may configure the UE 115-a with a configuration for transmissions using preconfigured uplink resources. The configuration may define sets of resources and other parameters for uplink communications when the UE 115-a is in an idle mode. In some cases, the base station 105-a may configure the UE 115-a with the preconfigured uplink resources while the UE 115-a is in a connected mode (e.g., an RRC_CONNECTED state), that is, when an active RRC connection is established between the base station 105-a and the UE 115-a. For example, the base station 105-a may transmit to the UE 115-a a preconfigured uplink resource configuration in one or more RRC messages. The UE 115-a may then, in some cases, use the preconfigured uplink resources when the UE 115-a is in an idle mode (e.g., an RRC_IDLE state), that is, when an active RRC connection is not established between the base station 105-a and the UE 115-a. In some cases, the preconfigured uplink resource configuration may indicate a sequence of resources (e.g., a periodic set of resources) with which the UE 115-a may transmit uplink transmissions 220 while in the idle mode.

After the base station 105-a transmits the preconfigured uplink resource configuration to the UE 115-a, the UE 115-a may transition to the idle mode. In the idle mode, the UE 115-a may transmit one or more uplink transmissions 220 using the resources and parameters indicated in the preconfigured uplink resource configuration. The UE 115-a may transmit the uplink transmissions 220 without transitioning back to the connected mode (e.g., without performing a random access procedure). In some cases, transmission of uplink transmissions 220 without transitioning back to the connected mode may be called early data transmission (EDT) procedures. In some cases, EDT may allow the UE 115-a to transmit one or more uplink transmissions 220 and then receive one or more downlink data transmissions, for example, prior to completion of a random access channel (RACH) procedure (e.g., while the UE 115-a is still in the idle mode). In some aspects, preconfigured uplink resources or EDT may facilitate reduced signaling overhead and a relatively reduced power consumption by the UE 115-a.

Following the preconfigured uplink resources transmission, the UE 115-a may monitor for a response from the base station 105-a to the uplink transmissions 220. In some cases, the response may include one or more of: an acknowledgment (ACK) message, a reconfiguration of the initial preconfigured uplink resource configuration (e.g., in DCI and/or a L2/L3 message in the PDSCH), or a grant for a retransmission of the data transmitted in the uplink transmissions 220.

Some wireless communications systems, such as an enhanced Machine Type Communication (eMTC) communications system, may deploy frequency hopping with narrowband retuning, for example, to provide frequency diversity, reduced interference, and the like. In some cases, the base station 105-a may transmit a SIB to the UE 115-a, where the SIB may include parameters configured for frequency hopping. That is, the frequency hopping configuration may include a number of parameters (e.g., strings including one or more parameters) that may be used to configure a frequency hopping pattern. For example, the SIB may include in a frequency hopping configuration a first parameter or a first string of parameters to indicate whether frequency hopping is between two or four narrowbands for PDSCH and MPDCCH. The SIB may include in the frequency hopping configuration a second parameter or a second string of parameters to indicate a number of consecutive subframes for transmissions in each of the narrowbands. The SIB may include in the frequency hopping configuration a third parameter or a third string of parameters to indicate a frequency hopping offset.

In some cases, the base station 105-*a* may also transmit to the UE 115-*a* a unicast transmission (e.g., in an RRC message) indicating a frequency hopping parameter. According to this frequency hopping parameter, the string given above may indicate whether the UE 115-*a* is configured to apply frequency hopping. For example, if the string indicates "true," then the UE 115-*a* may apply frequency hopping, for example, according to the frequency hopping configuration given above. Alternatively, if the string does not indicate "true," then the UE 115-*a* may not apply frequency hopping, that is, the UE 115-*a* may ignore a previously received frequency hopping configuration.

In some cases, the UE 115-*a* (when configured, e.g., according to an eMTC communications system) may support one or more CE modes for transmitting uplink data, for example, a first CE mode (e.g., CE Mode A) and a second CE mode (e.g., CE Mode B). In some cases, a CE mode may provide improved coverage to facilitate an eMTC communications device to operate at a reduced power, for example, in challenging coverage conditions. In some cases, the CE mode may be achieved through repetition techniques. For example, in an eMTC communications system, devices may repeat a transmission (e.g., tens or hundreds of times) according to the CE mode. This repetition may improve a probability that the transmissions is successfully received.

In some cases, a first CE mode (e.g., CE Mode A) may provide relatively moderate coverage enhancements and a second CE mode (e.g., CE Mode B) may provide relatively deeper coverage. For example, in CE Mode A, the frequency hopping configuration may configure a one-bit indication in DCI to dynamically trigger frequency hopping "ON" or "OFF" for the corresponding transmission. When in the connected mode and operating according to CE Mode A, the UE 115-*a* may apply frequency hopping if the RRC parameter given above is set to "true" and the one-bit indication in the DCI triggers frequency hopping "ON." Similarly, in an example, when in the connected mode and operating according to CE Mode B, the UE 115-*a* may directly follow the RRC frequency hopping parameter. That is, the UE 115-*a* may apply frequency hopping in accordance with the RRC frequency hopping parameter independent of DCI (e.g., there may be no DCI indication for frequency hopping; if the RRC parameter is set to "true," the UE 115-*a* may use frequency hopping, and if not, the UE 115-*a* may not use frequency hopping).

For transmissions using preconfigured uplink resources, the applicability of the frequency hopping configurations for CE Modes A and B to different transmissions in the idle mode may be unclear. For example, the CE Mode may be configured for the connected mode, and thus once the UE 115-*a* transitions from the connected mode to the idle mode, it may not have a configured CE Mode. Thus, in the idle mode it may be indeterminate how to apply the frequency hopping configurations to: frequency hopping for a PUSCH transmission for a preconfigured uplink resource transmission, frequency hopping for a PUSCH transmission for one or more retransmissions, frequency hopping for an MTC PDCCH (MPDCCH) transmission, and frequency hopping for a PDSCH transmission that may be communicated as a response to a preconfigured uplink resources transmission.

Figure 3:
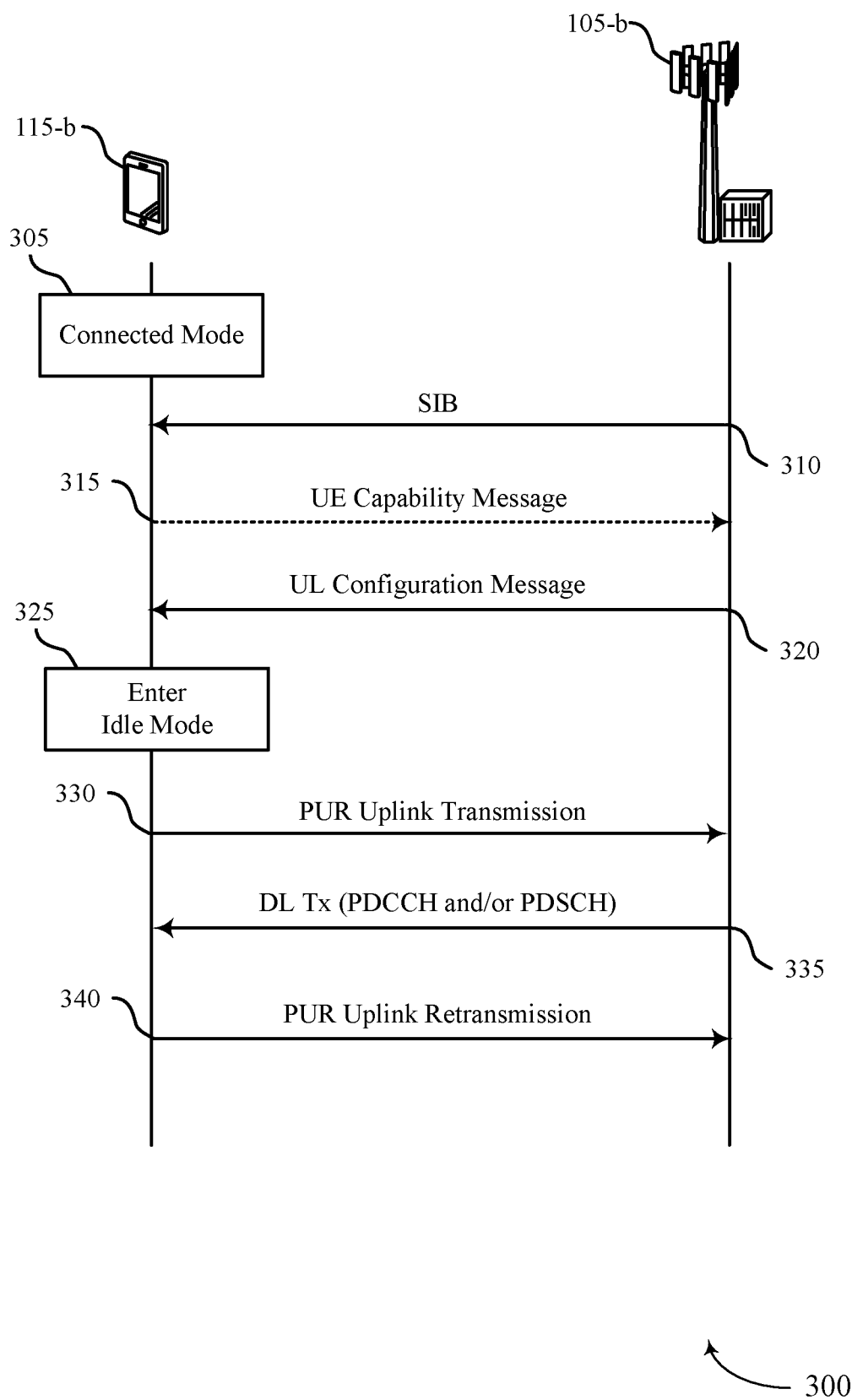
FIG. 3 illustrates an example of a process flow that supports techniques for wireless communications using preconfigured uplink resources in accordance with aspects of the present disclosure.

FIG. 3 illustrates an example of a process flow 300 that supports techniques for wireless communications using preconfigured uplink resources in accordance with aspects of the present disclosure. In some examples, the process flow 300 may implement aspects of the wireless communications system, as described with reference to FIGS. 1 and 2. The process flow 300 shows an example of communications between a base station 105-*b* and a UE 115-*b*, which may be examples of the corresponding devices as described with reference to FIGS. 1 and 2. Alternative examples of the following may be implemented, where some steps are performed in a different order than described or are not performed at all. In some cases, steps may include additional features not mentioned below, or further steps may be added.

At 305, the UE 115-*b* may be in a connected mode with the base station 105-*b*. For example, the UE 115-*b* may have performed a random access procedure with the base station 105-*b* and may have established an RRC connection.

At 310, the base station 105-*b* may broadcast a SIB which may be received by the UE 115-*b*. The SIB may include parameters related to frequency hopping (e.g., a frequency hopping interval, a frequency hopping offset, a number of narrowbands for frequency hopping). In some cases, the frequency hopping parameters may be configured separately for different CE modes (e.g., separate frequency hopping interval, frequency hopping offset, or number of narrowbands for each of CE Mode A and CE Mode B). The SIB may also include other communication parameters such as a number of repetitions for physical uplink control channel (PUCCH) or resources to be used for PUCCH while in idle mode, which may be configured separately for different CE levels.

At 320, the base station 105-*b* may transmit one or more UE configuration messages to the UE 115-*b*. The one or more UE configuration messages may include communication parameters for connected mode operation (e.g., a connected mode RRC configuration), and may also include configuration information for preconfigured uplink resources (e.g., a PUR-Config). In some cases, the base station 105-*b* may include a flag for PUR operation (e.g., a parameter that persists after transitioning out of the connected mode) in the connected mode RRC configuration to enable or disable frequency hopping for an initial preconfigured uplink resources transmission (e.g., a PUSCH transmission). In some cases, the flag may apply to PUSCH transmissions associated with an identifier (e.g., a PUR-radio network temporary identifier (PUR-RNTI), which may be applied to initial transmissions on preconfigured uplink resources. Additionally or alternatively, a PUSCH transmission may be transmitted based on the PUR-Config that is maintained after transitioning out of the connected mode, and the parameter may be included in the PUR-Config.

The UE 115-*b* may enter the idle mode at 325. For example, the UE 115-*b* may be in the connected mode when the configuration information is received at 320 and may transition at 325 from the connected mode to the idle mode. Alternatively, the UE 115-*b* may receive the SIB at 310 and receive the configurations at 320 outside the connected mode, and may transition or remain in the idle mode at 325.

At 330, the UE 115-*b* may transmit an initial (e.g., grant-free) uplink transmission using the preconfigured uplink resources. The UE 115-*b* may determine various parameters for the uplink transmission. For example, the UE 115-*b* may determine whether frequency hopping is enabled or disabled, frequency hopping parameters (e.g., a hopping interval, a frequency offset, or a number of transmission subframes between hopping), or a number of repetitions for the uplink transmission.

In some cases, one or more additional parameters (including, e.g., offset, number of subframes) may be associated with frequency hopping. In some cases, the UE 115-*b* may receive an indication of these parameters in the SIB at 310. In some other cases, the UE 115-*b* may receive separate indications with separate sets of values in a unicast configuration (e.g., in PUR-Config at 320). For instance, the SIB may indicate a first parameter for the hopping interval, whereas the PUR-Config may indicate a second parameter to denote the number of subframes for the hopping interval.

In some cases, the values for frequency hopping intervals provided by the SIB may be different for different CE modes (e.g., CE Mode A and Mode B). In such cases, the UE 115-*b* may select which frequency hopping interval to use for the initial preconfigured uplink resources transmission at 330. In one example, the frequency hopping interval value to be used may be hardcoded in the UE 115-*b*. For instance, the UE 115-*b* may select the frequency hopping interval value for CE Mode A, or CE Mode B based on a hardcoded CE Mode for PUR transmissions (e.g., the UE 115-*b* may be preconfigured to use CE Mode A for PUR operation). In a second example, the UE 115-*b* may be explicitly signaled (e.g., via PUR-Config), which frequency hopping interval value to select (e.g., an interval associated with CE Mode A or CE Mode B). In a third example, the UE 115-*b* may derive if CE Mode A or CE Mode B is being used based in part on the number of PUSCH repetitions configured for preconfigured uplink resources. For instance, the PUR config may include a parameter associated with a number of repetitions for PUR operations (e.g., PUR-Reps). If the number of repetitions configured by PUR-Reps is less than a threshold (e.g., if PUR-Reps<=32) use CE Mode A, else use CE Mode B. In yet another example, the UE 115-*b* may determine the value for the frequency hopping interval to be used based on identifying (e.g., and storing) the CE Mode that the UE 115-*b* was in when it received the PUR-Config. That is, if the UE was configured as part of the connected mode RRC configuration to be in CE Mode A when the PUR-Config was received at 320, the UE 115-*b* would use parameters associated with CE Mode A for PUR communications. Alternatively, if the UE was configured as part of the connected mode RRC configuration to be in CE Mode A when it transitioned to idle mode (e.g., at 325), the UE 115-*b* may use parameters associated with CE Mode A for PUR communications.

In some cases, the base station 105-*b* may transmit a response to the PUR uplink transmission at 335. The response may include a control channel (e.g., PDCCH/MPDCCH) or data channel (e.g., PDSCH) message. For example, the UE 115-*b* may monitor a control channel within a window (e.g., a predetermined number of subframes) of transmitting the uplink transmission at 330. In some examples, the response may be an ACK for the PUR uplink transmission. However, if the preconfigured uplink resources transmission fails, the base station 105-*b* may trigger a retransmission based on a dynamic grant for the UE 115-*b* at 335. In some cases, the base station 105-*b* may signal the use of frequency hopping for retransmission of the PUSCH using one or more options. For example, the base station 105-*b* may signal whether or not to use frequency hopping for retransmissions in PUR-Config (e.g., carried over RRC). In some circumstances, the base station 105-*b* may use the same flag for enabling/disabling frequency hopping for retransmissions as used for the initial PUSCH transmission. In some other cases, a separate flag may be included to enable/disable frequency hopping for PUSCH retransmissions.

In a second option, the base station 105-*b* may include a flag in the grant for the retransmission at 335 for enabling/disabling frequency hopping.

In a third option, the base station 105-*b* may utilize a combination of RRC and DCI for signaling whether to use frequency hopping for retransmission. For instance, in a first step, a RRC field (or a flag) may enable or disable the possibility of hopping. Further, a DCI field may be used to enable/disable the hopping for a particular (re)transmission (e.g., the DCI field may only be present if RRC bit associated with frequency hopping is set to true).

In some cases, a wireless communications system may support one or more of the above options. Further, the UE 115-*b* may select one of them, for example, based in part on the CE Mode. In some cases, a preconfigured uplink resources retransmission may be associated with a PUR-RNTI and transmitted grant-free or triggered by a given DCI format (e.g., a retransmission may also be associated with the PUR-RNTI).

In some cases, a wireless communications system may support enabling/disabling frequency hopping for MPDCCH/PDSCH transmitted to the UE 115-*b* at 335. For example, a RRC flag in a configuration (e.g., PUR-Config) may be used to enable/disable frequency hopping. In some other cases, one or more parameters (e.g., configuration for paging MPDCCH) may be reused for enabling/disabling frequency hopping for MPDCCH or PDSCH transmissions to a UE in the idle mode. In a third example, the base station 105-*b* may reuse the connected mode RRC configuration for frequency hopping for MPDCCH or PDSCH (e.g., whether frequency hopping was enabled or disabled for MPDCCH or PDSCH when the UE 115-*b* received the RRC message including the PUR-Config at 320, or when the UE 115-*b* transitioned to the idle mode at 325).

In some aspects, enabling/disabling the frequency hopping for PDSCH may be the same as MPDCCH (e.g., a separate flag in the PUR-Config, based on an existing frequency hopping configuration, or based on whether frequency hopping was enabled or disabled when the UE received the PUR-Config). In some circumstances, the base station 105-*b* may also utilize a flag in DCI (e.g., the MPDCCH that schedules the PDSCH) to enable/disable frequency hopping for a particular PDSCH.

As described above, in some cases, the values for frequency hopping intervals may be different for different CE modes (e.g., CE Mode A and Mode B) in SIB. In such cases, the UE 115-*b* may need to know which frequency hopping interval to use for receiving the MPDCCH/PDSCH. In some cases, the applicability of CE Mode A or CE Mode B parameters may be determined implicitly or explicitly. For instance, the UE 115-*b* may receive an explicit indication of CE Mode A or CE Mode B parameters to be used (e.g., in PUR-Config, in DCI). In some other cases, the UE 115-*b* may use the parameters for CE Mode A or CE Mode B, based in part on the number of MPDCCH, PDSCH, or PUR repetitions. For example, if PUR-Reps is less than or equal to a threshold use CE Mode A, else use CE Mode B). In some cases, the base station 105-*b* may utilize the same RRC field (e.g., in PUR-Config) for enabling or disabling frequency hopping for both MPDCCH and PDSCH. In some other cases, different RRC fields may be used for the MPDCCH and PDSCH.

In some cases, such as for testing purposes, the UE 115-*b* may transmit an indication of its capability to support frequency hopping. In some cases, indication of its capability to support frequency hopping may be used by the eNB to decide whether to be configure the UE 115-*b* with frequency hopping for unicast data. In some examples, the capability parameter for unicast frequency hopping may also be used to configure frequency hopping for transmissions using preconfigured uplink resources. In a second example, a separate indication of frequency hopping support may be introduced for preconfigured uplink resources. In various examples, the UE 115-*b* may use a single indication for all channels, a separate indication for frequency hopping support for uplink PUSCH and for downlink (MPDCCH/PDSCH), or a separate indication per channel.

In some cases, the number of repetitions for an initial preconfigured uplink resources transmission at 330 may be signaled in RRC configuration (e.g., in PUR-Config). For example, a parameter PUR-reps may configure the number of repetitions for initial (e.g., grant-less) preconfigured uplink resources transmissions. Further, a UE 115-*b* may also need to determine the number of repetitions for PUSCH retransmissions, PDSCH transmissions, or both. In some cases, the number of repetitions for PUSCH retransmissions may be dynamically indicated in DCI. In some cases, the RRC may be used to configure the maximum number of repetitions, while the number of repetitions may be indicated in the DCI based on two or more bits and may be interpreted based on the maximum number of repetitions.

At 340, the UE 115-*b* may transmit a retransmission of the initial uplink transmission. For example, the response from the base station 105-*b* may include a grant for resources to transmit the retransmission at 340. The retransmission may also be associated with the PUR-RNTI.

In some cases, the number of repetitions for initial preconfigured uplink resources transmission and retransmissions may be related such that the mapping between the "PUSCH repetition" field in the DCI, and the actual number of repetitions may be determined based on the number of repetitions for the initial preconfigured uplink resources transmission. For example, if an initial preconfigured uplink resources transmission comprises 16 repetitions, 2 bits may be used to signal {4, 8, 16, 32} repetitions for the retransmission. In some cases, a maximum number of repetitions (Rmax) or a number of repetitions (R) may be configured, and the initial preconfigured uplink resources transmission may be transmitted according to the number or maximum number of repetitions. Thus, a correspondence between a value of the PUSCH repetition field in the DCI scheduling the retransmission and the number of repetitions for the retransmission may be determined by the configured number or maximum number of repetitions.

In some other cases, the base station 105-*b* may signal a separate parameter to interpret the DCI field. For instance, the PUR-Config may have a separate parameter (e.g., PUR-Rmax), which may be the same or different from Rmax, and may be independent from PUR-reps. There may be one or more constraints on PUR-Rmax based in part on the preconfigured uplink resources-repetitions. For instance, PUR-Rmax may be restricted to be greater than or equal to PUR-reps.

In some cases, the SIB (e.g., at 310) may signal the maximum number of repetitions for CE Mode A or CE Mode B. In some cases, a CE Mode parameter in the PUR-Config may indicate whether the UE 115-*b* is configured for CE Mode A or CE Mode B for PUR transmissions, and thus the maximum number of repetitions for CE Mode A or CE Mode B may be selected based on the CE Mode parameter In some cases, the UE 115-*b* may transmit uplink transmission 330 using a timing advance and/or a power control that is mismatched with the base station 105-*b*, such that the base station 105-*b* may not successfully decode the uplink transmission 330. To correct this mismatch, techniques are provided herein by which a grant for retransmissions may support updating a value for the timing advance and the power control. In some cases, timing advance commands may be carried in a MAC CE, and may use a downlink PDSCH transmission and an uplink transmission (e.g., ACK) to signal an adjustment of the timing advance. In some cases, the techniques provided herein may provide a relatively lower delay as compared to timing advance commands being carried in a MAC CE.

In some cases, the base station 105-*b* may provide a timing advance command to the UE 115-*a* in a grant for a retransmission (e.g., at 335). However, in the case that the UE 115-*b* does not successfully receive the grant for the retransmission, or the base station 105-*b* does not successfully receive the retransmission, the UE 115-*b* may continue to accumulate additional timing advances for a next uplink transmission (i.e., continuing to stack additional timing advances together, creating an overly long delay). To prevent such accumulation of timing advances, UE 115-*b* may apply an indicated timing advance for a current transmission or retransmission in idle mode, and may not continue accumulating the timing advances in different grants. For example, if the base station 105-*b* does not successfully receive an uplink transmission (e.g., a PUSCH transmission), the base station 105-*b* may again transmit the same grant to the UE 115-*b* indicating the same timing advance as the grant the base station 105-*b* originally transmitted. Accordingly, the UE 115-*b* may apply the timing advance indicated with the grant in the latest received grant (e.g., applying a timing advance change of T), and may not accumulate the timing advances indicated with multiple grants received via DCI (which may, e.g., result in a timing advance change of 2T after receiving two timing advance commands). In some cases, the UE may not accumulate the timing advances for subsequent retransmissions of the same PUSCH, but may accumulate timing advances indicated for separate PUSCH (re)transmissions (e.g., associated with different transport blocks or HARQ processes). For example, a UE may receive a timing advance of T in two grants for PUSCH1 (e.g., associated with a first transport block or HARQ process), and may accumulate only one of them (T). Subsequently, the UE may receive an additional grant for PUSCH2 (e.g., associated with a second transport block or HARQ process) with a timing advance of T', and the UE will accumulate this one with the previous PUSCH (T+T').

In some cases, the UE 115-*b* may be provided a relatively long duration of time to apply a timing advance command (e.g., including an additional amount of time for MAC processing). A duration of this length, however, may not be compatible with some communications systems, for example, an N+4 timeline between grants and uplink transmissions used in eMTC communications systems. To remedy this mismatch, in some cases, an additional amount of time may be provided to the UE to process received grants. In some such cases, when a timing advance command is present or is not a null value, a delay between PDCCH transmissions and PUSCH transmissions may be increased (e.g., increasing the N+4 timeline to an N+6 timeline). Additionally or alternatively, a preconfigured uplink resource retransmission may follow a relaxed timing (e.g., the N+6 timeline) regardless of whether the timing advance command is present. In this way, the UE 115-*b* may be provided sufficient processing time in these scenarios.

In some cases, a transmission power with which the UE 115-*b* and/or the base station 105-*b* may transmit communications may gradually change or drift from a target transmission power to successfully communicate uplink and downlink transmissions. In wireless communications systems implementing communications using preconfigured uplink resources, for example, the transmission power for uplink transmissions from the UE 115-*b* may drift from the target transmission power when the UE 115-*b* is in the idle mode. Further, because the UE 115-*b* may remain in the idle mode for relatively longer durations of time in wireless communications systems implementing communications using preconfigured uplink resources as compared to some other wireless communications systems, transmission powers may vary from the target transmission power by a relatively larger amount than the other wireless communications systems that do not implement implementing communications using preconfigured uplink resources.

As such, techniques are provided herein that may provide increased resolution for configuring power control commands. In some cases, DCI for preconfigured uplink resource transmissions may include additional bits for indicating a power control command, as compared to, for example, a unicast DCI. For example, the DCI for preconfigured uplink resource transmissions may provide three to four bits for the power control command, whereas the unicast DCI for connected mode may provide two bits. The greater number of bits for power control commands may allow the base station 105-*b* to indicate relatively larger power adjustments and/or allow the base station 105-*b* to indicate power adjustments with increased granularity. It is to be understood, however, that while the DCI is described as including three to four bits for power control commands, the DCI may, in other cases, include number of bits greater than or less than three to four bits.

Additionally or alternatively, in wireless communications systems implementing communications using preconfigured uplink resources, a set of values with which the DCI bits may be configured may include different values than some other wireless communications systems (e.g., a greater variety or range of values to indicate the power control command), as compared to, for example the wireless communications systems that utilize unicast DCI with two bits for power control commands. Accordingly, the UE 115-*b* may interpret power control commands received in DCI for preconfigured uplink resource retransmissions differently than the UE 115-*b* would interpret power control commands received in a typical DCI.

In some cases, the base station 105-*b* may reconfigure a PUR-Config directly using DCI. For example, the UE 115-*b* may transmit a preconfigured uplink resource transmission according to a first PUR-Config, and the UE 115-*b* may then receive a reconfiguration for the uplink resource configuration (e.g., a reconfigured PUR-Config). The UE 115-*b* may then use the reconfigured PUR-Config for subsequent communications. In some cases, reconfiguring the PUR-Config in this way may use a relatively large amount of communications resources, as such a reconfiguration may involve reconfiguring a relatively large amount of parameters (e.g., a set of parameters indicating a number of repetitions, an MCS, a TBS, time/frequency resources, etc.).

Thus, techniques provided herein provide for a two-step configuration (or reconfiguration) of the PUR-Config. In a first step of the two-step configuration, the UE 115-*b* may receive a set of one or more PUR-Configs (including, e.g., a first PUR-Config, a second PUR-Config, and so on through an nth PUR-Config) at 320. Each PUR-Config of the set of PUR-Configs may include its own respective set of parameters. That is, each the first PUR-Configs may include a set of parameters are partially or entirely different than the sets of parameters of each of the other PUR-Configs. In some cases, an initial RRC configuration may signal one of the PUR-Configs to serve as an active PUR-Config.

In a second step of the two-step configuration, DCI may include a field that may indicate a subsequent active PUR-Config from the set of PUR-Configs. For example, if the set includes four PUR-Configs, DCI may include two bits to signal which of the four PUR-Configs (each having been configured by RRC configuration at 320) is to be used for subsequent communications.

In some cases, after reconfiguring the PUR-Config, the base station 105-*b* may restart a close loop power control loop, for example, because communications according to the new PUR-Config may use a substantially different transmission power than the previous PUR-Config.

In some cases, the UE 115-*b* may support one or more additional features (e.g., optional features) that be used for preconfigured uplink resource communications. Such features may include: a larger TBS for uplink transmissions, support for certain modulation and coding schemes (e.g., 64 quadrature amplitude modulation (64 QAM)) for downlink transmissions, one or more CE modes (e.g., CE Mode A and CE Mode B), a larger communication bandwidth, a sub-PRB resource allocation, a flexible resource assignment (RA), and other communications features. In some cases UE 115-*b* may send capability information at 315 to base station 105-*b*, indicated support for one or more of these capabilities for PUR operations. In some cases, each of these capabilities may be configured or reused in a PUR-Config. Alternatively, each of these capabilities may be particularly indicated in separate indications for preconfigured uplink resource communications. For example, if the capabilities are indicated separately, the UE 115-*b* may indicate that the UE 115-*b* supports a flexible RA in a connected mode, but the UE 115-*b* may indicate that the UE 115-*b* does not support a flexible RA for preconfigured uplink resource communications.

In some cases, the base station 105-*b* may configure one or more of these features in a PUR-Config (e.g., configuring the CE Mode A and the CE Mode B is described herein). In some cases, the contents of the DCI, and their interpretation, may depend on this configuration for these additional parameters In an illustrative example, the UE 115-*b* may support a larger TBS for uplink transmissions. In a unicast mode, the larger TBS may be configured according to a TBS size parameter, for example, which may enable the larger TBS. The larger TBS may then change the interpretation of the DCI. Additionally or alternatively, this parameter may be separately configured and indicated to the UE 115-*b* in a PUR-Config, and again the interpretation of the DCI and its contents may be different (including, e.g., in some cases, a set of TBSs for preconfigured uplink resource transmissions). In some cases, the configuration of larger TBS may be implicit based on the value of configured TBS for PUR (e.g., if the TBS is larger than 1000 bits, the UE will interpret the DCI differently).

In a second illustrative example, the UE 115-b may support a flexible RA. The base station 105-b may configure the UE 115-b using one or more parameters for flexible RA with preconfigured uplink resource procedures (including, e.g., in some cases, separate configurations for PUSCH and PDSCH). In this example, the DCI interpretation may depend on this parameter, and thus may be interpreted differently according to the different parameter.

Some wireless communications systems, such as NB-IoT communications systems, may support two different subcarrier spacings (e.g., 3.75 kHz and 15 kHz). In a connected mode, one subcarrier spacing may be selected and indicated (e.g., in a random access response message from the base station 105-a or other configuration message), and the UE 115-b may use the indicated subcarrier spacing for a configured carrier or bandwidth part for a remainder of the time that the UE 115-b is connected with the base station 105-b (assuming that the UE 115-b does not receive a contrary explicit indication, e.g., in an RRC configuration).

In some cases, for preconfigured uplink resource communications, the UE 115-b may assume a subcarrier spacing used while configuring preconfigured uplink resource communications. For example, if the UE 115-b was configured to use a subcarrier spacing of 3.75 kHz at 320 when the PUR-Config was received, the PUR-Config may also use a 3.75 kHz subcarrier spacing for PUR operations. Additionally or alternatively, the base station 105-b may explicitly include an indication of a subcarrier spacing in the PUR-Config. In some cases, both the first technique in which the UE 115-b assumes a subcarrier spacing that was used when it received the PUR-Config and the second technique in which the base station 105-b explicitly indicates a subcarrier spacing in the PUR-Config may affect subsequent preconfigured uplink resource transmissions and retransmissions. For example, the interpretation of DCI for retransmission may be different depending on the subcarrier spacing, because the resource allocation field would also be different for a different subcarrier spacing.

Figure 4:
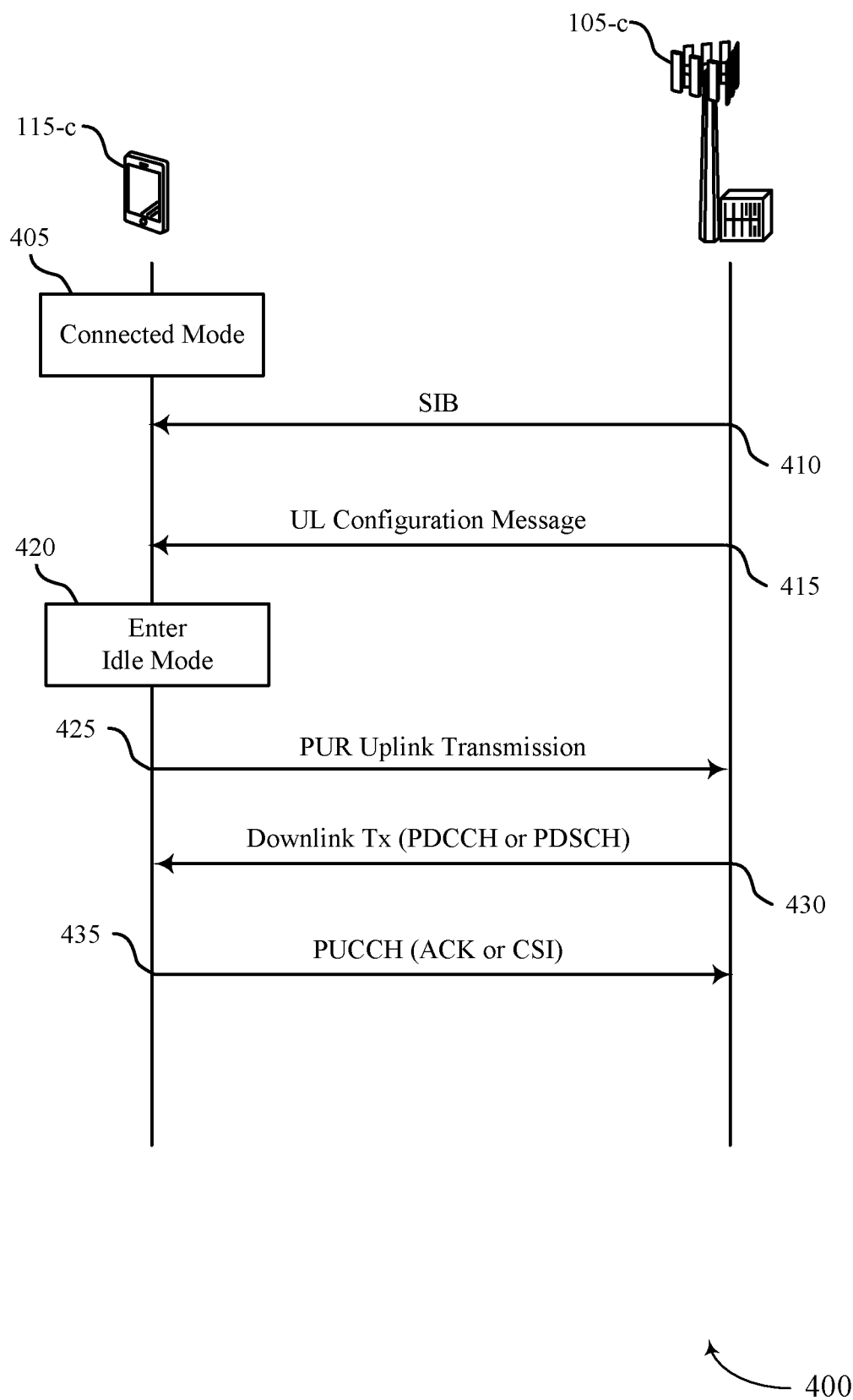
FIG. 4 illustrates an example of a process flow that supports techniques for wireless communications using preconfigured uplink resources in accordance with aspects of the present disclosure.

FIG. 4 illustrates an example of a process flow 400 that supports techniques for wireless communications using preconfigured uplink resources in accordance with aspects of the present disclosure. In some examples, the process flow 400 may implement aspects of the wireless communications system, as described with reference to FIGS. 1 through 3. The process flow 400 shows an example of communications between a base station 105-c and a UE 115-c, which may be examples of the corresponding devices as described with reference to FIGS. 1 through 3. Alternative examples of the following may be implemented, where some steps are performed in a different order than described or are not performed at all. In some cases, steps may include additional features not mentioned below, or further steps may be added.

In process flow 400, the base station 105-c may indicate a PUCCH configuration that has different CE levels, and each of the different CE levels may have a different number of repetitions, different resources, or both, for a PUCCH HARQ-ACK resource. As described herein, the following provides different options for configuring a PUCCH HARQ-ACK resource for a PUR.

At 405, UE 115-c may be operating in a connected mode as similarly described in FIG. 3 and monitor for a SIB transmission by base station 105-c.

At 410, base station 105-c may broadcast a SIB. The UE 115-c may receive and process the SIB to obtain PUCCH parameters. In some cases, during initial access, the UE 115-a may use configuration provided in the SIB to determine PUCCH parameters. In some cases, the PUCCH configuration included in the SIB may indicate a number of repetitions, as well as the different resources, for each CE level of a set of CE levels. For example, the SIB may provide a common configuration (e.g., PUCCH-ConfigCommon) that indicates one or more PUCCH parameters for each CE level.

At 415, base station 105-c may transmit an uplink configuration message to UE 115-c. The UE 115-b may receive and process the uplink configuration message that includes a PUR configuration, a unicast connected mode configuration, a CE level indicator, or any combination thereof. In one examples, the base station 105-c may signal the CE level indicator at 415 to indicate which CE level to use from the set of CE levels indicated in the common configuration of the SIB received at 410.

At 420, UE 115-c may remain in or transition to idle mode as similarly described in FIG. 3.

At 425, UE 115-c may transmit a PUR uplink transmission to base station 105-c as similarly described in FIG. 3. The base station 105-c may receive and process the PUR uplink transmission as similarly described in FIG. 3.

At 430, base station 105-c may transmit a downlink transmission to UE 115-c. The downlink transmission may be a PDCCH transmission, a PDSCH transmission, or both. The UE 115-c may attempt to decode the downlink transmission received within a PDCCH resource and/or a PDSCH resource, and generate a feedback determination based on whether the UE 115-c was able to successfully decode the downlink transmission (e.g., an ACK, a negative ACK (NACK), etc.).

At 435, UE 115-c may transmit an uplink transmission to base station 105-c within a configured uplink resource. In an example, the uplink transmission may be a PUCCH transmission that may include an ACK/NACK, channel state information (CSI), or both. In some cases, the UE 115-c may determine which PUCCH HARQ-ACK resource to use for the uplink transmission. In a first example, the UE 115-c may determine, or be configured by base station 105-c, to follow the configuration for the PUCCH HARQ-ACK resource indicated in the common configuration received in SIB at 415 (e.g., PUCCH-ConfigCommon received in the SIB). As noted above, the base station 105-c may signal at 415 which one of the CE levels of the common configuration to use as a reference. The UE 115-c may thus identify the PUCCH HARQ-ACK resource corresponding to the signaled CE level, and transmit, at 435, an uplink transmission (e.g., PUCCH transmission that indicates an ACK/NACK for downlink transmission 415) within the identified PUCCH HARQ-ACK resource.

In a second example, the UE 115-c may determine, or be configured by base station 105-c, to follow the PUR-Config received at 415. The PUR-Config may indicate the number of repetitions and/or resources for the PUCCH HARQ-ACK resource. In some cases, the number of repetitions may depend on the CE Mode of UE 115-c configured by the base station 105-c. In some examples, the number of repetitions may be different for different CE modes. In an example, if the UE 115 is explicitly or implicitly configured to operate in a first mode (e.g., mode A), the number of PUCCH repetitions may be different than the number of PUCCH repetitions in a second mode (e.g., mode B). The explicit or implicit configuration of the CE Mode may be determined based on information in the downlink transmission from the base station 105-c. For example, the downlink transmission may include an explicit indicator, or the UE 115-c may determine the configured CE Mode based on a number of repetitions of the downlink transmission (e.g., if the number of repetitions satisfies a threshold it may be configured for CE Mode B, otherwise it may be configured for CE Mode A). The UE 115-c may thus determine the number of repetitions and/or resources for the PUCCH resource based on the PUR-Config and the configured CE mode. The UE 115-c may transmit, at 435, one or more uplink transmissions within the identified PUCCH resource in accordance with the number of repetitions and the configured CE mode.

In a third example, the unicast connected mode configuration received at 415 may be reused for configuring the PUCCH HARQ-ACK resource for preconfigured uplink resources. The UE 115-c may thus reuse a resource indicated in the unicast connected mode configuration as the PUCCH HARQ-ACK resource, and transmit, at 415, an uplink transmission (e.g., an ACK/NACK) within the identified PUCCH HARQ-ACK resource (e.g., reuse the unicast resource) and based on a CE mode configured for the unicast connected mode configuration (e.g., the connected mode configuration for a carrier or active bandwidth part at a time that the PUR-Config is received, or the connected mode configuration before being released to idle mode).

It is noted that the above examples in FIG. 4 discussed transmitting feedback (e.g., an ACK/NACK) in a PUCCH HARQ-ACK resource, and those techniques may be similarly applied for generating a CSI report for the downlink transmission received at 430, and transmitting the CSI report within CSI resources determined in a similar way in which the PUCCH HARQ-ACK resource are described as being determined in FIG. 4. In some examples, a CSI report may be transmitted using PUCCH prior to transmitting the PUR PUSCH message at 425.

Figure 5:
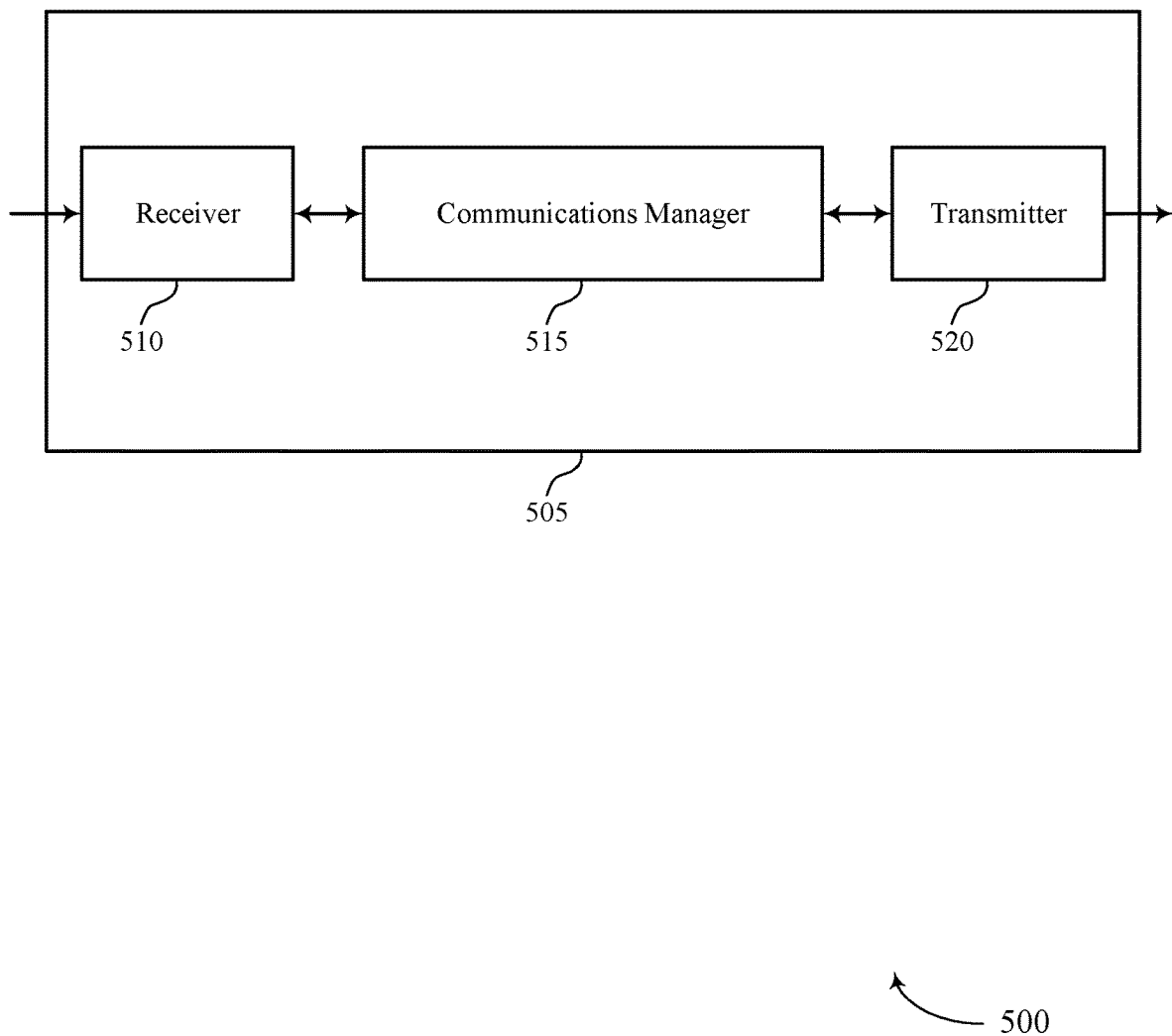
FIGS. 5 and 6 show block diagrams of devices that support techniques for wireless communications using preconfigured uplink resources in accordance with aspects of the present disclosure.

FIG. 5 shows a block diagram 500 of a device 505 that supports techniques for wireless communications using preconfigured uplink resources in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for wireless communications using preconfigured uplink resources, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, transmit, while in the idle mode, a first uplink transmission associated with a transport block on the allocated resources and according to one or more of the set of parameters, and monitor for a response to the first uplink transmission. The communications manager 515 may also receive a first downlink resource configuration for downlink communications in a connected mode, receive a second downlink resource configuration for downlink communications in an idle mode, the second downlink resource configuration including a set of parameters including one or more of a frequency hopping indicator or a CE mode indicator for the downlink communications in the idle mode, enter the idle mode, and receive, while in the idle mode, one or more downlink transmissions according to the first downlink resource configuration or the second downlink resource configuration. The communications manager 515 may also receive an uplink control channel configuration, the uplink control channel configuration including a repetition level indicator and a resource indicator for transmitting uplink control channel transmissions while in an idle mode, transition from a connected mode to the idle mode, determine, based on the uplink control channel configuration, a number of repetitions and a set of resources for transmitting an uplink control channel transmission in the idle mode, and transmit, while in the idle mode, the uplink control channel transmission according to the number of repetitions and the set of resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
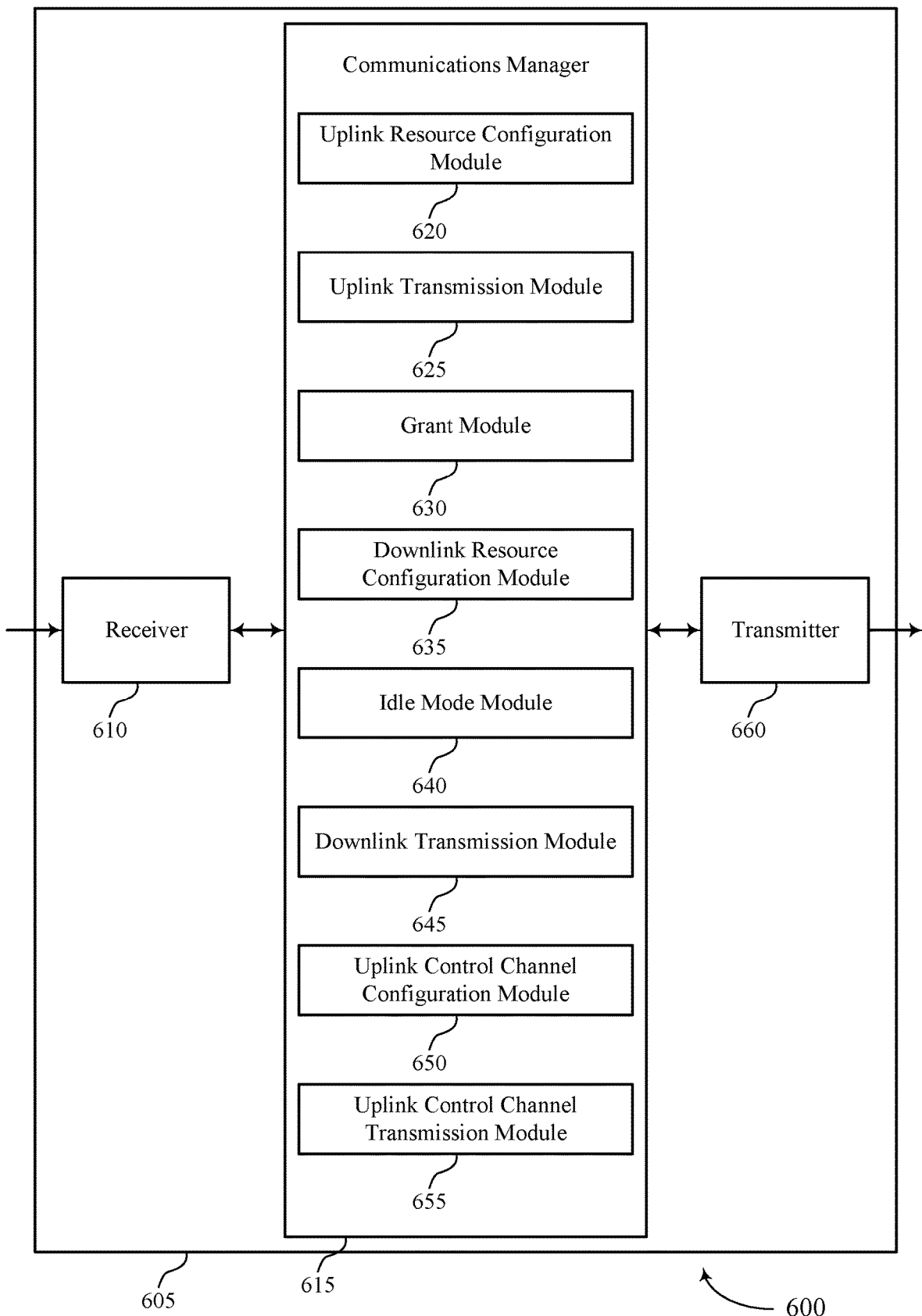

FIG. 6 shows a block diagram 600 of a device 605 that supports techniques for wireless communications using preconfigured uplink resources in accordance with aspects of the present disclosure. The device 605 may be an example of aspects of a device 505, or a UE 115 as described herein. The device 605 may include a receiver 610, a communications manager 615, and a transmitter 660. The device 605 may also include a processor. Each of these components may be in communication with one another (e.g., via one or more buses).

The receiver 610 may receive information such as packets, user data, or control information associated with various information channels (e.g., control channels, data channels, and information related to techniques for wireless communications using preconfigured uplink resources, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink resource configuration module 620, an uplink transmission module 625, a grant module 630, a downlink resource configuration module 635, an idle mode module 640, a downlink transmission module 645, an uplink control channel configuration module 650, and an uplink control channel transmission module 655. The communications manager 615 may be an example of aspects of the communications manager 810 described herein.

The uplink resource configuration module 620 may receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications.

The uplink transmission module 625 may transmit, while in the idle mode, a first uplink transmission associated with a transport block on the allocated resources and according to one or more of the set of parameters.

The grant module 630 may monitor for a response to the first uplink transmission.

The downlink resource configuration module 635 may receive a first downlink resource configuration for downlink communications in a connected mode and receive a second downlink resource configuration for downlink communications in an idle mode, the second downlink resource configuration including a set of parameters including one or more of a frequency hopping indicator or a CE mode indicator for the downlink communications in the idle mode.

The idle mode module 640 may enter or transition the UE to the idle mode.

The downlink transmission module 645 may receive, while in the idle mode, one or more downlink transmissions according to the first downlink resource configuration or the second downlink resource configuration.

The uplink control channel configuration module 650 may receive an uplink control channel configuration, the uplink control channel configuration including a repetition level indicator and a resource indicator for transmitting uplink control channel transmissions while in an idle mode.

The uplink control channel transmission module 655 may determine, based on the uplink control channel configuration, a number of repetitions and a set of resources for transmitting an uplink control channel transmission in the idle mode and transmit, while in the idle mode, the uplink control channel transmission according to the number of repetitions and the set of resources.

The transmitter 660 may transmit signals generated by other components of the device 605. In some examples, the transmitter 660 may be collocated with a receiver 610 in a transceiver module. For example, the transmitter 660 may be an example of aspects of the transceiver 820 described with reference to FIG. 8. The transmitter 660 may utilize a single antenna or a set of antennas.

Figure 7:
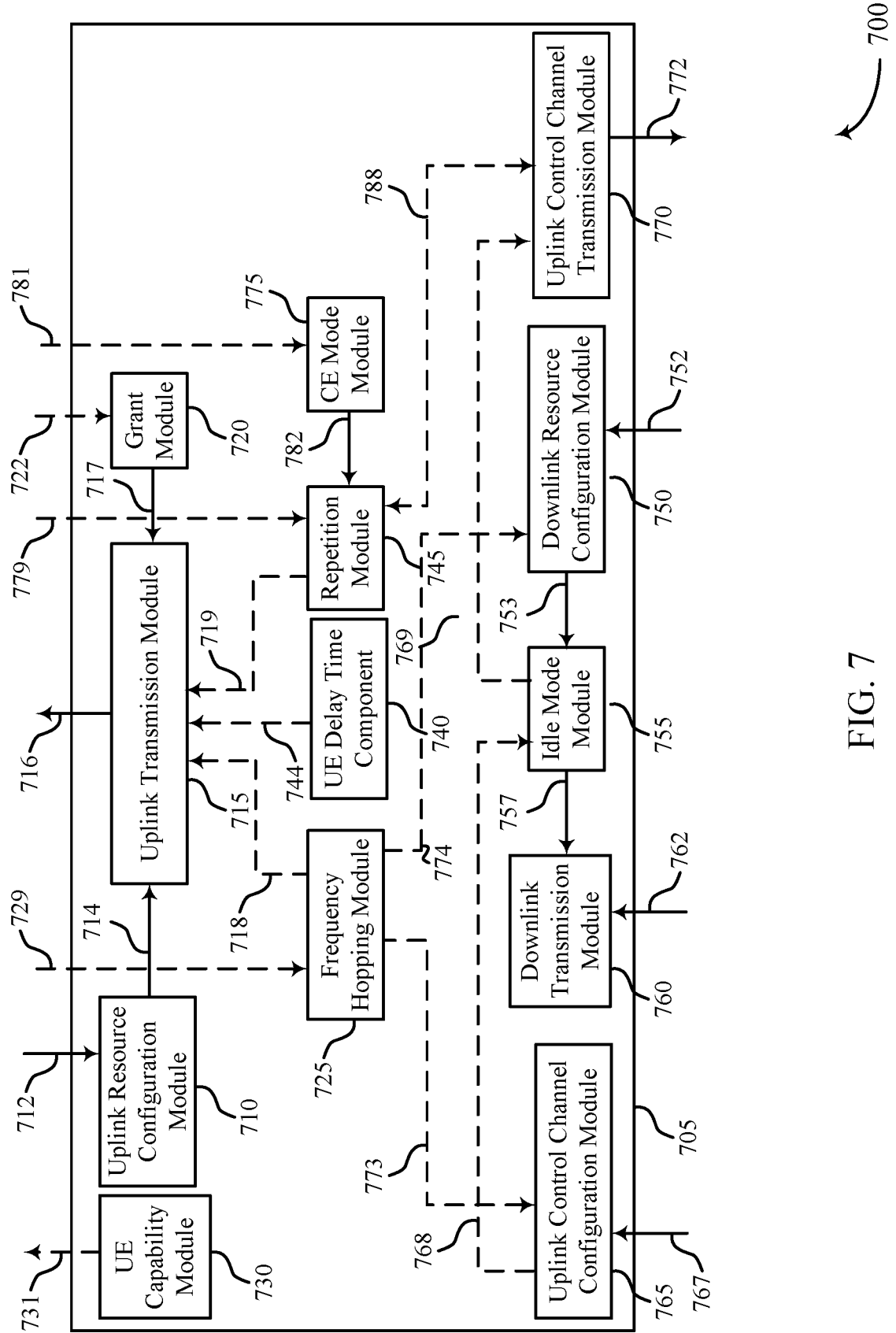
FIG. 7 shows a block diagram of a communications manager that supports techniques for wireless communications using preconfigured uplink resources in accordance with aspects of the present disclosure.

FIG. 7 shows a block diagram 700 of a communications manager 705 that supports techniques for wireless communications using preconfigured uplink resources in accordance with aspects of the present disclosure. The communications manager 705 may be an example of aspects of a communications manager 515, a communications manager 615, or a communications manager 810 described herein. The communications manager 705 may include an uplink resource configuration module 710, an uplink transmission module 715, a grant module 720, a frequency hopping module 725, a UE capability module 730, a UE delay time component 740, a repetition module 745, a downlink resource configuration module 750, an idle mode module 755, a downlink transmission module 760, an uplink control channel configuration module 765, an uplink control channel transmission module 770, and a CE mode module 775. Each of these modules may communicate, directly or indirectly, with one another (e.g., via one or more buses).

In some examples, the uplink resource configuration module 710 may receive an uplink resource configuration for uplink communications in an idle mode. For example, the uplink resource configuration module 710 may receive one or more signals 712 via a transceiver (e.g., as described with reference to FIG. 8) including information for the uplink resource configuration. In some examples, the uplink resource configuration may include an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. In some examples, the uplink resource configuration may be received in a RRC message.

In some examples, the uplink resource configuration module 710 may receive a set of uplink resource configurations for the uplink communications in the idle mode, the set of uplink resource configurations including the uplink resource configuration. In some examples, the uplink resource configuration module 710 may determine an active uplink resource configuration for one or more retransmissions of the first uplink transmission based on an indicator in a downlink control information message received while in the idle mode and the set of uplink resource configurations. In some examples, the uplink resource configuration module 710 may pass information 714 to the uplink transmission module 715, where the information 714 may include the allocated resources for the uplink communications and the set of parameters.

In some examples, the uplink transmission module 715 may receive the information 714 from the uplink resource configuration module 710, for example, including the allocated resources for the uplink communications and the set of parameters. The uplink transmission module 715 may transmit, while in the idle mode, a first uplink transmission associated with a transport block on the allocated resources and according to one or more of the set of parameters. For example, the uplink transmission module 715 may transmit one or more signals 716 via a transceiver (e.g., as described with reference to FIG. 8) including information indicating the first uplink transmission.

In some examples, the uplink transmission module 715 may transmit the first uplink transmission according to a first frequency hopping configuration for a first CE mode using the first frequency hopping interval based on a default CE mode for the UE in the idle mode (e.g., according to information 718 received from the frequency hopping module 725). In some examples, the uplink transmission module 715 may transmit the first uplink transmission according to the first frequency hopping configuration for the first CE mode using the first frequency hopping interval based on the CE mode indicator. In some examples, the uplink transmission module 715 may transmit the first uplink transmission according to a second frequency hopping configuration for a second CE mode using the second frequency hopping interval based on the repetition level indicator indicating a number of repetitions for the first uplink transmission satisfying a threshold number of repetitions (e.g., according to information 718 received from the frequency hopping module 725). In some examples, the uplink transmission module 715 may transmit the first uplink transmission according to the first frequency hopping configuration for the first CE mode using the first frequency hopping interval based on identifying that the UE was configured for the first CE mode at a time that the UE received the uplink resource configuration. In some cases, the first uplink transmission is transmitted in a PUSCH.

In some examples, the uplink transmission module 715 may transmit a second uplink transmission associated with the transport block based on a grant (e.g., according to information 717 received from the grant module 720). In some examples, the uplink transmission module 715 may transmit a third uplink transmission based on the second timing advance (e.g., according to information 717 received from the grant module 720).

The grant module 720 may monitor for a response to the first uplink transmission. In some examples, the grant module 720 may receive the response to the first uplink transmission, the response including a grant for one or more retransmissions of the first uplink transmission. For example, the grant module 720 may receive one or more signals 722 via a transceiver (e.g., as described with reference to FIG. 8) including information for the response to the first uplink transmission. In some examples, the grant module 720 may receive a downlink control channel message (e.g., via the signals 722) including a grant for a downlink shared channel transmission, where the downlink control channel message includes a second frequency hopping indicator.

In some examples, the grant for the one or more retransmissions of the first uplink transmission includes a power control command indicating an adjustment to an uplink transmission power for the one or more retransmissions of the first uplink transmission. In some examples, the grant module 720 may pass information 717 to the uplink transmission module 715, where the information 717 may include the power control command. In some examples, the uplink transmission module may transmit the second uplink transmission based on the indicated adjustment to the uplink transmission power. In some examples, a correspondence between the power control command and the adjustment to the uplink transmission power for the one or more retransmissions of the first uplink transmission is different from a correspondence between power control commands and uplink transmission power adjustments for the connected mode.

In some examples, the downlink resource configuration module 750 may receive a first downlink resource configuration for downlink communications in a connected mode. In some examples, the downlink resource configuration module 750 may receive a second downlink resource configuration for downlink communications in an idle mode, the second downlink resource configuration including a set of parameters including one or more of a frequency hopping indicator or a CE mode indicator for the downlink communications in the idle mode. For example, the downlink resource configuration module 750 may receive one or more signals 752 via a transceiver (e.g., as described with reference to FIG. 8) including information for the first downlink resource configuration and/or the second downlink resource configuration. In some examples, the downlink resource configuration module 750 may store a state of a downlink control channel frequency hopping indicator of the first downlink resource configuration when the second downlink resource configuration was received, where the receiving the one or more downlink transmissions is performed according to the stored state of the downlink control channel frequency hopping indicator.

In some examples, the downlink resource configuration module 750 may pass information 753 to the idle mode module 755, where the information 753 may indicate the reception of the first downlink resource configuration and/or the downlink resource configuration. The idle mode module 755 may enter or transition the device to the idle mode (e.g., based on receiving the information 753). In some examples, the idle mode module 755 may transition the device from a connected mode to the idle mode. In some examples, the idle mode module 755 may pass information 757 to the downlink transmission module 760, where the information 757 may indicate the transition to the idle mode and the received information 753.

The downlink transmission module 760 may receive, while in the idle mode, one or more downlink transmissions according to the first downlink resource configuration or the second downlink resource configuration. For example, the downlink transmission module 760 may receive one or more signals 762 via a transceiver (e.g., as described with reference to FIG. 8) including information for the downlink transmissions. In some examples, the downlink transmission module 760 may receive the downlink shared channel transmission based on a second frequency hopping indicator (e.g., according to information 763 received from the). In some examples, the downlink transmission module 760 may receive the one or more downlink transmissions according to the first set of frequency hopping parameters based on the CE mode indicator. In some examples, the downlink transmission module 760 may receive the one or more downlink transmissions according to the first number of repetitions or the second number of repetitions based on the CE mode indicator. In some examples, the downlink transmission module 760 may receive the one or more downlink transmissions according to the second set of frequency hopping parameters based on a number of repetitions of the one or more downlink transmissions satisfying a threshold number of repetitions. In some examples, the downlink transmission module 760 may receive the one or more downlink transmissions according to the first set of frequency hopping parameters based on determining that the UE was configured for the first CE mode at a time that the UE received the second downlink resource configuration.

The uplink control channel configuration module 765 may receive an uplink control channel configuration, the uplink control channel configuration including a repetition level indicator and a resource indicator for transmitting uplink control channel transmissions while in an idle mode. In some examples, the uplink control channel configuration module 765 may receive one or more signals 767 via a transceiver (e.g., as described with reference to FIG. 8) including information for the uplink control channel configuration. In some cases, the uplink control channel configuration is received in a RRC message.

In some examples, the uplink control channel configuration module 765 may pass information 768 to the idle mode module 755, where the information 768 may indicate the reception of the uplink control channel configuration. The idle mode module 755 may enter or transition the device to the idle mode (e.g., based on receiving the information 768). In some examples, the idle mode module 755 may transition the device from the connected mode to the idle mode. In some examples, the idle mode module 755 may pass information 769 to the uplink control channel transmission module 770, where the information 769 may indicate the transition to the idle mode and the received information 768.

The uplink control channel transmission module 770 may determine, based on the uplink control channel configuration (e.g., according to the information 769 and the information 768), a number of repetitions and a set of resources for transmitting an uplink control channel transmission in the idle mode. In some examples, the uplink control channel transmission module 770 may transmit, while in the idle mode, the uplink control channel transmission according to the number of repetitions and the set of resources.

For example, the uplink control channel transmission module 770 may transmit one or more signals 772 via a transceiver (e.g., as described with reference to FIG. 8) including information indicating the uplink control channel transmission. In some cases, the uplink control channel transmission includes a HARQ message, an ACK message, or a combination thereof.

The frequency hopping module 725 may receive a system information message including a first frequency hopping configuration for a first CE mode with a first frequency hopping interval and a second frequency hopping configuration for a second CE mode with a second frequency hopping interval, where the first frequency hopping interval is different than the second frequency hopping interval. For example, the frequency hopping module 725 may receive one or more signals 729 via a transceiver (e.g., as described with reference to FIG. 8) including information for the system information message. In some examples, the frequency hopping module 725 may receive the system information message, the system information message including a frequency hopping configuration indicating a frequency offset and a number of transmission subframes for the frequency hopping. In some examples, the frequency hopping module 725 may receive a first set of frequency hopping parameters associated with a first CE mode and a second set of frequency hopping parameters associated with a second CE mode.

In some examples, the frequency hopping module 725 may pass information 773 to the uplink control channel configuration module 765, where the information 773 may include the frequency hopping, indicators, configurations, and information described herein. In some examples, the frequency hopping module 725 may pass information 774 to the downlink resource configuration module 750, where the information 774 may include the frequency hopping, indicators, configurations, and information described herein.

In some cases, the frequency hopping indicator indicates whether frequency hopping is enabled for the first uplink transmission, and the first uplink transmission is transmitted according to the frequency hopping indicator. In some cases, the uplink resource configuration includes a frequency hopping configuration for the uplink communications indicating a frequency offset or a number of transmission subframes for the frequency hopping. In some cases, the uplink resource configuration includes a first frequency hopping indicator that indicates whether frequency hopping is enabled for the first uplink transmission and for the one or more retransmissions of the first uplink transmission, and the second uplink transmission is transmitted according to the first frequency hopping indicator. In some cases, the uplink resource configuration includes a first frequency hopping indicator that indicates whether frequency hopping is enabled for the first uplink transmission and a second frequency hopping indicator that indicates whether frequency hopping is enabled for the one or more retransmissions of the first uplink transmission, and the second uplink transmission is transmitted according to the second frequency hopping indicator In some cases, the grant (e.g., according to the information 717 passed from the grant module 720 to the uplink transmission module 715) for one or more retransmissions of the first uplink transmission includes a second frequency hopping indicator that indicates whether frequency hopping is enabled for the one or more retransmissions of the first uplink transmission, and the one or more retransmissions of the first uplink transmission are transmitted according to the second frequency hopping indicator. In some cases, the grant (e.g., according to the information 717 passed from the grant module 720 to the uplink transmission module 715) for one or more retransmissions of the first uplink transmission includes a second frequency hopping indicator that indicates whether frequency hopping is enabled for the one or more retransmissions of the first uplink transmission, and the second uplink transmission is transmitted according to the frequency hopping indicator and the second frequency hopping indicator.

In some cases, the first downlink resource configuration includes a downlink control channel frequency hopping indicator, and where the receiving the one or more downlink transmissions is performed according to the downlink control channel frequency hopping indicator. In some cases, the frequency hopping indicator includes a first frequency hopping indicator associated with a physical downlink control channel and a second frequency hopping indicator associated with a physical downlink shared channel.

The UE capability module 730 may transmit a capability message including an indication of a UE capability to support frequency hopping for the uplink communications in the connected mode and the uplink communications in the idle mode. For example, the uplink transmission module 715 may transmit one or more signals 731 via a transceiver (e.g., as described with reference to FIG. 8) including information indicating the capability message.

In some examples, the UE capability module 730 may transmit a capability message including a first indication of a UE capability to support frequency hopping for the uplink communications in the connected mode and a second indication of a UE capability to support frequency hopping for the uplink communications in the idle mode. In some examples, the UE capability module 730 may transmit a capability message including a feature capability indication of UE capability support for the enhanced TBS, the MCS, the enhanced bandwidth, the sub-PRB allocation, or the flexible resource allocation for the uplink communications in the idle mode, where the feature support indication is based on the feature capability indication.

In some cases, the second indication includes a single capability indication of whether the UE supports frequency hopping for all channels. In some cases, the second indication includes a downlink capability indication indicating whether the UE supports frequency hopping for downlink channels and an uplink capability indication indicating whether the UE supports frequency hopping for uplink channels. In some cases, the second indication includes a set of capability indications of whether the UE supports frequency hopping for a set of corresponding channels. In some cases, the device may receive a feature support indication for an enhanced TBS, a MCS, an enhanced bandwidth, sub-PRB allocation, or flexible resource allocation for the uplink communications in the idle mode. In some cases, a set of fields of a downlink control information message received while in the idle mode is interpreted based on the feature support indication.

The grant module 720 may receive a second response to the second uplink transmission, the second response including a second grant for one or more second retransmissions of the first uplink transmission, where the second grant includes a second timing advance command indicating a second timing advance to be applied for the one or more second retransmissions of the first uplink transmission. In some cases, the grant for the one or more retransmissions of the first uplink transmission includes a first timing advance command indicating a first timing advance to be applied for the one or more retransmissions of the first uplink transmission, where transmitting the second uplink transmission is based on the first timing advance. In some cases, the grant for the one or more retransmissions of the first uplink transmission includes a repetition indicator that indicates a number of repetitions for transmitting the one or more retransmissions of the first uplink transmission, where the second uplink transmission is transmitted in accordance with the indicated number of repetitions.

The UE delay time component 740 may determine a delay time between receiving the grant and transmitting the second uplink transmission based on a presence of the first timing advance command in the grant. In some examples, the UE delay time component 740 may determine a second delay time between receiving the grant and transmitting the second uplink transmission, where the second delay time is different than the first delay time. In some examples, the UE delay time component 740 may pass information 744 to the uplink transmission module 715, where the information 744 may include the first and/or second delay times.

The repetition module 745 may receive a system information message, the system information message including a first maximum repetition indicator that indicates a maximum number of repetitions for a first CE mode and a second maximum repetition indicator that indicates a maximum number of repetitions for a second CE mode, where the uplink resource configuration includes the CE mode indicator, and where a correspondence between a value for the repetition indicator and the number of repetitions indicated by the repetition indicator is determined based on one of the first maximum repetition indicator or the second maximum repetition indicator, and where the one of the first maximum repetition indicator or the second maximum repetition indicator is determined based on the CE mode indicator. For example, the repetition module 745 may receive one or more signals 779 via a transceiver (e.g., as described with reference to FIG. 8) including information for the system information message.

In some examples, receiving a downlink control channel message including a grant for a downlink shared channel transmission, where the downlink control channel message includes a repetition indicator associated with the downlink shared channel transmission, and where the second downlink resource configuration includes an indicator of a correspondence between a value for the repetition indicator and a number of repetitions indicated by the repetition indicator.

In some examples, the repetition module 745 may receive an indication of a CE level for the UE, where determining the number of repetitions and the set of resources to transmit the uplink control channel transmission is based on the CE level. In some examples, the repetition module 745 may determine the number of repetitions for the uplink control channel transmission based on a CE mode for the uplink control channel transmission. In some examples, the repetition module 745 may pass and receive information 788 to the uplink control channel transmission module 770, where the information 745 may include the repetition information and the uplink control channel configurations and information described herein.

In some cases, the uplink resource configuration includes an indicator of a correspondence between a value for the repetition indicator and the number of repetitions indicated by the repetition indicator. In some cases, the indicator of the correspondence between the value for the repetition indicator and the number of repetitions indicated by the repetition indicator includes a maximum a number of repetitions for transmitting the one or more retransmissions of the first uplink transmission. In some cases, the number of repetitions indicated by the repetition indicator is based on a number of repetitions for the first uplink transmission. In some cases, the indicator of the correspondence between the value for the repetition indicator and the number of repetitions indicated by the repetition indicator includes a maximum a number of repetitions for the downlink shared channel transmission. In some examples, the repetition module 745 may pass information 719 to the uplink transmission module 715, where the information 719 may include the indications and configurations described herein.

In some examples, the CE mode module 775 may receive a CE mode indicator indicating the CE mode for the uplink control channel transmission. For example, the CE mode module 775 may receive one or more signals 781 via a transceiver (e.g., as described with reference to FIG. 8) including information for the CE mode indicator. In some examples, the CE mode module 775 may determine the CE mode for the uplink control channel transmission based on a number of repetitions of a downlink transmission. In some examples, the CE mode module 775 may pass information 782 to the repetition module 745, where the information 782 may include the CE mode.

Figure 8:
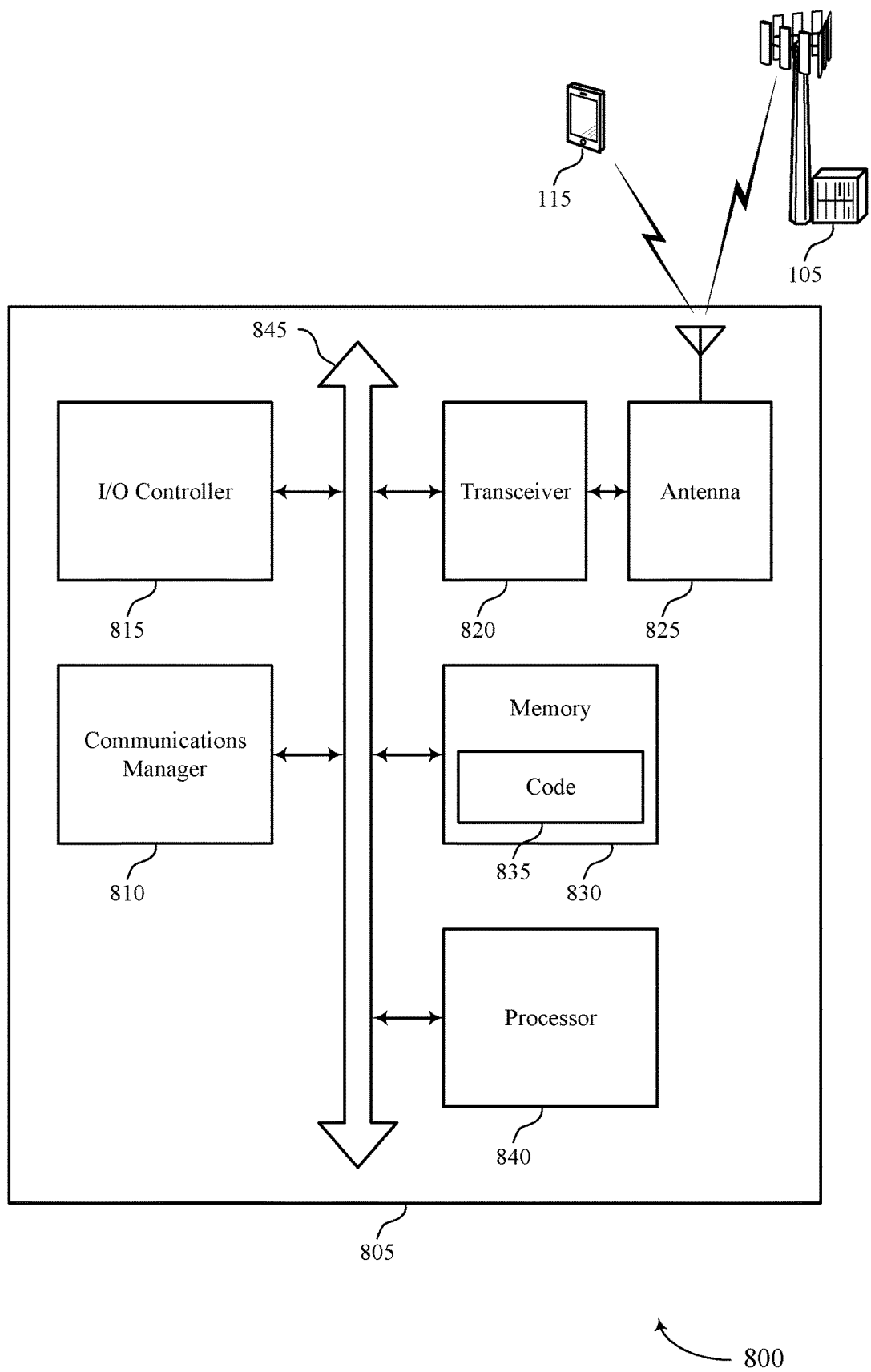
FIG. 8 shows a diagram of a system including a device that supports techniques for wireless communications using preconfigured uplink resources in accordance with aspects of the present disclosure.

FIG. 8 shows a diagram of a system 800 including a device 805 that supports techniques for wireless communications using preconfigured uplink resources in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, transmit, while in the idle mode, a first uplink transmission associated with a transport block on the allocated resources and according to one or more of the set of parameters, and monitor for a response to the first uplink transmission. The communications manager 810 may also receive a first downlink resource configuration for downlink communications in a connected mode, receive a second downlink resource configuration for downlink communications in an idle mode, the second downlink resource configuration including a set of parameters including one or more of a frequency hopping indicator or a CE mode indicator for the downlink communications in the idle mode, enter the idle mode, and receive, while in the idle mode, one or more downlink transmissions according to the first downlink resource configuration or the second downlink resource configuration. The communications manager 810 may also receive an uplink control channel configuration, the uplink control channel configuration including a repetition level indicator and a resource indicator for transmitting uplink control channel transmissions while in an idle mode, transition from a connected mode to the idle mode, determine, based on the uplink control channel configuration, a number of repetitions and a set of resources for transmitting an uplink control channel transmission in the idle mode, and transmit, while in the idle mode, the uplink control channel transmission according to the number of repetitions and the set of resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for wireless communications using preconfigured uplink resources).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
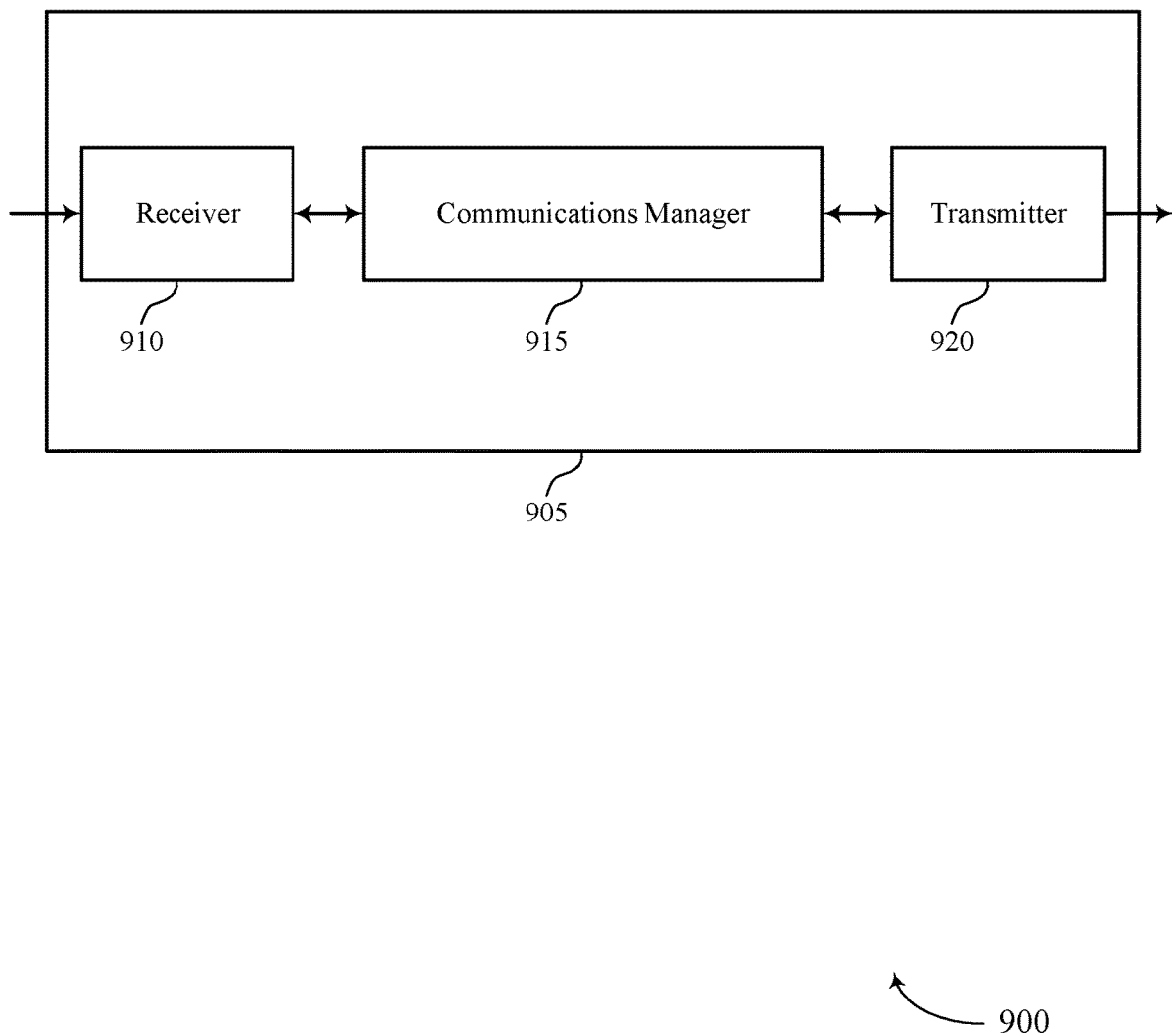
FIGS. 9 and 10 show block diagrams of devices that support techniques for wireless communications using preconfigured uplink resources in accordance with aspects of the present disclosure.

FIG. 9 shows a block diagram 900 of a device 905 that supports techniques for wireless communications using preconfigured uplink resources in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for wireless communications using preconfigured uplink resources, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receive, from the UE subsequent to the UE transitioning from the connected mode to the idle mode, a first uplink transmission associated with a transport block on the allocated resources and according to the uplink resource configuration, determine whether the first uplink transmission was successfully received, and transmit a response to the first uplink transmission based on whether the first uplink transmission was successfully received. The communications manager 915 may also transmit, to a UE, a first downlink resource configuration for downlink communications to the UE in a connected mode, transmit, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmit, subsequent to the UE transitioning from the connected mode to the idle mode, one or more downlink transmissions according to the first downlink resource configuration or the second downlink resource configuration. The communications manager 915 may also transmit, to a UE, an uplink control channel configuration, the uplink control channel configuration including a repetition level indicator and a resource indicator for transmitting uplink control channel transmissions while the UE is in an idle mode, determine, based on the uplink control channel configuration, a number of repetitions and a set of resources for receiving an uplink control channel transmission from the UE while the UE is in an idle mode, and receive, subsequent to the UE transitioning from a connected mode to the idle mode, the uplink control channel transmission according to the number of repetitions and the set of resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
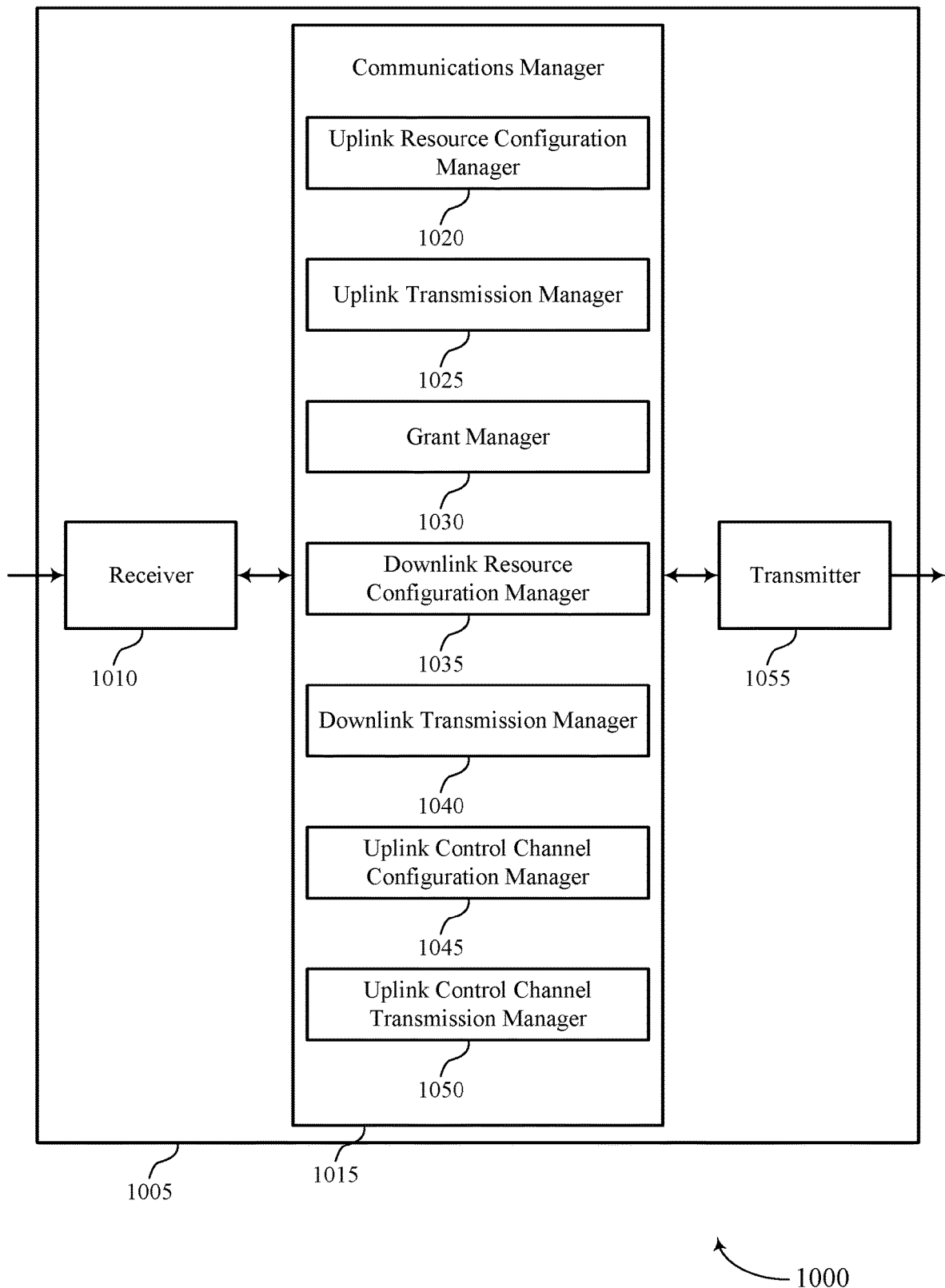

FIG. 10 shows a block diagram 1000 of a device 1005 that supports techniques for wireless communications using preconfigured uplink resources in accordance with aspects of the present disclosure. The device 1005 may be an example of aspects of a device 905, or a base station 105 as described herein. The device 1005 may include a receiver 1010, a communications manager 1015, and a transmitter 1055. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for wireless communications using preconfigured uplink resources, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink resource configuration manager 1020, an uplink transmission manager 1025, a grant manager 1030, a downlink resource configuration manager 1035, a downlink transmission manager 1040, an uplink control channel configuration manager 1045, and an uplink control channel transmission manager 1050. The communications manager 1015 may be an example of aspects of the communications manager 1210 described herein.

The uplink resource configuration manager 1020 may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications.

The uplink transmission manager 1025 may receive, from the UE subsequent to the UE transitioning from the connected mode to the idle mode, a first uplink transmission associated with a transport block on the allocated resources and according to the uplink resource configuration.

The grant manager 1030 may determine whether the first uplink transmission was successfully received and transmit a response to the first uplink transmission based on whether the first uplink transmission was successfully received.

The downlink resource configuration manager 1035 may transmit, to a UE, a first downlink resource configuration for downlink communications to the UE in a connected mode and transmit, to the UE, a second downlink resource configuration for downlink communications to the UE an idle mode, the second downlink resource configuration including a set of parameters including one or more of a frequency hopping indicator or a CE mode indicator for the downlink communications in the idle mode.

The downlink transmission manager 1040 may transmit, subsequent to the UE transitioning from the connected mode to the idle mode, one or more downlink transmissions according to the first downlink resource configuration or the second downlink resource configuration.

The uplink control channel configuration manager 1045 may transmit, to a UE, an uplink control channel configuration, the uplink control channel configuration including a repetition level indicator and a resource indicator for transmitting uplink control channel transmissions while the UE is in an idle mode.

The uplink control channel transmission manager 1050 may determine, based on the uplink control channel configuration, a number of repetitions and a set of resources for receiving an uplink control channel transmission from the UE while the UE is in an idle mode and receive, subsequent to the UE transitioning from a connected mode to the idle mode, the uplink control channel transmission according to the number of repetitions and the set of resources.

The transmitter 1055 may transmit signals generated by other components of the device 1005. In some examples, the transmitter 1055 may be collocated with a receiver 1010 in a transceiver module. For example, the transmitter 1055 may be an example of aspects of the transceiver 1220 described with reference to FIG. 12. The transmitter 1055 may utilize a single antenna or a set of antennas.

Figure 11:
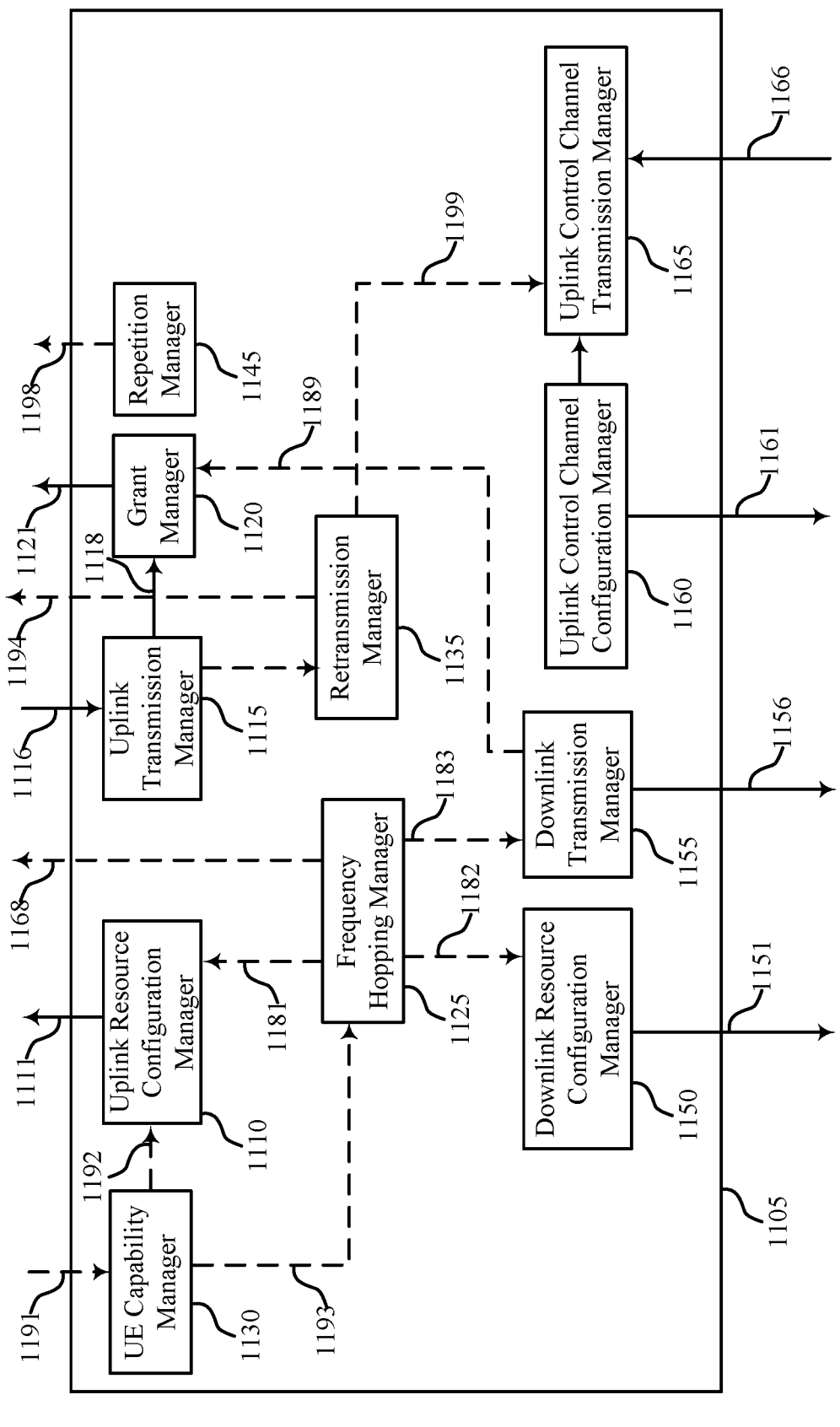
FIG. 11 shows a block diagram of a communications manager that supports techniques for wireless communications using preconfigured uplink resources in accordance with aspects of the present disclosure.

FIG. 11 shows a block diagram 1100 of a communications manager 1105 that supports techniques for wireless communications using preconfigured uplink resources in accordance with aspects of the present disclosure. The communications manager 1105 may be an example of aspects of a communications manager 915, a communications manager 1015, or a communications manager 1210 described herein. The communications manager 1105 may include an uplink resource configuration manager 1110, an uplink transmission manager 1115, a grant manager 1120, a frequency hopping manager 1125, a UE capability manager 1130, a retransmission manager 1135, a base station delay time component 1140, a repetition manager 1145, a downlink resource configuration manager 1150, a downlink transmission manager 1155, an uplink control channel configuration manager 1160, an uplink control channel transmission manager 1165, and a CE mode manager 1170. Each of these modules may communicate, directly or indirectly, with one another (e.g., via one or more buses).

The uplink resource configuration manager 1110 may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. For example, the uplink resource configuration manager 1110 may transmit one or more signals 1111 via a transceiver (e.g., as described with reference to FIG. 12) including information indicating the uplink resource configuration.

In some examples, the uplink resource configuration manager 1110 may transmit a set of uplink resource configurations for the uplink communications in the idle mode, the set of uplink resource configurations including the uplink resource configuration. In some examples, the uplink resource configuration manager 1110 may transmit, while the UE is in the idle mode, an indicator in a downlink control information message of an active uplink resource configuration for one or more retransmissions of the first uplink transmission. In some cases, the uplink resource configuration is communicated (e.g., transmitted and received) in a RRC message.

The uplink transmission manager 1115 may receive, from the UE subsequent to the UE transitioning from the connected mode to the idle mode, a first uplink transmission associated with a transport block on the allocated resources and according to the uplink resource configuration. For example, the uplink transmission manager 1115 may receive one or more signals 1116 via a transceiver (e.g., as described with reference to FIG. 12) including information for uplink transmissions.

In some examples, the uplink transmission manager 1115 may receive the first uplink transmission according to the first frequency hopping configuration for the first CE mode using the first frequency hopping interval based on a default CE mode for the UE in the idle mode. In some examples, the uplink transmission manager 1115 may receive the first uplink transmission according to the first frequency hopping configuration for the first CE mode using the first frequency hopping interval based on the CE mode indicator. In some examples, the uplink transmission manager 1115 may receive the first uplink transmission according to the second frequency hopping configuration for the second CE mode using the second frequency hopping interval based on the repetition level indicator indicating a number of repetitions for the first uplink transmission satisfying a threshold number of repetitions.

In some examples, the uplink transmission manager 1115 may receive the first uplink transmission according to the first frequency hopping configuration for the first CE mode using the first frequency hopping interval based on identifying that the UE was configured for the first CE mode at a time that the UE received the uplink resource configuration.

In some examples, the uplink transmission manager 1115 may receive a second uplink transmission associated with the transport block based on a grant. In some examples, the uplink transmission manager 1115 may receive a third uplink transmission based on the second timing advance. In some cases, the first uplink transmissions may be communicated in a PUSCH.

The grant manager 1120 may determine whether the first uplink transmission was successfully received. In some examples, the uplink transmission manager 1115 may pass information 1118 to the grant manager 1120, where the information 1118 may indicated whether the first uplink transmission was successfully received. In some examples, the grant manager 1120 may transmit a response to the first uplink transmission based on whether the first uplink transmission was successfully received. For example, the grant manager 1120 may transmit one or more signals 1121 via a transceiver (e.g., as described with reference to FIG. 12) including information indicating the response.

In some examples, the grant manager 1120 may determine that the first uplink transmission was not successfully received. In some examples, the grant manager 1120 may transmit, in the response to the first uplink transmission, a grant for one or more retransmissions of the first uplink transmission. In some examples, transmitting a downlink control channel message may include a grant for a downlink shared channel transmission, where the downlink control channel message includes a second frequency hopping indicator.

In some cases, the grant for the one or more retransmissions of the first uplink transmission includes a power control command indicating an adjustment to an uplink transmission power for the one or more retransmissions of the first uplink transmission, and where receiving the second uplink transmission is based on the indicated adjustment to the uplink transmission power, and where a correspondence between the power control command and the adjustment to the uplink transmission power for the one or more retransmissions of the first uplink transmission is different from a correspondence between power control commands and uplink transmission power adjustments for the connected mode.

The downlink resource configuration manager 1150 may transmit, to a UE, a first downlink resource configuration for downlink communications to the UE in a connected mode. For example, the downlink resource configuration manager 1150 may transmit one or more signals 151 via a transceiver (e.g., as described with reference to FIG. 12) including information indicating downlink resource configurations. In some examples, the downlink resource configuration manager 1150 may transmit, to the UE, a second downlink resource configuration for downlink communications to the UE an idle mode, the second downlink resource configuration including a set of parameters including one or more of a frequency hopping indicator or a CE mode indicator for the downlink communications in the idle mode.

In some examples, the downlink resource configuration manager 1150 may store a state of a downlink control channel frequency hopping indicator of the first downlink resource configuration when the second downlink resource configuration was transmitted to the UE, where the transmitting the one or more downlink transmissions is performed according to the stored state of the downlink control channel frequency hopping indicator.

The downlink transmission manager 1155 may transmit, subsequent to the UE transitioning from the connected mode to the idle mode, one or more downlink transmissions according to the first downlink resource configuration or the second downlink resource configuration. For example, the downlink transmission manager 1155 may transmit one or more signals 1156 via a transceiver (e.g., as described with reference to FIG. 12) including information indicating the downlink transmissions. In some examples, the downlink transmission manager 1155 may transmit the downlink shared channel transmission based on the second frequency hopping indicator.

In some examples, the downlink transmission manager 1155 may transmit the one or more downlink transmissions according to the first set of frequency hopping parameters based on the CE mode indicator. In some examples, the downlink transmission manager 1155 may transmit the one or more downlink transmissions according to the first number of repetitions or the second number of repetitions based on the CE mode indicator. In some examples, the downlink transmission manager 1155 may transmit the one or more downlink transmissions according to the second set of frequency hopping parameters based on a number of repetitions of the one or more downlink transmissions satisfying a threshold number of repetitions. In some examples, the downlink transmission manager 1155 may transmit the one or more downlink transmissions according to the first set of frequency hopping parameters based on determining that the UE was configured for the first CE mode at a time that the UE received the second downlink resource configuration.

The uplink control channel configuration manager 1160 may transmit, to a UE, an uplink control channel configuration, the uplink control channel configuration including a repetition level indicator and a resource indicator for transmitting uplink control channel transmissions while the UE is in an idle mode. For example, the uplink control channel configuration manager 1160 may transmit one or more signals 1161 via a transceiver (e.g., as described with reference to FIG. 12) including information indicating uplink control channel configurations. In some cases, the uplink control channel configuration is transmitted in a RRC message.

The uplink control channel transmission manager 1165 may determine, based on the uplink control channel configuration, a number of repetitions and a set of resources for receiving an uplink control channel transmission from the UE while the UE is in an idle mode. In some examples, the uplink control channel transmission manager 1165 may receive, subsequent to the UE transitioning from a connected mode to the idle mode, the uplink control channel transmission according to the number of repetitions and the set of resources. For example, the uplink control channel transmission manager 1165 may receive one or more signals 1166 via a transceiver (e.g., as described with reference to FIG. 12) including information for the uplink control channel transmission. In some cases, the uplink control channel transmission includes a HARQ message, an ACK message, or a combination thereof.

The frequency hopping manager 1125 may transmit a system information message including a first frequency hopping configuration for a first CE mode with a first frequency hopping interval and a second frequency hopping configuration for a second CE mode with a second frequency hopping interval, where the first frequency hopping interval is different than the second frequency hopping interval. In some examples, the frequency hopping manager 1125 may transmit a system information message, the system information message including a frequency hopping configuration indicating a frequency offset and a number of transmission subframes for the frequency hopping. In some examples, the frequency hopping manager 1125 may transmit a first set of frequency hopping parameters associated with a first CE mode and a second set of frequency hopping parameters associated with a second CE mode. For example, the frequency hopping manager 1125 may transmit one or more signals 1168 via a transceiver (e.g., as described with reference to FIG. 12) including information indicating the system information.

In some cases, the frequency hopping indicator indicates whether frequency hopping is enabled for the first uplink transmission, and the first uplink transmission is received according to the frequency hopping indicator. In some cases, the uplink resource configuration includes a frequency hopping configuration for the uplink communications indicating a frequency offset or a number of transmission subframes for the frequency hopping. In some cases, the uplink resource configuration includes a first frequency hopping indicator that indicates whether frequency hopping is enabled for the first uplink transmission and for the one or more retransmissions of the first uplink transmission, and the second uplink transmission is received according to the first frequency hopping indicator.

In some cases, the uplink resource configuration includes a first frequency hopping indicator that indicates whether frequency hopping is enabled for the first uplink transmission and a second frequency hopping indicator that indicates whether frequency hopping is enabled for the one or more retransmissions of the first uplink transmission, and the second uplink transmission is received according to the second frequency hopping indicator.

In some examples, the downlink transmission manager 1155 may pass information 1189 to the grant manager 1120, where the information 1189 may include transmission information for the grant. In some cases, the grant for one or more retransmissions of the first uplink transmission includes a second frequency hopping indicator that indicates whether frequency hopping is enabled for the one or more retransmissions of the first uplink transmission, and the one or more retransmissions of the first uplink transmission are received according to the second frequency hopping indicator. In some cases, the grant for one or more retransmissions of the first uplink transmission includes a second frequency hopping indicator that indicates whether frequency hopping is enabled for the one or more retransmissions of the first uplink transmission, and the second uplink transmission is received according to the frequency hopping indicator and the second frequency hopping indicator.

In some cases, the first downlink resource configuration includes a downlink control channel frequency hopping indicator, and where the transmitting the one or more downlink transmissions is performed according to the downlink control channel frequency hopping indicator. In some cases, the frequency hopping indicator includes a first frequency hopping indicator associated with a physical downlink control channel and a second frequency hopping indicator associated with a physical downlink shared channel.

In some examples, the frequency hopping manager 1125 may pass information 1181 to the uplink resource configuration manager 1110, where the information 1181 may include the indications and configurations described herein. In some examples, the frequency hopping manager 1125 may pass information 1182 to the downlink resource configuration manager 1150, where the information 1182 may include the indications and configurations described herein. In some examples, the frequency hopping manager 1125 may pass information 1183 to the downlink transmission manager 1155, where the information 1183 may include the indications and configurations described herein.

The UE capability manager 1130 may receive a capability message including an indication of a UE capability to support frequency hopping for the uplink communications in the connected mode and the uplink communications in the idle mode, where the frequency hopping indicator is based on the UE capability to support frequency hopping. For example, the UE capability manager 1130 may receive one or more signals 1191 via a transceiver (e.g., as described with reference to FIG. 12) including information for the capability message.

In some examples, the UE capability manager 1130 may receive a capability message including a first indicator of a UE capability to support frequency hopping for the uplink communications in the connected mode and a second indicator of a UE capability to support frequency hopping for the uplink communications in the idle mode, where the frequency hopping indicator is based on the UE capability to support frequency hopping for the uplink communications in the idle mode. In some cases, the second indicator includes a single capability indicator of whether the UE supports frequency hopping for all channels. In some cases, the second indicator includes a downlink capability indicator indicating whether the UE supports frequency hopping for downlink channels and an uplink capability indicator indicating whether the UE supports frequency hopping for uplink channels. In some cases, the second indication includes a set of capability indicators of whether the UE supports frequency hopping for a set of corresponding channels.

In some examples, the UE capability manager 1130 may receive a capability message including a feature capability indication of UE capability support for the enhanced TBS, the MCS, the enhanced bandwidth, the sub-PRB allocation, or the flexible resource allocation for the uplink communications in the idle mode, where the feature support indication is based on the feature capability indication. In some cases, an enhanced TBS, a MCS, an enhanced bandwidth, sub-PRB allocation, or flexible resource allocation for the uplink communications in the idle mode, and where a set of fields of a downlink control information message transmitted while the UE is in the idle mode is interpreted based on the feature support indication.

In some examples, the UE capability manager 1130 may pass information 1192 to the uplink resource configuration manager 1110, where the information 1192 may include capability information. In some examples, the UE capability manager 1130 may pass information 1193 to the frequency hopping manager 1125, where the information 1193 may include capability information.

The retransmission manager 1135 may transmit a second response to the second uplink transmission, the second response including a second grant for one or more second retransmissions of the first uplink transmission, where the second grant includes a second timing advance command indicating a second timing advance to be applied for the one or more second retransmissions of the first uplink transmission. For example, the retransmission manager 1135 may transmit one or more signals 1194 via a transceiver (e.g., as described with reference to FIG. 12) including information indicating the second response. In some examples, the retransmission manager 1135 may pass information 1199 to the uplink control channel transmission manager 1165, where the information 1199 may include retransmission information.

In some cases, the grant for the one or more retransmissions of the first uplink transmission includes a first timing advance command indicating a first timing advance to be applied for the one or more retransmissions of the first uplink transmission, where receiving the second uplink transmission is based on the first timing advance. In some cases, the grant for the one or more retransmissions of the first uplink transmission includes a repetition indicator that indicates a number of repetitions for the UE to transmit the one or more retransmissions of the first uplink transmission, where the second uplink transmission is received in accordance with the indicated number of repetitions.

The base station delay time component 1140 may determine a delay time between transmitting the grant and receiving the second uplink transmission. In some cases, the delay time between transmitting the grant and receiving the second uplink transmission is based on a presence of the first timing advance command in the grant. In some cases, a first delay time between transmitting grants and receiving uplink transmissions is configured for uplink transmissions in the connected mode, and a second delay time between transmitting the grant and receiving the second uplink transmission, where the second delay time is different than the first delay time.

The repetition manager 1145 may transmit a system information message, the system information message including a first maximum repetition indicator that indicates a maximum number of repetitions for a first CE mode and a second maximum repetition indicator that indicates a maximum number of repetitions for a second CE mode, where the uplink resource configuration includes the CE mode indicator, and where a correspondence between a value for the repetition indicator and the number of repetitions indicated by the repetition indicator is determined based on the first maximum repetition indicator, the second maximum repetition indicator, and the CE mode indicator. For example, the repetition manager 1145 may transmit one or more signals 1198 via a transceiver (e.g., as described with reference to FIG. 12) including information indicating the system information.

In some examples, transmitting a downlink control channel message including a grant for a downlink shared channel transmission, where the downlink control channel message includes a repetition indicator associated with the downlink shared channel transmission, and where the second downlink resource configuration includes an indicator of a correspondence between a value for the repetition indicator and a number of repetitions indicated by the repetition indicator.

In some examples, the repetition manager 1145 may transmit an indication of a CE level to the UE, where determining the number of repetitions and the set of resources for receiving the uplink control channel transmission is based on the CE level. In some examples, the repetition manager 1145 may determine the number of repetitions for the uplink control channel transmission based on a CE mode for the uplink control channel transmission.

In some cases, the uplink resource configuration includes an indicator of a correspondence between a value for the repetition indicator and the number of repetitions indicated by the repetition indicator. In some cases, the indicator of the correspondence between the value for the repetition indicator and the number of repetitions indicated by the repetition indicator includes a maximum a number of repetitions for the UE to transmit the one or more retransmissions of the first uplink transmission. In some cases, the number of repetitions indicated by the repetition indicator is based on a number of repetitions for the first uplink transmission. In some cases, the indicator of the correspondence between the value for the repetition indicator and the number of repetitions indicated by the repetition indicator includes a maximum a number of repetitions for the downlink shared channel transmission.

The CE mode manager 1170 may transmit a CE mode indicator indicating the CE mode for the uplink control channel transmission. In some examples, the CE mode manager 1170 may determine the CE mode for the uplink control channel transmission based on a number of repetitions of a downlink transmission.

Figure 12:
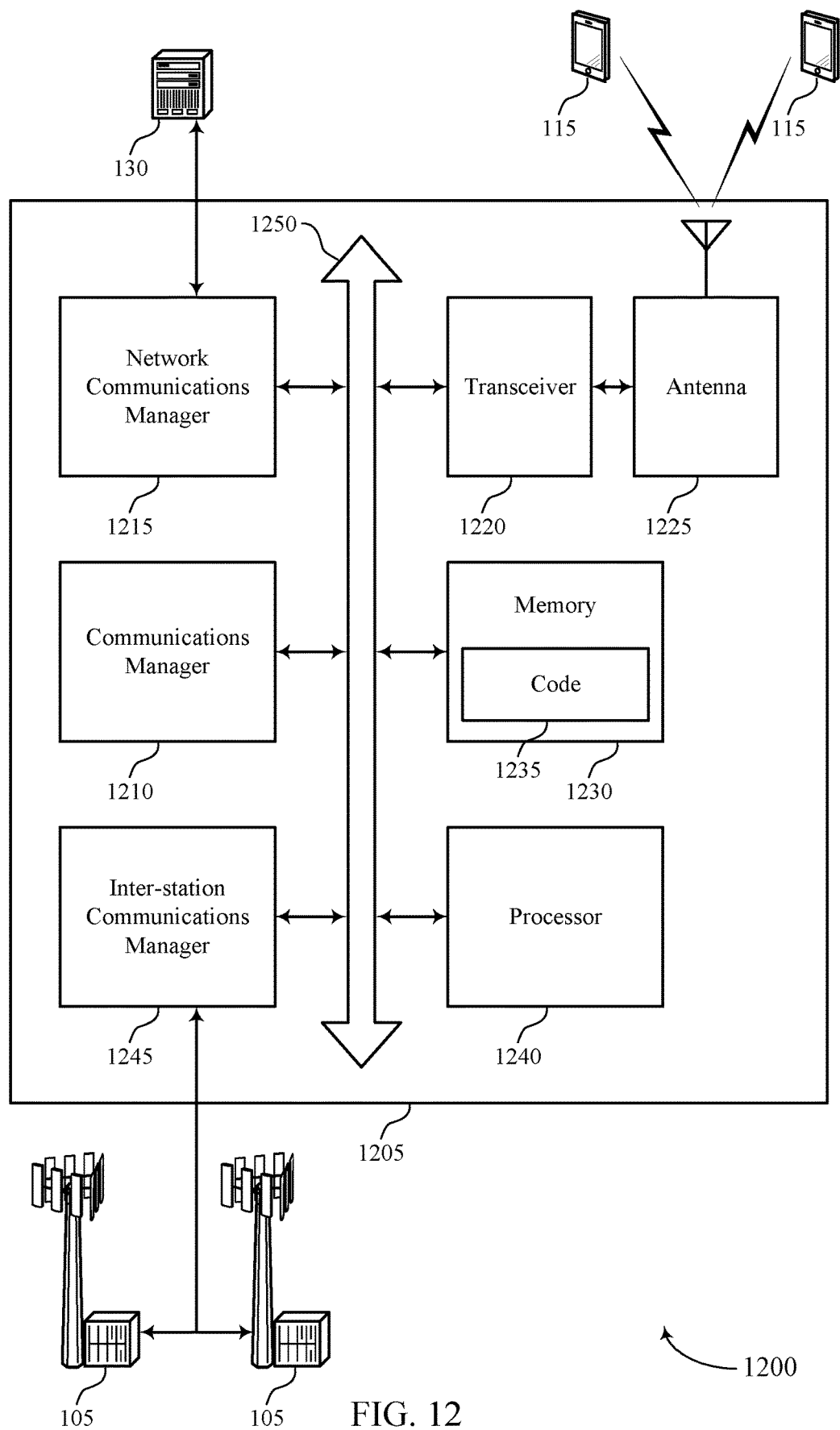
FIG. 12 shows a diagram of a system including a device that supports techniques for wireless communications using preconfigured uplink resources in accordance with aspects of the present disclosure.

FIG. 12 shows a diagram of a system 1200 including a device 1205 that supports techniques for wireless communications using preconfigured uplink resources in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, receive, from the UE subsequent to the UE transitioning from the connected mode to the idle mode, a first uplink transmission associated with a transport block on the allocated resources and according to the uplink resource configuration, determine whether the first uplink transmission was successfully received, and transmit a response to the first uplink transmission based on whether the first uplink transmission was successfully received. The communications manager 1210 may also transmit, to a UE, a first downlink resource configuration for downlink communications to the UE in a connected mode, transmit, to the UE, a second downlink resource configuration for downlink communications to the UE an idle mode, the second downlink resource configuration including a set of parameters including one or more of a frequency hopping indicator or a CE mode indicator for the downlink communications in the idle mode, and transmit, subsequent to the UE transitioning from the connected mode to the idle mode, one or more downlink transmissions according to the first downlink resource configuration or the second downlink resource configuration. The communications manager 1210 may also transmit, to a UE, an uplink control channel configuration, the uplink control channel configuration including a repetition level indicator and a resource indicator for transmitting uplink control channel transmissions while the UE is in an idle mode, determine, based on the uplink control channel configuration, a number of repetitions and a set of resources for receiving an uplink control channel transmission from the UE while the UE is in an idle mode, and receive, subsequent to the UE transitioning from a connected mode to the idle mode, the uplink control channel transmission according to the number of repetitions and the set of resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for wireless communications using preconfigured uplink resources).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
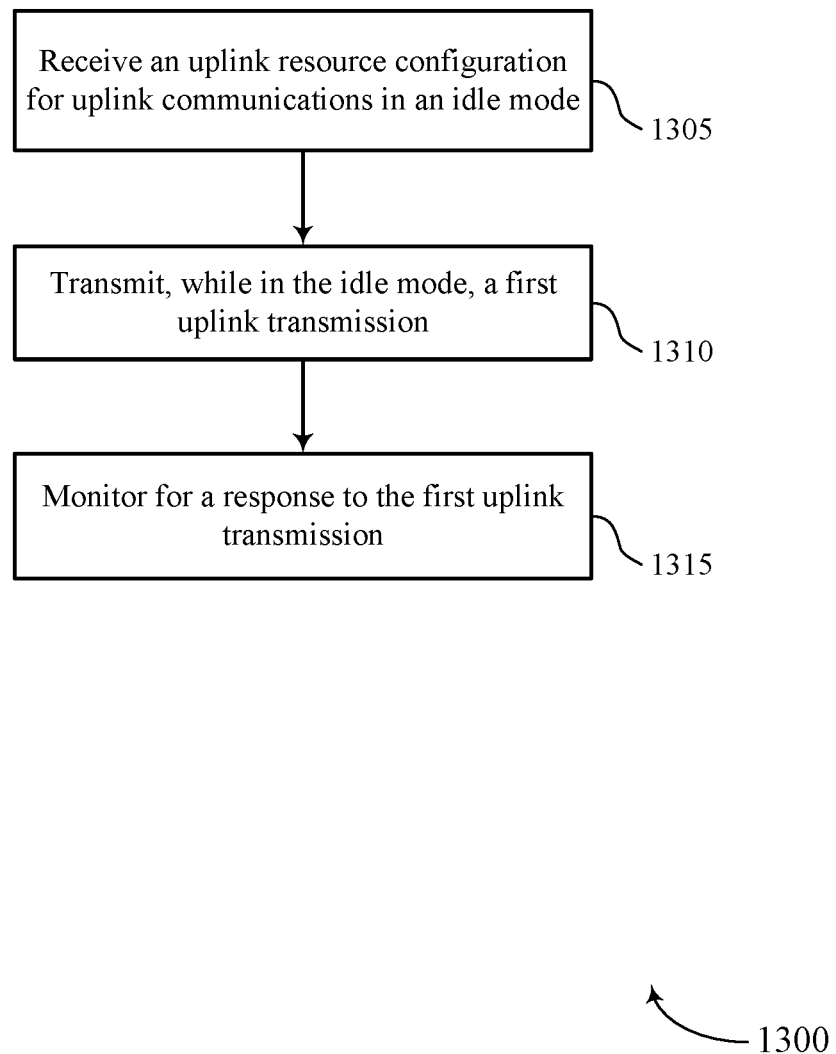
FIGS. 13 through 24 show flowcharts illustrating methods that support techniques for wireless communications using preconfigured uplink resources in accordance with aspects of the present disclosure.

FIG. 13 shows a flowchart illustrating a method 1300 that supports techniques for wireless communications using pre-configured uplink resources in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive an uplink resource configuration for uplink communications in an idle mode, where the uplink resource configuration may include an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. For example, the UE may identify time-frequency resources over which the uplink resource configuration may be communicated, demodulate a transmission including the uplink resource configuration over the time-frequency resources, and decode the demodulated transmission to obtain bits that indicate the uplink resource configuration. In some examples, the uplink resource configuration may include one or more information bits indicating values for each of the frequency hopping indicator, the frequency hopping interval indicator, the CE mode indicator, the repetition level indicator, and/or the subcarrier spacing for the uplink communications. The operations of 1305 may be performed according to the methods described herein. In some examples, aspects of the operations of 1305 may be performed by an uplink resource configuration module as described with reference to FIGS. 5 through 8.

At 1310, the UE may transmit (e.g., to the base station), while in the idle mode, a first uplink transmission associated with a transport block on the allocated resources and according to one or more of the set of parameters. For example, the UE may identify time-frequency resources according to the allocated resources for a sequence of bits that may be used to communicate the first uplink transmission. The UE may encode and modulate the bits for communicating the first uplink transmission over the identified time-frequency resources, and the UE may transmit the encoded and modulated bits over the time-frequency resources. The operations of 1310 may be performed according to the methods described herein. In some examples, aspects of the operations of 1310 may be performed by an uplink transmission module as described with reference to FIGS. 5 through 8.

At 1315, the UE may monitor for a response to the first uplink transmission. For example, the UE may identify time-frequency resources over which the base station may transmit a message to the UE in response to the first uplink transmission. The UE may accordingly monitor the identified time-frequency resources for transmissions from the base station in response to the first uplink transmission. The operations of 1315 may be performed according to the methods described herein. In some examples, aspects of the operations of 1315 may be performed by a grant module as described with reference to FIGS. 5 through 8.

Figure 14:
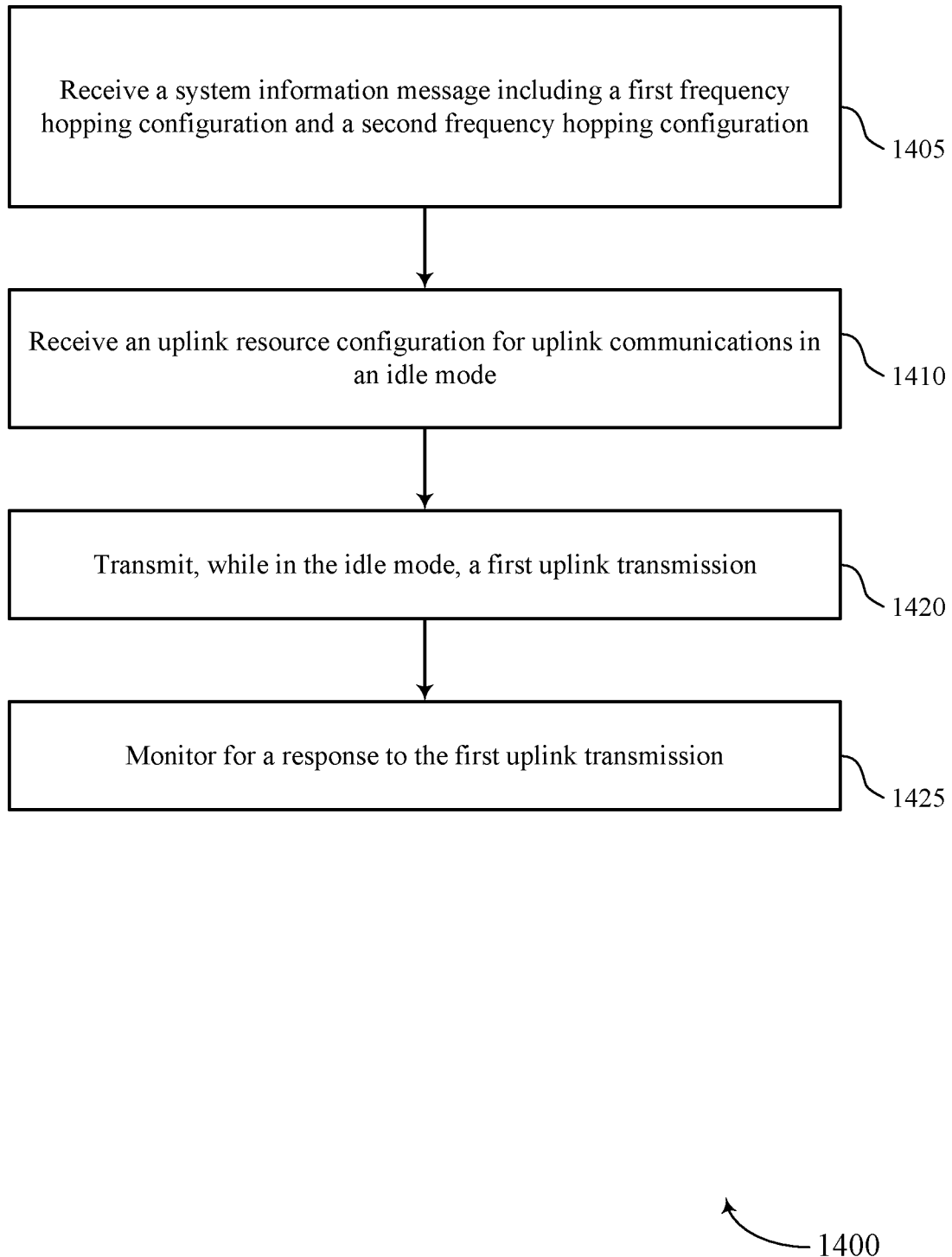

FIG. 14 shows a flowchart illustrating a method 1400 that supports techniques for wireless communications using pre-configured uplink resources in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a system information message including a first frequency hopping configuration for a first CE mode with a first frequency hopping interval and a second frequency hopping configuration for a second CE mode with a second frequency hopping interval, where the first frequency hopping interval is different than the second frequency hopping interval. For example, the UE may identify time-frequency resources over which the system information message may be communicated, demodulate a transmission including the system information message over the time-frequency resources, and decode the demodulated transmission to obtain bits that indicate the system information message. In some examples, the system information message may include one or more information bits indicating values for the first CE mode and/or the second CE mode. The operations of 1405 may be performed according to the methods described herein. In some examples, aspects of the operations of 1405 may be performed by a frequency hopping module as described with reference to FIGS. 5 through 8.

At 1410, the UE may receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, where the frequency hopping indicator indicates whether frequency hopping is enabled for the first uplink transmission, and the first uplink transmission is transmitted according to the frequency hopping indicator. For example, the UE may identify time-frequency resources over which the uplink resource configuration may be communicated, demodulate a transmission including the uplink resource configuration over the time-frequency resources, and decode the demodulated transmission to obtain bits that indicate the uplink resource configuration. In some examples, the uplink resource configuration may include one or more information bits indicating values for each of a frequency hopping indicator, a frequency hopping interval indicator, a CE mode indicator, a repetition level indicator, and/or a subcarrier spacing for the uplink communications. The operations of 1410 may be performed according to the methods described herein. In some examples, aspects of the operations of 1410 may be performed by an uplink resource configuration module as described with reference to FIGS. 5 through 8.

At 1415, the UE may transmit, while in the idle mode, a first uplink transmission associated with a transport block on the allocated resources and according to one or more of the set of parameters. For example, the UE may identify time-frequency resources according to the allocated resources for a sequence of bits that may be used to communicate the first uplink transmission. The UE may encode and modulate the bits for communicating the first uplink transmission over the identified time-frequency resources, and the UE may transmit the encoded and modulated bits over the time-frequency resources. The operations of 1415 may be performed according to the methods described herein. In some examples, aspects of the operations of 1415 may be performed by an uplink transmission module as described with reference to FIGS. 5 through 8.

At 1420, the UE may monitor for a response to the first uplink transmission. For example, the UE may identify time-frequency resources over which the base station may transmit a message to the UE in response to the first uplink transmission. The UE may accordingly monitor the identified time-frequency resources for transmissions from the base station in response to the first uplink transmission. The operations of 1420 may be performed according to the methods described herein. In some examples, aspects of the operations of 1420 may be performed by a grant module as described with reference to FIGS. 5 through 8.

Figure 15:
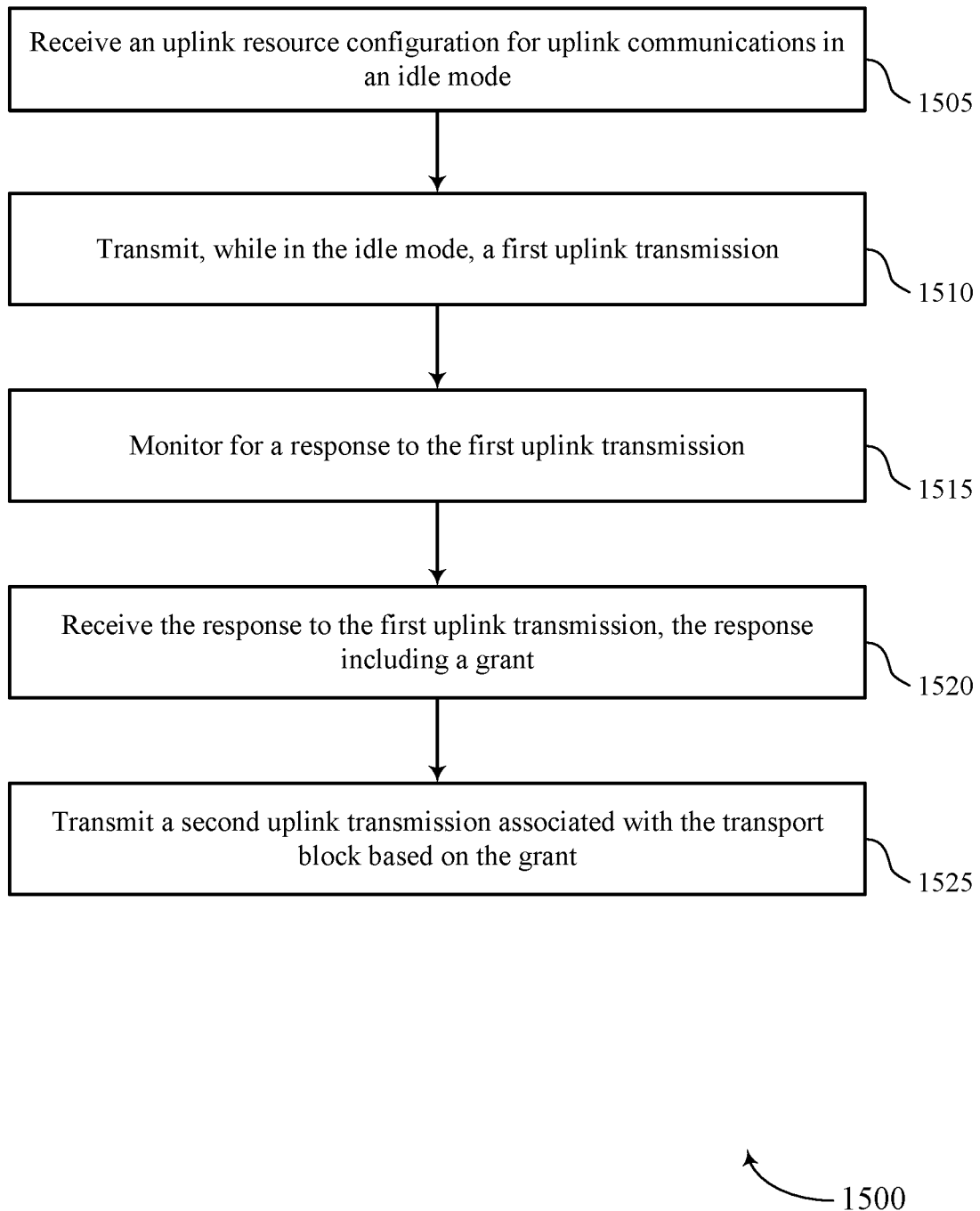

FIG. 15 shows a flowchart illustrating a method 1500 that supports techniques for wireless communications using pre-configured uplink resources in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive an uplink resource configuration for uplink communications in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. For example, the UE may identify time-frequency resources over which the uplink resource configuration may be communicated, demodulate a transmission including the uplink resource configuration over the time-frequency resources, and decode the demodulated transmission to obtain bits that indicate the uplink resource configuration. In some examples, the uplink resource configuration may include one or more information bits indicating values for each of the frequency hopping indicator, the frequency hopping interval indicator, the CE mode indicator, the repetition level indicator, and/or the subcarrier spacing for the uplink communications. The operations of 1505 may be performed according to the methods described herein. In some examples, aspects of the operations of 1505 may be performed by an uplink resource configuration module as described with reference to FIGS. 5 through 8.

At 1510, the UE may transmit, while in the idle mode, a first uplink transmission associated with a transport block on the allocated resources and according to one or more of the set of parameters. For example, the UE may identify time-frequency resources according to the allocated resources for a sequence of bits that may be used to communicate the first uplink transmission. The UE may encode and modulate the bits for communicating the first uplink transmission over the identified time-frequency resources, and the UE may transmit the encoded and modulated bits over the time-frequency resources. The operations of 1510 may be performed according to the methods described herein. In some examples, aspects of the operations of 1510 may be performed by an uplink transmission module as described with reference to FIGS. 5 through 8.

At 1515, the UE may monitor for a response to the first uplink transmission. For example, the UE may identify time-frequency resources over which the base station may transmit a message to the UE in response to the first uplink transmission. The UE may accordingly monitor the identified time-frequency resources for transmissions from the base station in response to the first uplink transmission. The operations of 1515 may be performed according to the methods described herein. In some examples, aspects of the operations of 1515 may be performed by a grant module as described with reference to FIGS. 5 through 8.

At 1520, the UE may receive the response to the first uplink transmission, the response including a grant for one or more retransmissions of the first uplink transmission. For example, the UE may identify time-frequency resources over which the grant may be communicated, demodulate a transmission including the grant over the time-frequency resources, and decode the grant to obtain bits that indicate grant for one or more retransmissions of the first uplink transmission. In some examples, the UE may receive the grant over the time-frequency resources according to the monitoring at 1510. In some examples, the grant may include one or more information bits indicating a set of time-frequency resources for the one or more retransmissions. The operations of 1520 may be performed according to the methods described herein. In some examples, aspects of the operations of 1520 may be performed by a grant module as described with reference to FIGS. 5 through 8.

At 1525, the UE may transmit a second uplink transmission associated with the transport block based on the grant. For example, the UE may identify time-frequency resources according to the allocated resources for a sequence of bits that may be used to communicate the second uplink transmission, for example, according to the grant received at 1520. The UE may encode and modulate the bits for communicating the second uplink transmission over the identified time-frequency resources, and the UE may transmit the encoded and modulated bits over the time-frequency resources. The operations of 1525 may be performed according to the methods described herein. In some examples, aspects of the operations of 1525 may be performed by an uplink transmission module as described with reference to FIGS. 5 through 8.

Figure 16:
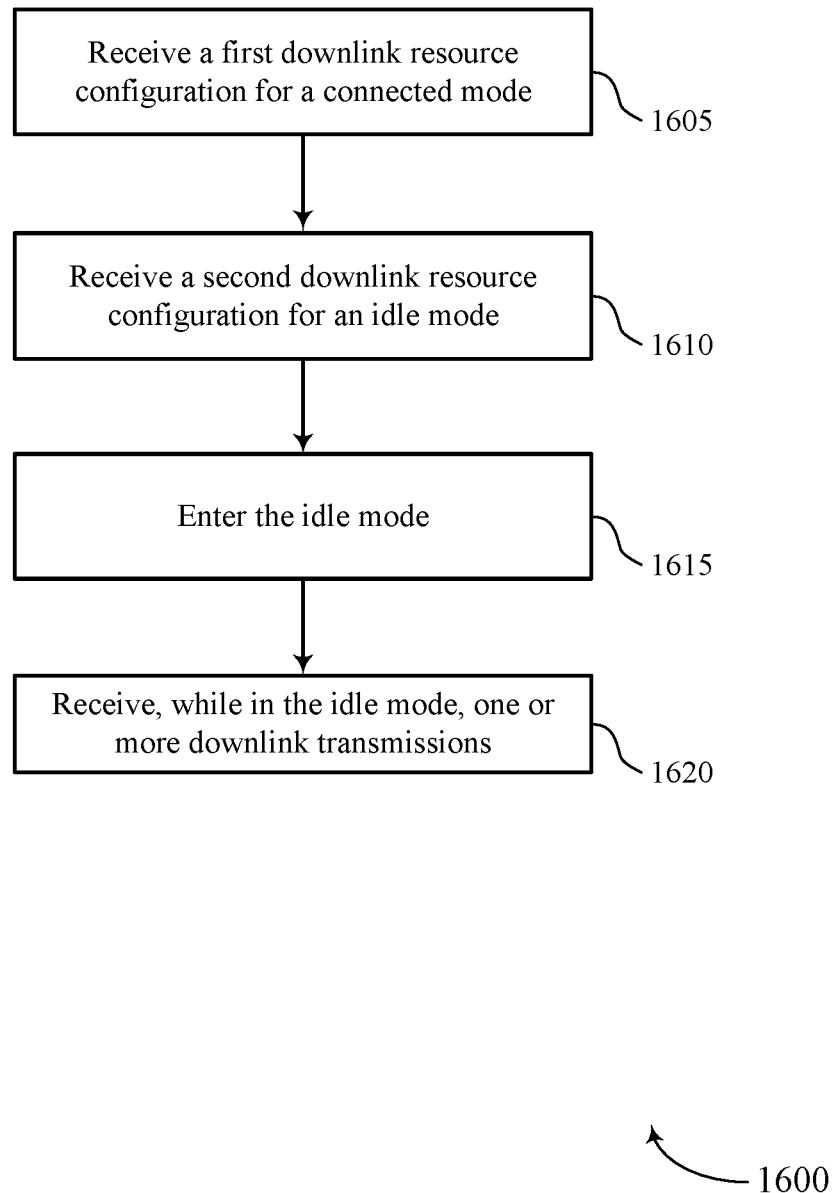

FIG. 16 shows a flowchart illustrating a method 1600 that supports techniques for wireless communications using pre-configured uplink resources in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive a first downlink resource configuration for downlink communications in a connected mode. For example, the UE may identify time-frequency resources over which the first uplink resource configuration may be communicated, demodulate a transmission including the first uplink resource configuration over the time-frequency resources, and decode the demodulated transmission to obtain bits that indicate the first uplink resource configuration. In some examples, the first uplink resource configuration may include one or more information bits indicating parameters for receiving transmissions during an idle mode. The operations of 1605 may be performed according to the methods described herein. In some examples, aspects of the operations of 1605 may be performed by a downlink resource configuration module as described with reference to FIGS. 5 through 8.

At 1610, the UE may receive a second downlink resource configuration for downlink communications in an idle mode, the second downlink resource configuration including a set of parameters including one or more of a frequency hopping indicator or a CE mode indicator for the downlink communications in the idle mode. For example, the UE may identify time-frequency resources over which the first uplink resource configuration may be communicated, demodulate a transmission including the first uplink resource configuration over the time-frequency resources, and decode the demodulated transmission to obtain bits that indicate the first uplink resource configuration. In some examples, the first uplink resource configuration may include one or more information bits indicating parameters for receiving transmissions during an idle mode, such as the frequency hopping indicator and/or CE mode indicator. The operations of 1610 may be performed according to the methods described herein. In some examples, aspects of the operations of 1610 may be performed by a downlink resource configuration module as described with reference to FIGS. 5 through 8.

At 1615, the UE may enter the idle mode. The operations of 1615 may be performed according to the methods described herein. For example, the UE may disable or change a configuration for one or more components such that the UE may consume a relatively lower amount of power. In some examples, aspects of the operations of 1615 may be performed by an idle mode module as described with reference to FIGS. 5 through 8.

At 1620, the UE may receive, while in the idle mode, one or more downlink transmissions according to the first downlink resource configuration or the second downlink resource configuration. For example, the UE may identify time-frequency resources over which the downlink transmissions may be communicated, demodulate a transmission including the downlink transmissions over the time-frequency resources, and decode the downlink transmissions to obtain bits included in the downlink transmissions. In some examples, the UE may receive the downlink transmissions while operating in the idle mode using one or more parameters according to the first downlink resource configuration or the second downlink resource configuration. The operations of 1620 may be performed according to the methods described herein. In some examples, aspects of the operations of 1620 may be performed by a downlink transmission module as described with reference to FIGS. 5 through 8.

Figure 17:
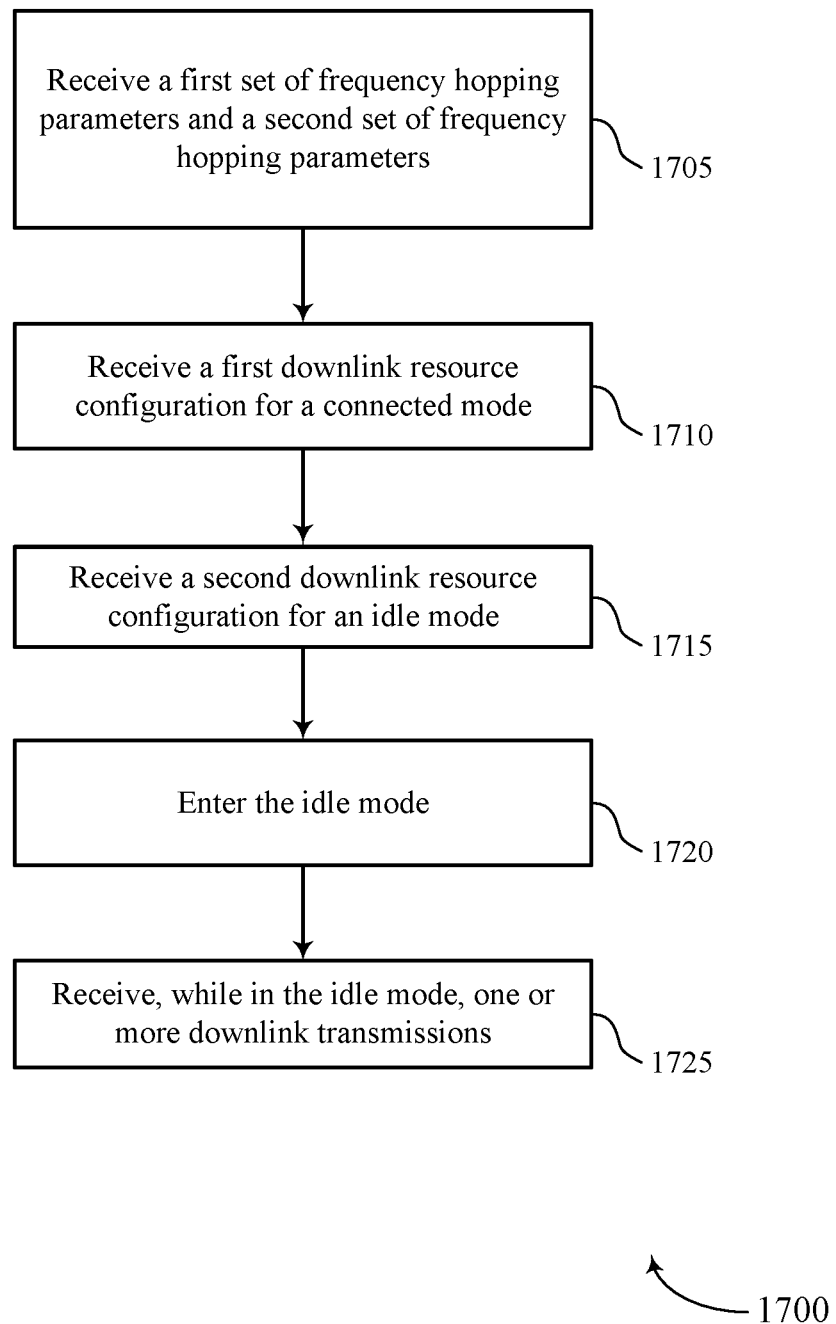

FIG. 17 shows a flowchart illustrating a method 1700 that supports techniques for wireless communications using preconfigured uplink resources in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive a first set of frequency hopping parameters associated with a first CE mode and a second set of frequency hopping parameters associated with a second CE mode. For example, the UE may identify time-frequency resources over which the a transmission including the first set of frequency hopping parameters may be communicated, demodulate the transmission including the first set of frequency hopping parameters over the time-frequency resources, and decode the demodulated transmission to obtain bits that indicate the first set of frequency hopping parameters. The operations of 1705 may be performed according to the methods described herein. In some examples, aspects of the operations of 1705 may be performed by a frequency hopping module as described with reference to FIGS. 5 through 8.

At 1710, the UE may receive a first downlink resource configuration for downlink communications in a connected mode. For example, the UE may identify time-frequency resources over which the first uplink resource configuration may be communicated, demodulate a transmission including the first uplink resource configuration over the time-frequency resources, and decode the demodulated transmission to obtain bits that indicate the first uplink resource configuration. In some examples, the first uplink resource configuration may include one or more information bits indicating parameters for receiving transmissions during an idle mode. The operations of 1710 may be performed according to the methods described herein. In some examples, aspects of the operations of 1710 may be performed by a downlink resource configuration module as described with reference to FIGS. 5 through 8.

At 1715, the UE may receive a second downlink resource configuration for downlink communications in an idle mode, the second downlink resource configuration including a set of parameters including one or more of a frequency hopping indicator or a CE mode indicator for the downlink communications in the idle mode. For example, the UE may identify time-frequency resources over which the first uplink resource configuration may be communicated, demodulate a transmission including the first uplink resource configuration over the time-frequency resources, and decode the demodulated transmission to obtain bits that indicate the first uplink resource configuration. In some examples, the first uplink resource configuration may include one or more information bits indicating parameters for receiving transmissions during an idle mode, such as the frequency hopping indicator and/or CE mode indicator. The operations of 1715 may be performed according to the methods described herein. In some examples, aspects of the operations of 1715 may be performed by a downlink resource configuration module as described with reference to FIGS. 5 through 8.

At 1720, the UE may enter the idle mode. For example, the UE may disable or change a configuration for one or more components such that the UE may consume a relatively lower amount of power. The operations of 1720 may be performed according to the methods described herein. In some examples, aspects of the operations of 1720 may be performed by an idle mode module as described with reference to FIGS. 5 through 8.

At 1725, the UE may receive, while in the idle mode, one or more downlink transmissions according to the first downlink resource configuration or the second downlink resource configuration. For example, the UE may identify time-frequency resources over which the downlink transmissions may be communicated, demodulate a transmission including the downlink transmissions over the time-frequency resources, and decode the downlink transmissions to obtain bits included in the downlink transmissions. In some examples, the UE may receive the downlink transmissions while operating in the idle mode using one or more parameters according to the first downlink resource configuration or the second downlink resource configuration (e.g., using the first or second set of frequency hopping parameters). The operations of 1725 may be performed according to the methods described herein. In some examples, aspects of the operations of 1725 may be performed by a downlink transmission module as described with reference to FIGS. 5 through 8.

Figure 18:
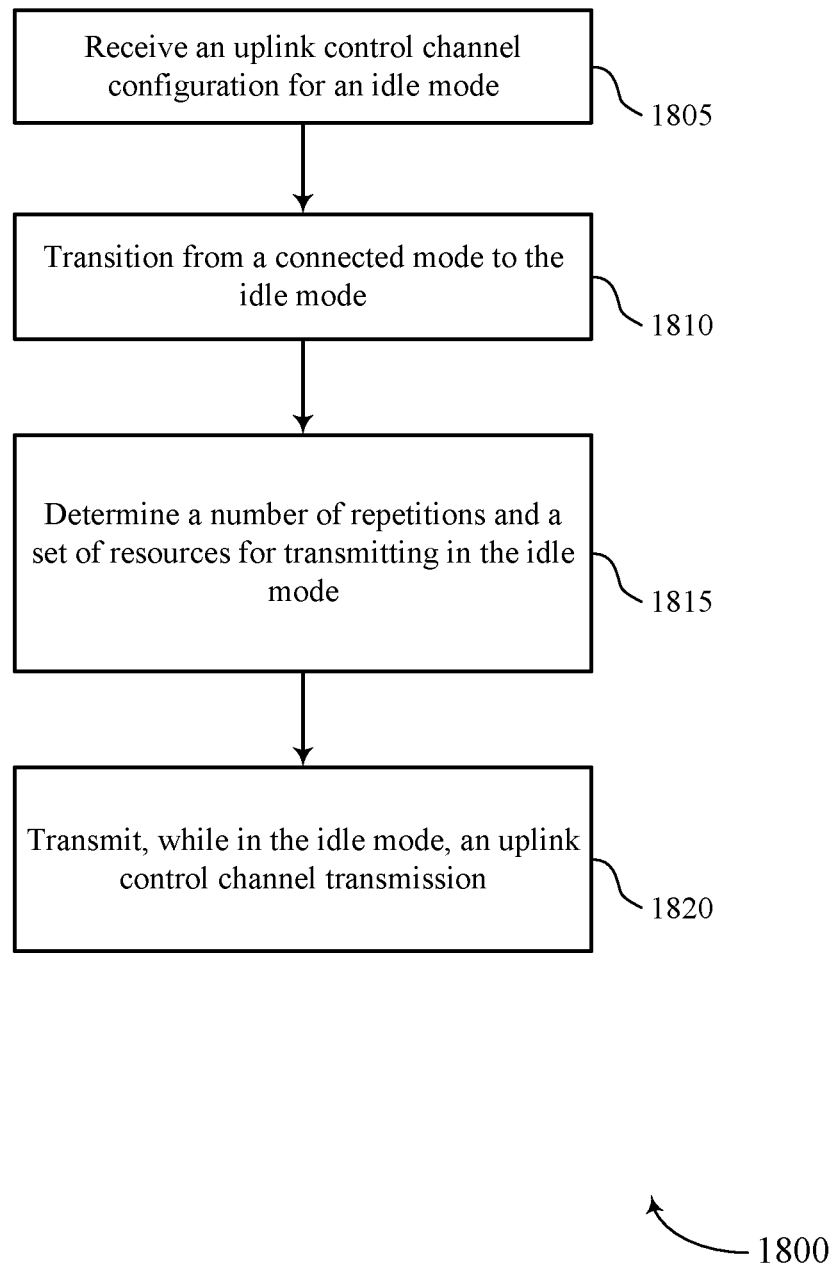

FIG. 18 shows a flowchart illustrating a method 1800 that supports techniques for wireless communications using preconfigured uplink resources in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may receive an uplink control channel configuration, the uplink control channel configuration including a repetition level indicator and a resource indicator for transmitting uplink control channel transmissions while in an idle mode. For example, the UE may identify time-frequency resources over which the uplink control channel configuration may be communicated, demodulate a transmission including the uplink control channel configuration over the time-frequency resources, and decode the demodulated transmission to obtain bits that indicate the uplink control channel configuration. In some examples, the first uplink resource configuration may include one or more information bits indicating the repetition level indicator and the resource indicator for transmitting uplink control channel transmissions while in an idle mode. The operations of 1805 may be performed according to the methods described herein. In some examples, aspects of the operations of 1805 may be performed by an uplink control channel configuration module as described with reference to FIGS. 5 through 8.

At 1810, the UE may transition from a connected mode to the idle mode. For example, the UE may disable or change a configuration for one or more components such that the UE may consume a relatively lower amount of power. The operations of 1810 may be performed according to the methods described herein. In some examples, aspects of the operations of 1810 may be performed by an idle mode module as described with reference to FIGS. 5 through 8.

At 1815, the UE may determine, based on the uplink control channel configuration, a number of repetitions and a set of resources for transmitting an uplink control channel transmission in the idle mode. For example, the UE may determine the number of repetitions and the set of resources according to the indications received in the uplink control channel configuration at 1805. The operations of 1815 may be performed according to the methods described herein. In some examples, aspects of the operations of 1815 may be performed by an uplink control channel transmission module as described with reference to FIGS. 5 through 8.

At 1820, the UE may transmit, while in the idle mode, the uplink control channel transmission according to the number of repetitions and the set of resources. For example, the UE may identify time-frequency resources according to allocated resources for a sequence of bits that may be used to communicate the uplink control channel transmission. The UE may encode and modulate the bits for communicating the uplink control channel transmission over the identified time-frequency resources, and the UE may transmit the encoded and modulated bits over the time-frequency resources. In some examples, the UE may transmit the uplink control channel transmission using the number of repetitions and/or resources as determined at 1815. The operations of 1820 may be performed according to the methods described herein. In some examples, aspects of the operations of 1820 may be performed by an uplink control channel transmission module as described with reference to FIGS. 5 through 8.

Figure 19:
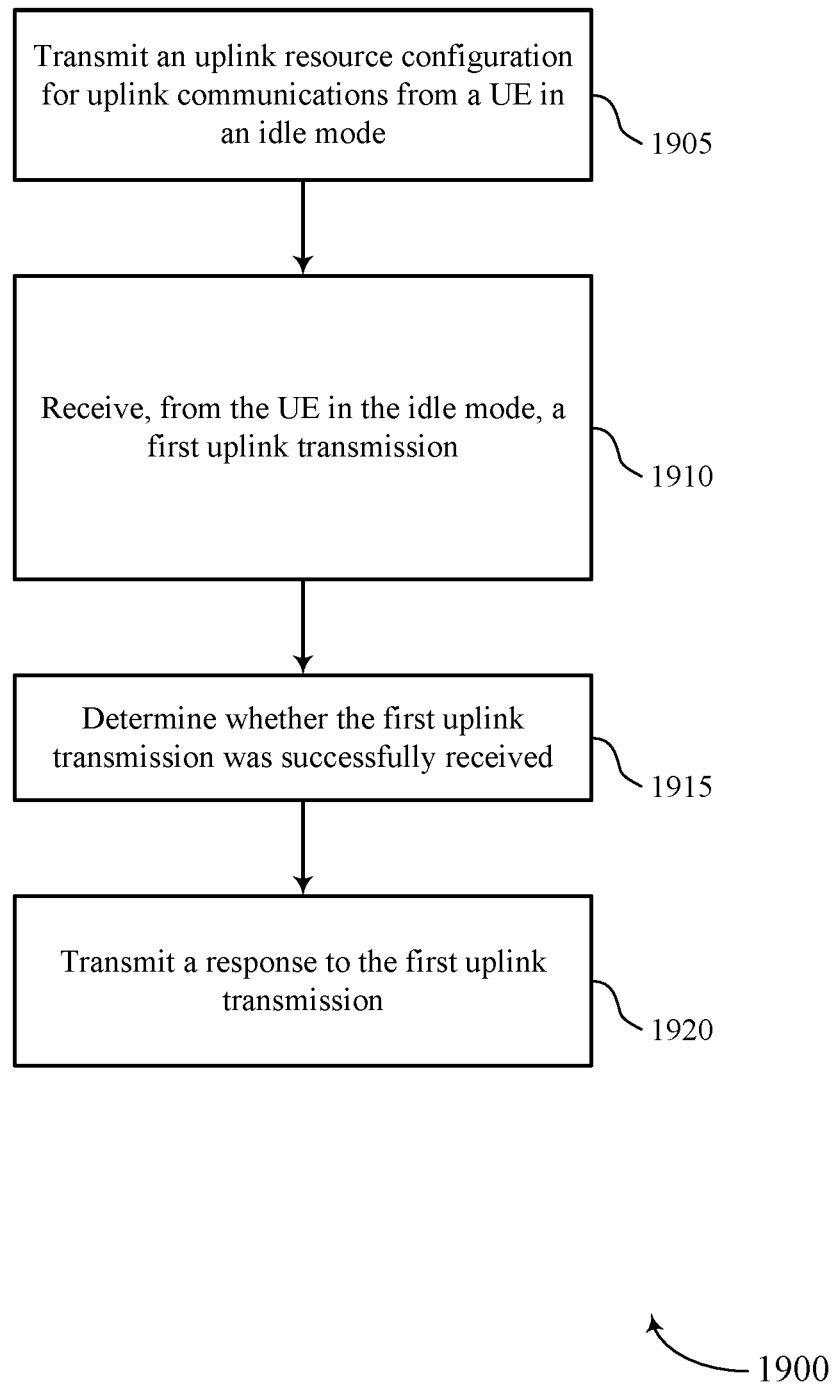

FIG. 19 shows a flowchart illustrating a method 1900 that supports techniques for wireless communications using preconfigured uplink resources in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. For example, the base station may identify time-frequency resources according to allocated resources for a sequence of bits that may be used to communicate the uplink resource configuration. The base station may encode and modulate the bits for communicating the uplink resource configuration over the identified time-frequency resources, and the base station may transmit the encoded and modulated bits over the time-frequency resources. In some examples, the uplink resource configuration may include a set of information bits to indicate the allocated resources for uplink communications. The operations of 1905 may be performed according to the methods described herein. In some examples, aspects of the operations of 1905 may be performed by an uplink resource configuration manager as described with reference to FIGS. 9 through 12.

At 1910, the base station may receive, from the UE subsequent to the UE transitioning from the connected mode to the idle mode, a first uplink transmission associated with a transport block on the allocated resources and according to the uplink resource configuration. For example, the base station may identify time-frequency resources for the transport block over which the first uplink transmission may be communicated. The base station may demodulate the first uplink transmission including the uplink resource configuration over the time-frequency resources, and decode the demodulated transmission to obtain bits for information included in the first uplink transmission. In some examples, the base station may receive the first uplink transmission using resources indicated to the UE via the uplink resource configuration communicated at 1905. The operations of 1910 may be performed according to the methods described herein. In some examples, aspects of the operations of 1910 may be performed by an uplink transmission manager as described with reference to FIGS. 9 through 12.

At 1915, the base station may determine whether the first uplink transmission was successfully received. For example, the base station may determine a number of bits that were successfully received in the first uplink transmission and whether the number of bits is sufficient to demodulate and decode the information indicated in the first uplink transmission. The operations of 1915 may be performed according to the methods described herein. In some examples, aspects of the operations of 1915 may be performed by a grant manager as described with reference to FIGS. 9 through 12.

At 1920, the base station may transmit a response to the first uplink transmission based on whether the first uplink transmission was successfully received. For example, the base station may identify time-frequency resources according to allocated resources for a sequence of bits that may be used to communicate the response. The base station may encode and modulate the bits for communicating the response over the identified time-frequency resources, and the base station may transmit the encoded and modulated bits over the time-frequency resources. In some examples, the response may indicate to the UE that the first uplink transmission was successfully received. The operations of 1920 may be performed according to the methods described herein. In some examples, aspects of the operations of 1920 may be performed by a grant manager as described with reference to FIGS. 9 through 12.

Figure 20:
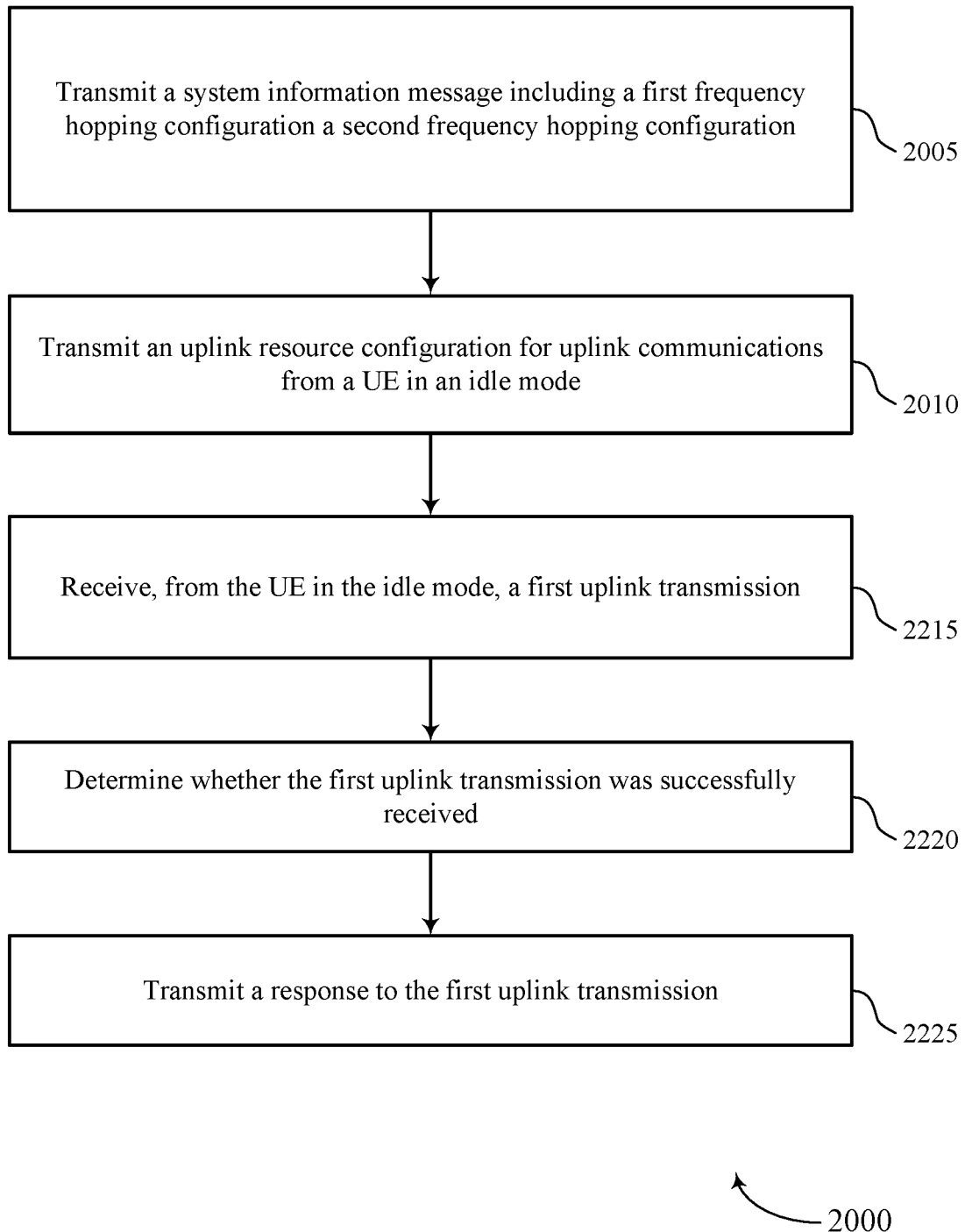

FIG. 20 shows a flowchart illustrating a method 2000 that supports techniques for wireless communications using preconfigured uplink resources in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may transmit a system information message including a first frequency hopping configuration for a first CE mode with a first frequency hopping interval and a second frequency hopping configuration for a second CE mode with a second frequency hopping interval, where the first frequency hopping interval is different than the second frequency hopping interval. For example, the base station may identify time-frequency resources according to allocated resources for a sequence of bits that may be used to communicate the system information. The base station may encode and modulate the bits for communicating the system information over the identified time-frequency resources, and the base station may transmit the encoded and modulated bits over the time-frequency resources. In some examples, the system information may include a set of information bits to indicate the first and/or second frequency hopping intervals for communicating with a UE while the UE operates in an idle mode. The operations of 2005 may be performed according to the methods described herein. In some examples, aspects of the operations of 2005 may be performed by a frequency hopping manager as described with reference to FIGS. 9 through 12.

At 2010, the base station may transmit, to the UE in a connected mode, an uplink resource configuration for uplink communications from the UE in the idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications, where the frequency hopping indicator indicates whether frequency hopping is enabled for the first uplink transmission, and the first uplink transmission is received according to the frequency hopping indicator. For example, the base station may identify time-frequency resources according to allocated resources for a sequence of bits that may be used to communicate the uplink resource configuration. The base station may encode and modulate the bits for communicating the uplink resource configuration over the identified time-frequency resources, and the base station may transmit the encoded and modulated bits over the time-frequency resources. In some examples, the uplink resource configuration may include a set of information bits to indicate the allocated resources for uplink communications. The operations of 2010 may be performed according to the methods described herein. In some examples, aspects of the operations of 2010 may be performed by an uplink resource configuration manager as described with reference to FIGS. 9 through 12.

At 2015, the base station may receive, from the UE subsequent to the UE transitioning from the connected mode to the idle mode, a first uplink transmission associated with a transport block on the allocated resources and according to the uplink resource configuration. For example, the base station may identify time-frequency resources for the transport block over which the first uplink transmission may be communicated. The base station may demodulate the first uplink transmission including the uplink resource configuration over the time-frequency resources, and decode the demodulated transmission to obtain bits for information included in the first uplink transmission. In some examples, the base station may receive the first uplink transmission using resources indicated to the UE via the uplink resource configuration communicated at 2010. The operations of 2015 may be performed according to the methods described herein. In some examples, aspects of the operations of 2015 may be performed by an uplink transmission manager as described with reference to FIGS. 9 through 12.

At 2020, the base station may determine whether the first uplink transmission was successfully received. For example, the base station may determine a number of bits that were successfully received in the first uplink transmission and whether the number of bits is sufficient to demodulate and decode the information indicated in the first uplink transmission. The operations of 2020 may be performed according to the methods described herein. In some examples, aspects of the operations of 2020 may be performed by a grant manager as described with reference to FIGS. 9 through 12.

At 2025, the base station may transmit a response to the first uplink transmission based on whether the first uplink transmission was successfully received. For example, the base station may identify time-frequency resources according to allocated resources for a sequence of bits that may be used to communicate the response. The base station may encode and modulate the bits for communicating the response over the identified time-frequency resources, and the base station may transmit the encoded and modulated bits over the time-frequency resources. In some examples, the response may indicate to the UE that the first uplink transmission was successfully received. The operations of 2025 may be performed according to the methods described herein. In some examples, aspects of the operations of 2025 may be performed by a grant manager as described with reference to FIGS. 9 through 12.

Figure 21:
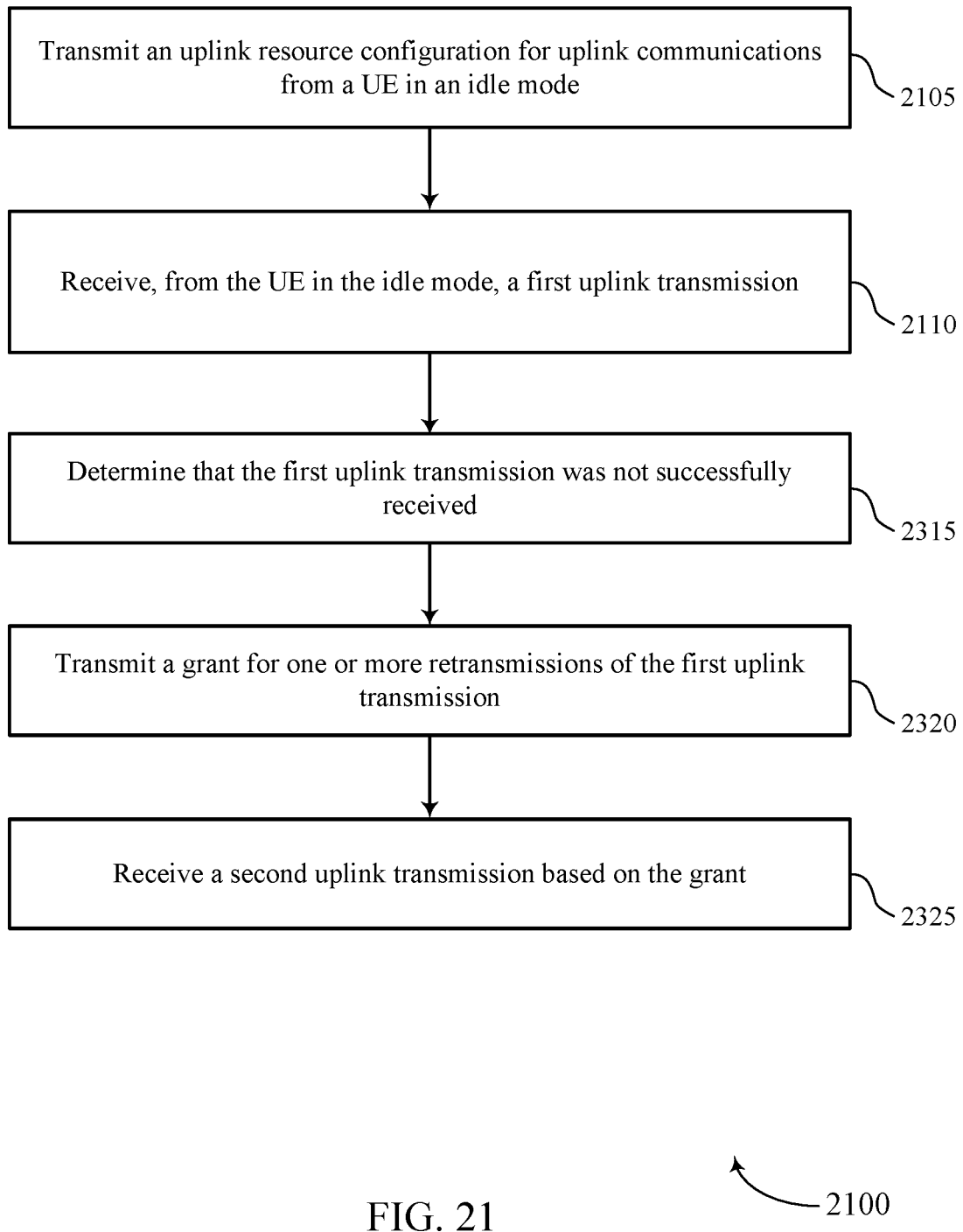

FIG. 21 shows a flowchart illustrating a method 2100 that supports techniques for wireless communications using pre-configured uplink resources in accordance with aspects of the present disclosure. The operations of method 2100 may be implemented by a base station 105 or its components as described herein. For example, the operations of method 2100 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE in a connected mode, an uplink resource configuration for uplink communications from the UE in an idle mode, the uplink resource configuration including an indicator associated with allocated resources for the uplink communications in the idle mode and a set of parameters including one or more of: a frequency hopping indicator, a frequency hopping interval indicator, a CE mode indicator, a repetition level indicator, or a subcarrier spacing for the uplink communications. For example, the base station may identify time-frequency resources according to allocated resources for a sequence of bits that may be used to communicate the uplink resource configuration. The base station may encode and modulate the bits for communicating the uplink resource configuration over the identified time-frequency resources, and the base station may transmit the encoded and modulated bits over the time-frequency resources. In some examples, the uplink resource configuration may include a set of information bits to indicate the allocated resources for uplink communications. The operations of 2105 may be performed according to the methods described herein. In some examples, aspects of the operations of 2105 may be performed by an uplink resource configuration manager as described with reference to FIGS. 9 through 12.

At 2110, the base station may receive, from the UE subsequent to the UE transitioning from the connected mode to the idle mode, a first uplink transmission associated with a transport block on the allocated resources and according to the uplink resource configuration. For example, the base station may identify time-frequency resources for the transport block over which the first uplink transmission may be communicated. The base station may demodulate the first uplink transmission including the uplink resource configuration over the time-frequency resources, and decode the demodulated transmission to obtain bits for information included in the first uplink transmission. In some examples, the base station may receive the first uplink transmission using resources indicated to the UE via the uplink resource configuration communicated at 2110. The operations of 2110 may be performed according to the methods described herein. In some examples, aspects of the operations of 2110 may be performed by an uplink transmission manager as described with reference to FIGS. 9 through 12.

At 2115, the base station may determine that the first uplink transmission was not successfully received. For example, the base station may determine a number of bits that were successfully received in the first uplink transmission and that the number of bits is not sufficient to demodulate and decode the information indicated in the first uplink transmission. The operations of 2115 may be performed according to the methods described herein. In some examples, aspects of the operations of 2115 may be performed by a grant manager as described with reference to FIGS. 9 through 12.

At 2120, the base station may transmit, in the response to the first uplink transmission, a grant for one or more retransmissions of the first uplink transmission. For example, the base station may identify time-frequency resources according to allocated resources for a sequence of bits that may be used to communicate the grant. The base station may encode and modulate the bits for communicating the grant over the identified time-frequency resources, and the base station may transmit the encoded and modulated bits over the time-frequency resources. In some examples, the grant may include a set of information bits to indicate allocated resources for uplink retransmissions. The operations of 2120 may be performed according to the methods described herein. In some examples, aspects of the operations of 2120 may be performed by a grant manager as described with reference to FIGS. 9 through 12.

At 2125, the base station may receive a second uplink transmission associated with the transport block based on the grant. For example, the base station may identify time-frequency resources for the transport block over which the second uplink transmission may be communicated. The base station may demodulate the second uplink transmission including the uplink resource configuration over the time-frequency resources, and decode the demodulated transmission to obtain bits for information included in the second uplink transmission. In some examples, the base station may receive the second uplink transmission using resources indicated to the UE via the grant communicated at 2110. The operations of 2125 may be performed according to the methods described herein. In some examples, aspects of the operations of 2125 may be performed by an uplink transmission manager as described with reference to FIGS. 9 through 12.

Figure 22:
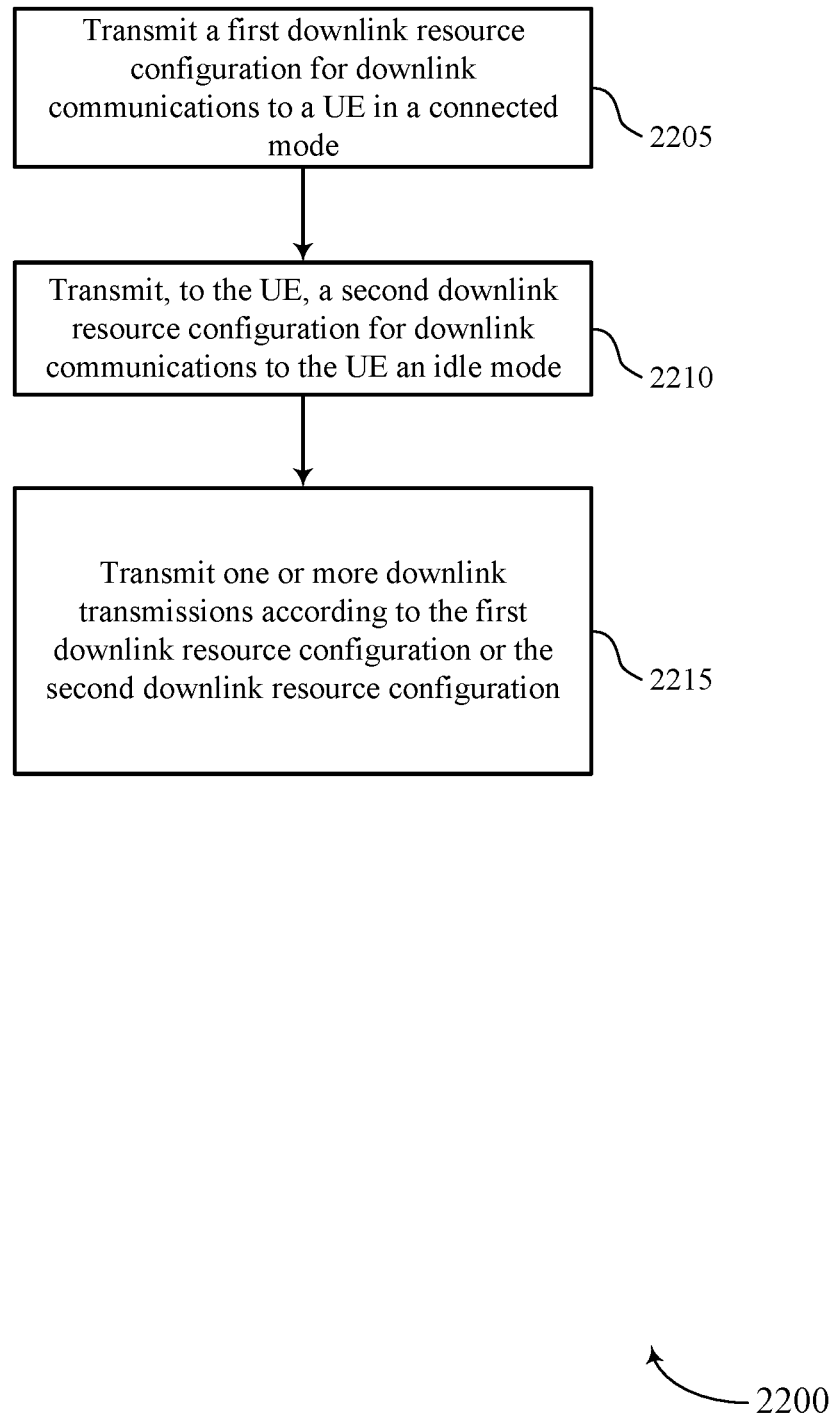

FIG. 22 shows a flowchart illustrating a method 2200 that supports techniques for wireless communications using pre-configured uplink resources in accordance with aspects of the present disclosure. The operations of method 2200 may be implemented by a base station 105 or its components as described herein. For example, the operations of method 2200 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a first downlink resource configuration for downlink communications to the UE in a connected mode. For example, the base station may identify time-frequency resources according to allocated resources for a sequence of bits that may be used to communicate the first downlink resource configuration. The base station may encode and modulate the bits for communicating the first downlink resource configuration over the identified time-frequency resources, and the base station may transmit the encoded and modulated bits over the time-frequency resources. In some examples, the first downlink resource configuration may include a set of information bits to indicate the allocated resources for subsequent downlink communications to the UE while the UE operates according to the connected mode. The operations of 2205 may be performed according to the methods described herein. In some examples, aspects of the operations of 2205 may be performed by a downlink resource configuration manager as described with reference to FIGS. 9 through 12.

At 2210, the base station may transmit, to the UE, a second downlink resource configuration for downlink communications to the UE an idle mode, the second downlink resource configuration including a set of parameters including one or more of a frequency hopping indicator or a CE mode indicator for the downlink communications in the idle mode. For example, the base station may identify time-frequency resources according to allocated resources for a sequence of bits that may be used to communicate the second downlink resource configuration. The base station may encode and modulate the bits for communicating the second downlink resource configuration over the identified time-frequency resources, and the base station may transmit the encoded and modulated bits over the time-frequency resources. In some examples, the second downlink resource configuration may include a set of information bits to indicate the allocated resources for subsequent downlink communications to the UE while the UE operates according to the idle mode. The operations of 2210 may be performed according to the methods described herein. In some examples, aspects of the operations of 2210 may be performed by a downlink resource configuration manager as described with reference to FIGS. 9 through 12.

At 2215, the base station may transmit, subsequent to the UE transitioning from the connected mode to the idle mode, one or more downlink transmissions according to the first downlink resource configuration or the second downlink resource configuration. For example, the base station may identify time-frequency resources according to allocated resources for a sequence of bits that may be used to communicate the downlink transmissions. The base station may encode and modulate the bits for communicating the downlink transmissions over the identified time-frequency resources, and the base station may transmit the encoded and modulated bits over the time-frequency resources. In some examples, the downlink transmissions may be communicated according to parameters indicated the UE via the first downlink resource configuration and/or the second downlink configuration. The operations of 2215 may be performed according to the methods described herein. In some examples, aspects of the operations of 2215 may be performed by a downlink transmission manager as described with reference to FIGS. 9 through 12.

Figure 23:
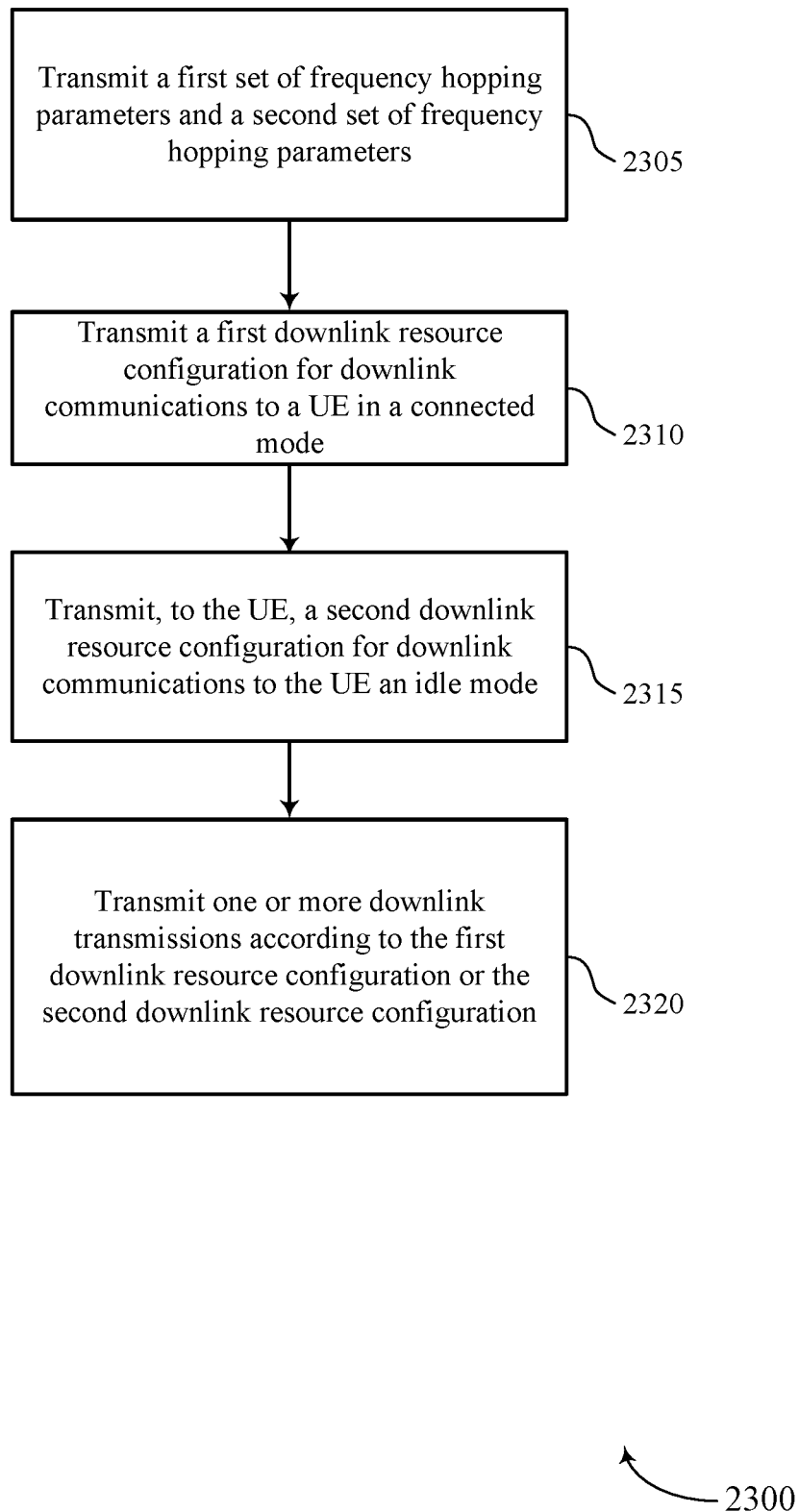

FIG. 23 shows a flowchart illustrating a method 2300 that supports techniques for wireless communications using preconfigured uplink resources in accordance with aspects of the present disclosure. The operations of method 2300 may be implemented by a base station 105 or its components as described herein. For example, the operations of method 2300 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2305, the base station may transmit a first set of frequency hopping parameters associated with a first CE mode and a second set of frequency hopping parameters associated with a second CE mode. For example, the base station may identify time-frequency resources according to allocated resources for a sequence of bits that may be used to communicate the first and second sets of frequency hopping parameters. The base station may encode and modulate the bits for communicating the first and second sets of frequency hopping parameters over the identified time-frequency resources, and the base station may transmit the encoded and modulated bits over the time-frequency resources. The operations of 2305 may be performed according to the methods described herein. In some examples, aspects of the operations of 2305 may be performed by a frequency hopping manager as described with reference to FIGS. 9 through 12.

At 2310, the base station may transmit, to a UE, a first downlink resource configuration for downlink communications to the UE in a connected mode. For example, the base station may identify time-frequency resources according to allocated resources for a sequence of bits that may be used to communicate the first downlink resource configuration. The base station may encode and modulate the bits for communicating the first downlink resource configuration over the identified time-frequency resources, and the base station may transmit the encoded and modulated bits over the time-frequency resources. In some examples, the first downlink resource configuration may include a set of information bits to indicate the allocated resources for subsequent downlink communications to the UE while the UE operates according to the connected mode. The operations of 2310 may be performed according to the methods described herein. In some examples, aspects of the operations of 2310 may be performed by a downlink resource configuration manager as described with reference to FIGS. 9 through 12.

At 2315, the base station may transmit, to the UE, a second downlink resource configuration for downlink communications to the UE an idle mode, the second downlink resource configuration including a set of parameters including one or more of a frequency hopping indicator or a CE mode indicator for the downlink communications in the idle mode. For example, the base station may identify time-frequency resources according to allocated resources for a sequence of bits that may be used to communicate the second downlink resource configuration. The base station may encode and modulate the bits for communicating the second downlink resource configuration over the identified time-frequency resources, and the base station may transmit the encoded and modulated bits over the time-frequency resources. In some examples, the second downlink resource configuration may include a set of information bits to indicate the allocated resources for subsequent downlink communications to the UE while the UE operates according to the idle mode. The operations of 2315 may be performed according to the methods described herein. In some examples, aspects of the operations of 2315 may be performed by a downlink resource configuration manager as described with reference to FIGS. 9 through 12.

At 2320, the base station may transmit, subsequent to the UE transitioning from the connected mode to the idle mode, one or more downlink transmissions according to the first downlink resource configuration or the second downlink resource configuration. For example, the base station may identify time-frequency resources according to allocated resources for a sequence of bits that may be used to communicate the downlink transmissions. The base station may encode and modulate the bits for communicating the downlink transmissions over the identified time-frequency resources, and the base station may transmit the encoded and modulated bits over the time-frequency resources. In some examples, the downlink transmissions may be communicated according to parameters indicated the UE via the first downlink resource configuration and/or the second downlink configuration. The operations of 2320 may be performed according to the methods described herein. In some examples, aspects of the operations of 2320 may be performed by a downlink transmission manager as described with reference to FIGS. 9 through 12.

Figure 24:
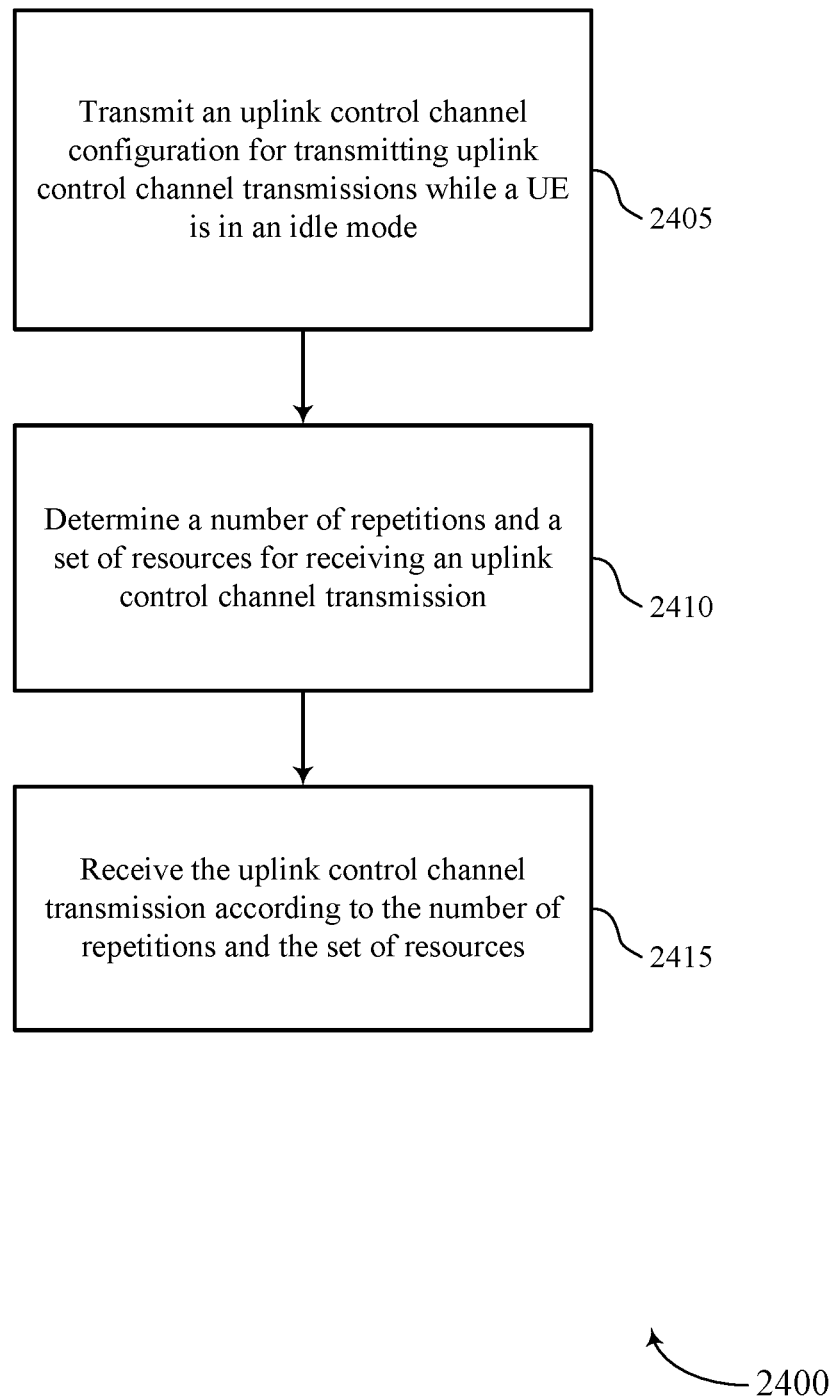

FIG. 24 shows a flowchart illustrating a method 2400 that supports techniques for wireless communications using preconfigured uplink resources in accordance with aspects of the present disclosure. The operations of method 2400 may be implemented by a base station 105 or its components as described herein. For example, the operations of method 2400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2405, the base station may transmit, to a UE, an uplink control channel configuration, the uplink control channel configuration including a repetition level indicator and a resource indicator for transmitting uplink control channel transmissions while the UE is in an idle mode. For example, the base station may identify time-frequency resources according to allocated resources for a sequence of bits that may be used to communicate the uplink control channel configuration. The base station may encode and modulate the bits for communicating the uplink control channel configuration over the identified time-frequency resources, and the base station may transmit the encoded and modulated bits over the time-frequency resources. In some examples, the uplink control channel configuration may include a set of information bits to indicate the allocated resources for subsequent downlink communications to the UE while the UE operates according to the connected mode. The operations of 2405 may be performed according to the methods described herein. In some examples, aspects of the operations of 2405 may be performed by an uplink control channel configuration manager as described with reference to FIGS. 9 through 12.

At 2410, the base station may determine, based on the uplink control channel configuration, a number of repetitions and a set of resources for receiving an uplink control channel transmission from the UE while the UE is in an idle mode. For example, the base station may determine the number of repetitions and the set of resources to facilitate successful communication of uplink transmissions while the UE operates according to the idle mode. The operations of 2410 may be performed according to the methods described herein. In some examples, aspects of the operations of 2410 may be performed by an uplink control channel transmission manager as described with reference to FIGS. 9 through 12.

At 2415, the base station may receive, subsequent to the UE transitioning from a connected mode to the idle mode, the uplink control channel transmission according to the number of repetitions and the set of resources. For example, the base station may identify time-frequency resources for the transport block over which the uplink control channel transmission may be communicated. The base station may demodulate the second uplink transmission including the uplink control channel transmission over the time-frequency resources, and decode the demodulated transmission to obtain bits for information included in the uplink control channel transmission. In some examples, the base station may receive the uplink control channel transmission using resources indicated to the UE via the uplink control channel configuration at 2405. The operations of 2415 may be performed according to the methods described herein. In some examples, aspects of the operations of 2415 may be performed by an uplink control channel transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a system information message comprising a first frequency hopping configuration for a first coverage enhancement (CE) mode with a first frequency hopping interval and a second frequency hopping configuration for a second CE mode with a second frequency hopping interval, wherein the first frequency hopping interval is different than the second frequency hopping interval;
   receiving an uplink resource configuration for uplink communications in an idle mode, the uplink resource configuration comprising an indicator associated with allocated resources for the uplink communications in the idle mode and a set of parameters comprising one or more of: a frequency hopping indicator, a frequency hopping interval indicator, a CE mode indicator, a repetition level indicator, or a subcarrier spacing for the uplink communications;

transmitting, while in the idle mode, a first uplink transmission associated with a transport block on the allocated resources and according to one or more of the set of parameters; and monitoring for a response to the first uplink transmission.

2. The method of claim 1, wherein the frequency hopping indicator indicates whether frequency hopping is enabled for the first uplink transmission, and the first uplink transmission is transmitted according to the frequency hopping indicator.

3. The method of claim 2, wherein the uplink resource configuration comprises a frequency hopping configuration for the uplink communications indicating a frequency offset or a number of transmission subframes for the frequency hopping.

4. The method of claim 2, further comprising:
transmitting a capability message comprising a first indication of a UE capability to support frequency hopping for the uplink communications in a connected mode and a second indication of a UE capability to support frequency hopping for the uplink communications in the idle mode.

5. The method of claim 4, wherein the second indication comprises a single capability indication of whether the UE supports frequency hopping for all channels.

6. The method of claim 4, wherein the second indication comprises a downlink capability indication indicating whether the UE supports frequency hopping for downlink channels and an uplink capability indication indicating whether the UE supports frequency hopping for uplink channels.

7. The method of claim 4, wherein the second indication comprises a plurality of capability indications of whether the UE supports frequency hopping for a plurality of corresponding channels.

8. The method of claim 2, further comprising:
transmitting the first uplink transmission according to the first frequency hopping configuration for the first CE mode using the first frequency hopping interval based at least in part on a default CE mode for the UE in the idle mode.

9. The method of claim 2, further comprising:
transmitting the first uplink transmission according to the first frequency hopping configuration for the first CE mode using the first frequency hopping interval based at least in part on the CE mode indicator.

10. The method of claim 2, further comprising:
transmitting the first uplink transmission according to the second frequency hopping configuration for the second CE mode using the second frequency hopping interval based at least in part on the repetition level indicator indicating a number of repetitions for the first uplink transmission satisfying a threshold number of repetitions.

11. The method of claim 2, further comprising:
transmitting the first uplink transmission according to the first frequency hopping configuration for the first CE mode using the first frequency hopping interval based at least in part on identifying that the UE was configured for the first CE mode at a time that the UE received the uplink resource configuration.

12. The method of claim 2, wherein the first frequency hopping configuration indicates a frequency offset and a number of transmission subframes for the frequency hopping.

13. The method of claim 2, further comprising:
transmitting a capability message comprising an indication of a UE capability to support frequency hopping for the uplink communications in a connected mode and the uplink communications in the idle mode.

14. The method of claim 1, further comprising:
receiving the response to the first uplink transmission, the response comprising a grant for one or more retransmissions of the first uplink transmission; and
transmitting a second uplink transmission associated with the transport block based at least in part on the grant.

15. The method of claim 14, wherein the uplink resource configuration comprises a first frequency hopping indicator that indicates whether frequency hopping is enabled for the first uplink transmission and for the one or more retransmissions of the first uplink transmission, and the second uplink transmission is transmitted according to the first frequency hopping indicator.

16. The method of claim 14, wherein the uplink resource configuration comprises a first frequency hopping indicator that indicates whether frequency hopping is enabled for the first uplink transmission and a second frequency hopping indicator that indicates whether frequency hopping is enabled for the one or more retransmissions of the first uplink transmission, and the second uplink transmission is transmitted according to the second frequency hopping indicator.

17. The method of claim 14, wherein the grant for the one or more retransmissions of the first uplink transmission comprises a first timing advance command indicating a first timing advance to be applied for the one or more retransmissions of the first uplink transmission, wherein transmitting the second uplink transmission is based at least in part on the first timing advance.

18. The method of claim 17, further comprising:
receiving a second response to the second uplink transmission, the second response comprising a second grant for one or more second retransmissions of the first uplink transmission, wherein the second grant comprises a second timing advance command indicating a second timing advance to be applied for the one or more second retransmissions of the first uplink transmission; and
transmitting a third uplink transmission based at least in part on the second timing advance.

19. The method of claim 17, further comprising:
determining a delay time between receiving the grant and transmitting the second uplink transmission based at least in part on a presence of the first timing advance command in the grant.

20. The method of claim 17, wherein a first delay time between receiving grants and transmitting uplink transmissions is configured for uplink transmissions in a connected mode, the method further comprising:
determining a second delay time between receiving the grant and transmitting the second uplink transmission, wherein the second delay time is different than the first delay time.

21. The method of claim 14, wherein the grant for the one or more retransmissions of the first uplink transmission comprises a power control command indicating an adjustment to an uplink transmission power for the one or more retransmissions of the first uplink transmission, and wherein transmitting the second uplink transmission is based at least in part on the indicated adjustment to the uplink transmission power, and wherein a correspondence between the power control command and the adjustment to the uplink transmission power for the one or more retransmissions of the first uplink transmission is different from a correspondence between power control commands and uplink transmission power adjustments for a connected mode.

22. The method of claim 14, wherein the grant for the one or more retransmissions of the first uplink transmission comprises a repetition indicator that indicates a number of repetitions for transmitting the one or more retransmissions of the first uplink transmission, wherein the second uplink transmission is transmitted in accordance with the indicated number of repetitions.

23. The method of claim 22, wherein the number of repetitions indicated by the repetition indicator is based at least in part on a number of repetitions for the first uplink transmission.

24. The method of claim 22, wherein the uplink resource configuration comprises an indicator of a correspondence between a value for the repetition indicator and the number of repetitions indicated by the repetition indicator.

25. The method of claim 24, wherein the indicator of the correspondence between the value for the repetition indicator and the number of repetitions indicated by the repetition indicator comprises a maximum number of repetitions for transmitting the one or more retransmissions of the first uplink transmission.

26. The method of claim 22,
wherein the system information message comprises a first maximum repetition indicator that indicates a maximum number of repetitions for the first CE mode and a second maximum repetition indicator that indicates a maximum number of repetitions for the second CE mode, wherein the uplink resource configuration comprises the CE mode indicator, and wherein a correspondence between a value for the repetition indicator and the number of repetitions indicated by the repetition indicator is determined based at least in part on one of the first maximum repetition indicator or the second maximum repetition indicator, and wherein the one of the first maximum repetition indicator or the second maximum repetition indicator is determined based at least in part on the CE mode indicator.

27. The method of claim 1, wherein the set of parameters of the uplink resource configuration comprises a feature support indication indicating support for one or more of: an enhanced transport block size (TBS), a modulation and coding scheme (MCS), an enhanced bandwidth, sub-physical resource block (PRB) allocation, or flexible resource allocation for the uplink communications in the idle mode, and wherein a set of fields of a downlink control information message received while in the idle mode is interpreted based at least in part on the feature support indication.

28. The method of claim 27, further comprising:
transmitting a capability message comprising a feature capability indication of UE capability support for the enhanced TBS, the MCS, the enhanced bandwidth, the sub-PRB allocation, or the flexible resource allocation for the uplink communications in the idle mode, wherein the feature support indication is based at least in part on the feature capability indication.

29. The method of claim 1, wherein the uplink resource configuration is received in a radio resource control (RRC) message.

30. The method of claim 1, wherein the first uplink transmission is transmitted in a physical uplink shared channel (PUSCH).

31. A method for wireless communications at a user equipment (UE), comprising:
receiving an uplink resource configuration for uplink communications in an idle mode, the uplink resource configuration comprising an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;
transmitting, while in the idle mode, a first uplink transmission associated with a transport block on the allocated resources and according to one or more of the set of parameters;
monitoring for a response to the first uplink transmission;
receiving the response to the first uplink transmission, the response comprising a grant for one or more retransmissions of the first uplink transmission, wherein the grant for one or more retransmissions of the first uplink transmission comprises a second frequency hopping indicator that indicates whether frequency hopping is enabled for the one or more retransmissions of the first uplink transmission, and the one or more retransmissions of the first uplink transmission are transmitted according to the second frequency hopping indicator; and
transmitting a second uplink transmission associated with the transport block based at least in part on the grant.

32. A method for wireless communications at a user equipment (UE), comprising:
receiving an uplink resource configuration for uplink communications in an idle mode, the uplink resource configuration comprising an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;
transmitting, while in the idle mode, a first uplink transmission associated with a transport block on the allocated resources and according to one or more of the set of parameters;
monitoring for a response to the first uplink transmission;
receiving the response to the first uplink transmission, the response comprising a grant for one or more retransmissions of the first uplink transmission, wherein the grant for one or more retransmissions of the first uplink transmission comprises a second frequency hopping indicator that indicates whether frequency hopping is enabled for the one or more retransmissions of the first uplink transmission, and a second uplink transmission is transmitted according to the frequency hopping indicator and the second frequency hopping indicator; and
transmitting the second uplink transmission associated with the transport block based at least in part on the grant.

33. A method for wireless communications at a user equipment (UE), comprising:

receiving a set of uplink resource configurations for uplink communications in an idle mode, the set of uplink resource configurations comprising an uplink resource configuration, wherein the uplink resource configuration comprises an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;

determining an active uplink resource configuration for one or more retransmissions of a first uplink transmission based at least in part on an indicator in a downlink control information message received while in the idle mode and the set of uplink resource configurations;

transmitting, while in the idle mode, the first uplink transmission associated with a transport block on the allocated resources and according to one or more of the set of parameters; and monitoring for a response to the first uplink transmission.

34. A method for wireless communications at a base station, comprising:

transmitting a system information message comprising a first frequency hopping configuration for a first coverage enhancement (CE) mode with a first frequency hopping interval and a second frequency hopping configuration for a second CE mode with a second frequency hopping interval, wherein the first frequency hopping interval is different than the second frequency hopping interval;

transmitting, to a user equipment (UE) in a connected mode, an uplink resource configuration for uplink communications from the UE in an idle mode, the uplink resource configuration comprising an indicator associated with allocated resources for the uplink communications in the idle mode and a set of parameters comprising one or more of: a frequency hopping indicator, a frequency hopping interval indicator, a CE mode indicator, a repetition level indicator, or a subcarrier spacing for the uplink communications;

receiving, from the UE subsequent to the UE transitioning from the connected mode to the idle mode, a first uplink transmission associated with a transport block on the allocated resources and according to the uplink resource configuration;

determining whether the first uplink transmission was successfully received; and transmitting a response to the first uplink transmission based at least in part on whether the first uplink transmission was successfully received.

35. The method of claim 34, wherein the frequency hopping indicator indicates whether frequency hopping is enabled for the first uplink transmission, and the first uplink transmission is received according to the frequency hopping indicator.

36. The method of claim 35, wherein the uplink resource configuration comprises a frequency hopping configuration for the uplink communications indicating a frequency offset or a number of transmission subframes for the frequency hopping.

37. The method of claim 35, further comprising:

receiving the first uplink transmission according to the first frequency hopping configuration for the first CE mode using the first frequency hopping interval based at least in part on a default CE mode for the UE in the idle mode.

38. The method of claim 35, further comprising:

receiving the first uplink transmission according to the first frequency hopping configuration for the first CE mode using the first frequency hopping interval based at least in part on the CE mode indicator.

39. The method of claim 35, further comprising:

receiving the first uplink transmission according to the second frequency hopping configuration for the second CE mode using the second frequency hopping interval based at least in part on the repetition level indicator indicating a number of repetitions for the first uplink transmission satisfying a threshold number of repetitions.

40. The method of claim 35, further comprising:

receiving the first uplink transmission according to the first frequency hopping configuration for the first CE mode using the first frequency hopping interval based at least in part on identifying that the UE was configured for the first CE mode at a time that the UE received the uplink resource configuration.

41. The method of claim 35, further comprising:

receiving a capability message comprising a first indicator of a UE capability to support frequency hopping for the uplink communications in the connected mode and a second indicator of a UE capability to support frequency hopping for the uplink communications in the idle mode, wherein the frequency hopping indicator is based at least in part on the UE capability to support frequency hopping for the uplink communications in the idle mode.

42. The method of claim 41, wherein the second indicator comprises a single capability indicator of whether the UE supports frequency hopping for all channels.

43. The method of claim 41, wherein the second indicator comprises a downlink capability indicator indicating whether the UE supports frequency hopping for downlink channels and an uplink capability indicator indicating whether the UE supports frequency hopping for uplink channels.

44. The method of claim 41, wherein the second indicator comprises a plurality of capability indicators of whether the UE supports frequency hopping for a plurality of corresponding channels.

45. The method of claim 35, wherein the first frequency hopping configuration indicates a frequency offset and a number of transmission subframes for the frequency hopping.

46. The method of claim 35, further comprising:

receiving a capability message comprising an indication of a UE capability to support frequency hopping for the uplink communications in the connected mode and the uplink communications in the idle mode, wherein the frequency hopping indicator is based at least in part on the UE capability to support frequency hopping.

47. The method of claim 34, further comprising:

determining that the first uplink transmission was not successfully received;

transmitting, in the response to the first uplink transmission, a grant for one or more retransmissions of the first uplink transmission; and receiving a second uplink transmission associated with the transport block based at least in part on the grant.

48. The method of claim 47, wherein the uplink resource configuration comprises a first frequency hopping indicator that indicates whether frequency hopping is enabled for the first uplink transmission and for the one or more retransmissions of the first uplink transmission, and the second uplink transmission is received according to the first frequency hopping indicator.

49. The method of claim 47, wherein the uplink resource configuration comprises a first frequency hopping indicator that indicates whether frequency hopping is enabled for the first uplink transmission and a second frequency hopping indicator that indicates whether frequency hopping is enabled for the one or more retransmissions of the first uplink transmission, and the second uplink transmission is received according to the second frequency hopping indicator.

50. The method of claim 47, wherein the grant for the one or more retransmissions of the first uplink transmission comprises a first timing advance command indicating a first timing advance to be applied for the one or more retransmissions of the first uplink transmission, wherein receiving the second uplink transmission is based at least in part on the first timing advance.

51. The method of claim 50, further comprising:
transmitting a second response to the second uplink transmission, the second response comprising a second grant for one or more second retransmissions of the first uplink transmission, wherein the second grant comprises a second timing advance command indicating a second timing advance to be applied for the one or more second retransmissions of the first uplink transmission; and
receiving a third uplink transmission based at least in part on the second timing advance.

52. The method of claim 50, wherein a delay time between transmitting the grant and receiving the second uplink transmission is based at least in part on a presence of the first timing advance command in the grant.

53. The method of claim 50, wherein a first delay time between transmitting grants and receiving uplink transmissions is configured for uplink transmissions in the connected mode, and a second delay time between transmitting the grant and receiving the second uplink transmission, wherein the second delay time is different than the first delay time.

54. The method of claim 47, wherein the grant for the one or more retransmissions of the first uplink transmission comprises a power control command indicating an adjustment to an uplink transmission power for the one or more retransmissions of the first uplink transmission, and wherein receiving the second uplink transmission is based at least in part on the indicated adjustment to the uplink transmission power, and wherein a correspondence between the power control command and the adjustment to the uplink transmission power for the one or more retransmissions of the first uplink transmission is different from a correspondence between power control commands and uplink transmission power adjustments for the connected mode.

55. The method of claim 47, wherein the grant for the one or more retransmissions of the first uplink transmission comprises a repetition indicator that indicates a number of repetitions for the UE to transmit the one or more retransmissions of the first uplink transmission, wherein the second uplink transmission is received in accordance with the indicated number of repetitions.

56. The method of claim 55, wherein the number of repetitions indicated by the repetition indicator is based at least in part on a number of repetitions for the first uplink transmission.

57. The method of claim 55, wherein the uplink resource configuration comprises an indicator of a correspondence between a value for the repetition indicator and the number of repetitions indicated by the repetition indicator.

58. The method of claim 57, wherein the indicator of the correspondence between the value for the repetition indicator and the number of repetitions indicated by the repetition indicator comprises a maximum number of repetitions for the UE to transmit the one or more retransmissions of the first uplink transmission.

59. The method of claim 55,
wherein the system information message comprises a first maximum repetition indicator that indicates a maximum number of repetitions for the first CE mode and a second maximum repetition indicator that indicates a maximum number of repetitions for the second CE mode, wherein the uplink resource configuration comprises the CE mode indicator, and wherein a correspondence between a value for the repetition indicator and the number of repetitions indicated by the repetition indicator is determined based at least in part on the first maximum repetition indicator, the second maximum repetition indicator, and the CE mode indicator.

60. The method of claim 34, wherein the set of parameters of the uplink resource configuration comprises a feature support indication indicating support for one or more of: an enhanced transport block size (TBS), a modulation and coding scheme (MCS), an enhanced bandwidth, sub-physical resource block (PRB) allocation, or flexible resource allocation for the uplink communications in the idle mode, and wherein a set of fields of a downlink control information message transmitted while the UE is in the idle mode is interpreted based at least in part on the feature support indication.

61. The method of claim 60, further comprising:
receiving a capability message comprising a feature capability indication of UE capability support for the enhanced TBS, the MCS, the enhanced bandwidth, the sub-PRB allocation, or the flexible resource allocation for the uplink communications in the idle mode, wherein the feature support indication is based at least in part on the feature capability indication.

62. The method of claim 34, wherein the uplink resource configuration is received in a radio resource control (RRC) message.

63. The method of claim 34, wherein the first uplink transmission is transmitted in a physical uplink shared channel (PUSCH).

64. A method for wireless communications at a base station, comprising:
transmitting, to a user equipment (UE) in a connected mode, an uplink resource configuration for uplink communications from the UE in an idle mode, the uplink resource configuration comprising an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;
receiving, from the UE subsequent to the UE transitioning from the connected mode to the idle mode, a first uplink transmission associated with a transport block on the allocated resources and according to the uplink resource configuration;
determining whether the first uplink transmission was successfully received;

transmitting a response to the first uplink transmission based at least in part on whether the first uplink transmission was successfully received;
determining that the first uplink transmission was not successfully received;
transmitting, in the response to the first uplink transmission, a grant for one or more retransmissions of the first uplink transmission, wherein the grant for one or more retransmissions of the first uplink transmission comprises a second frequency hopping indicator that indicates whether frequency hopping is enabled for the one or more retransmissions of the first uplink transmission, and the one or more retransmissions of the first uplink transmission are received according to the second frequency hopping indicator; and
receiving a second uplink transmission associated with the transport block based at least in part on the grant.

65. A method for wireless communications at a base station, comprising:
transmitting, to a user equipment (UE) in a connected mode, an uplink resource configuration for uplink communications from the UE in an idle mode, the uplink resource configuration comprising an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;
receiving, from the UE subsequent to the UE transitioning from the connected mode to the idle mode, a first uplink transmission associated with a transport block on the allocated resources and according to the uplink resource configuration;
determining whether the first uplink transmission was successfully received;
transmitting a response to the first uplink transmission based at least in part on whether the first uplink transmission was successfully received;
determining that the first uplink transmission was not successfully received;
transmitting, in the response to the first uplink transmission, a grant for one or more retransmissions of the first uplink transmission, wherein the grant for one or more retransmissions of the first uplink transmission comprises a second frequency hopping indicator that indicates whether frequency hopping is enabled for the one or more retransmissions of the first uplink transmission, and a second uplink transmission is received according to the frequency hopping indicator and the second frequency hopping indicator; and
receiving the second uplink transmission associated with the transport block based at least in part on the grant.

66. A method for wireless communications at a base station, comprising:
transmitting, to a user equipment (UE) in a connected mode, a set of uplink resource configurations for uplink communications in an idle mode, the set of uplink resource configurations comprising an uplink resource configuration, wherein the uplink resource configuration comprises an indicator associated with allocated resources for the uplink communications in the idle mode and a set of parameters comprising one or more of: a frequency hopping indicator, a frequency hopping interval indicator, a coverage enhancement (CE) mode indicator, a repetition level indicator, or a subcarrier spacing for the uplink communications;
receiving, from the UE subsequent to the UE transitioning from the connected mode to the idle mode, a first uplink transmission associated with a transport block on the allocated resources and according to the uplink resource configuration;
determining whether the first uplink transmission was successfully received;
transmitting, while the UE is in the idle mode, an indicator in a downlink control information message of an active uplink resource configuration for one or more retransmissions of the first uplink transmission; and
transmitting a response to the first uplink transmission based at least in part on whether the first uplink transmission was successfully received.

67. An apparatus for wireless communications at a user equipment (UE), comprising:
a processor,
memory coupled with the processor; and
instructions stored in the memory and executable by the processor to cause the apparatus to:
receive a system information message comprising a first frequency hopping configuration for a first coverage enhancement (CE) mode with a first frequency hopping interval and a second frequency hopping configuration for a second CE mode with a second frequency hopping interval, wherein the first frequency hopping interval is different than the second frequency hopping interval;
receive an uplink resource configuration for uplink communications in an idle mode, the uplink resource configuration comprising an indicator associated with allocated resources for the uplink communications in the idle mode and a set of parameters comprising one or more of: a frequency hopping indicator, a frequency hopping interval indicator, a CE mode indicator, a repetition level indicator, or a subcarrier spacing for the uplink communications;
transmit, while in the idle mode, a first uplink transmission associated with a transport block on the allocated resources and according to one or more of the set of parameters; and
monitor for a response to the first uplink transmission.

68. The apparatus of claim 67, wherein the frequency hopping indicator indicates whether frequency hopping is enabled for the first uplink transmission, and the first uplink transmission is transmitted according to the frequency hopping indicator.

69. The apparatus of claim 67, wherein the instructions are further executable by the processor to cause the apparatus to:
receive the response to the first uplink transmission, the response comprising a grant for one or more retransmissions of the first uplink transmission; and
transmit a second uplink transmission associated with the transport block based at least in part on the grant.

70. An apparatus for wireless communications at a base station, comprising:
a processor,
memory coupled with the processor; and
instructions stored in the memory and executable by the processor to cause the apparatus to:
transmit a system information message comprising a first frequency hopping configuration for a first coverage enhancement (CE) mode with a first frequency hopping interval and a second frequency hopping configuration for a second CE mode with a second frequency hopping interval, wherein the first frequency hopping interval is different than the second frequency hopping interval;

transmit, to a user equipment (UE) in a connected mode, an uplink resource configuration for uplink communications from the UE in an idle mode, the uplink resource configuration comprising an indicator associated with allocated resources for the uplink communications in the idle mode and a set of parameters comprising one or more of: a frequency hopping indicator, a frequency hopping interval indicator, a CE mode indicator, a repetition level indicator, or a subcarrier spacing for the uplink communications;

receive, from the UE subsequent to the UE transitioning from the connected mode to the idle mode, a first uplink transmission associated with a transport block on the allocated resources and according to the uplink resource configuration;

determine whether the first uplink transmission was successfully received; and transmit a response to the first uplink transmission based at least in part on whether the first uplink transmission was successfully received.

71. The apparatus of claim 70, wherein the frequency hopping indicator indicates whether frequency hopping is enabled for the first uplink transmission, and the first uplink transmission is received according to the frequency hopping indicator.

72. The apparatus of claim 70, wherein the instructions are further executable by the processor to cause the apparatus to:

determine that the first uplink transmission was not successfully received;

transmit, in the response to the first uplink transmission, a grant for one or more retransmissions of the first uplink transmission; and receive a second uplink transmission associated with the transport block based at least in part on the grant.

\* \* \* \* \*